(12) United States Patent
Cochetas et al.

(10) Patent No.: US 12,415,552 B2
(45) Date of Patent: Sep. 16, 2025

(54) TROLLEY SYSTEM AND ASSOCIATED RAILS AND TRACKS

(71) Applicant: Holmes Solutions Limited Partnership, Wellington (NZ)

(72) Inventors: Peter David Cochetas, Boulder, CO (US); Andrew Karl Diehl, Wellington (NZ); Daniel Charles Lewis, Wellington (NZ); Alexander Peter Hannibal Newman, Wellington (NZ); Macaulay James Pye, Wellington (NZ); Mark Harinui Thomson, Wellington (NZ)

(73) Assignee: WHOOSH HOLD LP, Wellington (NZ)

( * ) Notice: Subject to any disclaimer, the term of this patent is extended or adjusted under 35 U.S.C. 154(b) by 1021 days.

(21) Appl. No.: 16/763,507

(22) PCT Filed: Nov. 14, 2018

(86) PCT No.: PCT/NZ2018/050162
§ 371 (c)(1),
(2) Date: Nov. 30, 2020

(87) PCT Pub. No.: WO2019/098859
PCT Pub. Date: May 23, 2019

(65) Prior Publication Data
US 2021/0245787 A1    Aug. 12, 2021

Related U.S. Application Data

(60) Provisional application No. 62/624,045, filed on Jan. 30, 2018, provisional application No. 62/586,033, filed on Nov. 14, 2017.

(51) Int. Cl.
*B61B 7/00* (2006.01)
*B60T 1/06* (2006.01)
(Continued)

(52) U.S. Cl.
CPC .................. *B61B 7/00* (2013.01); *B60T 1/06* (2013.01); *B60T 7/12* (2013.01); *B61H 9/02* (2013.01)

(58) Field of Classification Search
CPC ......... B61B 7/00; B61B 12/02; B61B 12/026; B61B 12/122; B61B 15/00; B60T 1/06;
(Continued)

(56) References Cited

U.S. PATENT DOCUMENTS 575,528 A    1/1897  Smallwood
639,240 A   12/1899  Hutchinson
(Continued)

FOREIGN PATENT DOCUMENTS

CH        301326 A    8/1954
CN     101357637 A    2/2009
(Continued)

OTHER PUBLICATIONS

Supplementary European Search Report EP18878825. dated Aug. 5, 2021. European patent Office.
(Continued)

*Primary Examiner* — S. Joseph Morano
*Assistant Examiner* — Heaven R Buffington
(74) *Attorney, Agent, or Firm* — Holzer Patel Drennan

(57) ABSTRACT

Trolley systems and associated rails and tracks may include trolleys having an integrated brake system that can be adapted to slow or stop the trolley based on various control inputs (internal or external). The track system may be formed from either or both of a series of tensioned cables or tracks that are interconnected with transition system and the trolleys, able to transition between track systems. The track system may be fitted with additional braking elements to govern motion of the trolley along a track system. Additionally, the track may be fitted with other elements that (Continued)

provide an external input into the trolley to modify the braking operation of the trolley.

25 Claims, 60 Drawing Sheets

(51) Int. Cl.
    *B60T 7/12*     (2006.01)
    *B61H 9/02*     (2006.01)

(58) Field of Classification Search
    CPC .. B60T 7/12; B61H 9/02; A63G 21/22; F16D 63/008; H02K 49/04; E01B 25/16; E01B 25/18
    USPC .......................................................... 104/91
    See application file for complete search history.

(56) References Cited

U.S. PATENT DOCUMENTS

| | | | |
|---|---|---|---|
| 680,901 A | 8/1901 | Ward et al. | |
| 1,086,227 A | 2/1914 | Schilling | |
| 1,206,581 A | 11/1916 | Opsal | |
| 1,331,622 A * | 2/1920 | Carstarphen | B61B 12/02 414/382 |
| 2,140,585 A * | 12/1938 | Lloyd | E01B 25/18 104/87 |
| 2,198,536 A | 4/1940 | Fredrik et al. | |
| 2,266,522 A * | 12/1941 | Vogel | E01B 25/18 104/125 |
| 2,547,935 A | 4/1951 | Philip | |
| 3,353,503 A | 11/1967 | Pettit | |
| 5,094,171 A | 3/1992 | Fujita | |
| 8,302,537 B2 | 11/2012 | Quattlebaum | |
| 8,640,627 B1 * | 2/2014 | Perry | A63G 21/20 472/49 |
| 2009/0038499 A1 | 2/2009 | Morris | |
| 2010/0300322 A1 | 12/2010 | Cylvick | |
| 2011/0083577 A1 | 4/2011 | Tilley | |
| 2011/0239898 A1 | 10/2011 | Brown | |
| 2013/0098260 A1 * | 4/2013 | Creissels | B61B 7/06 104/112 |
| 2013/0125776 A1 | 5/2013 | Perry | |
| 2013/0327242 A1 | 12/2013 | Bernier | |
| 2014/0311376 A1 | 10/2014 | Brannan | |
| 2015/0135983 A1 | 5/2015 | Halliday et al. | |
| 2017/0120935 A1 | 5/2017 | Reese et al. | |

FOREIGN PATENT DOCUMENTS

| | | | | |
|---|---|---|---|---|
| CN | 106394566 A | 2/2017 | | |
| GB | 115179 A | 5/1918 | | |
| JP | S54169781 U | 11/1979 | | |
| JP | 3233960 B2 * | 12/1991 | ............. | B61B 12/02 |
| JP | H05131920 A | 5/1993 | | |
| JP | 3233959 B2 | 6/1993 | | |
| JP | H05162636 | 6/1993 | | |
| KR | 20110011702 A | 2/2011 | | |
| KR | 101377692 B1 | 3/2014 | | |
| WO | 2015110781 A1 | 7/2015 | | |
| WO | 2016191884 A1 | 12/2016 | | |

OTHER PUBLICATIONS

Intellectual Property Office India Examination Report dated Mar. 14, 2022. Application No. 202027020457.

Aerial Ropeway Editorial Photograph; Image of Engineering, 2007.

Wallis-Tayler, A.J. , "Aerial or Wire Rope-Ways : Their Construction and Management", C. Lockwood, 2011, 50-51.

National Intellectual Property Administration, RPC, Search Report issued in corresponding foreign application No. 2018800865474., Aug. 25, 2022.

European Patent Office, European Search Report, dated Jun. 21, 2023, from corresponding European application No. 23170604.5.

* cited by examiner

TROLLEY SYSTEM AND ASSOCIATED RAILS AND TRACKS

TECHNICAL FIELD

Described herein are improvements in trolley systems and associated rails and tracks. More specifically, the trolley may have an integrated brake system that can be adapted to slow or stop the rider based on various control inputs (internal or external). The track system may be formed from either a series of tensioned cables or tracks that are interconnected with a transition system. The trolley and track may be designed to integrate and allow the trolley to transition from one section, across the transition elements, onto the next section. The track system may be fitted with additional braking elements to retard the motion of the trolley. Additionally, the track may be fitted with other elements that provide an external input into the trolley to modify the braking operation of the trolley.

BACKGROUND ART

Trolley designs such as those used for ziplines and associated tracks and cables are known. Generally these are pulley mounted trolleys, the pulleys resting on top of a cable or otherwise aligned with a rail and the rider is suspended beneath the cable/rail and trolley. The trolley runs along the cable/rail and may be slowed or stopped before a termination point or when a predetermined velocity is reached.

Art zipline systems are relatively simple in design running in a single vector from one point to another before unloading.

Brake systems used in the trolleys are largely passive and unmodulated hence a heavier rider tends to move faster than a lighter rider and rider weight must fall within a safe operating zone to avoid too much speed being gathered up or over riding of the brake system.

Further, since the brake is a passive brake and little adjustment is possible, only a single speed e.g. a single maximum speed, may be pre-set and this cannot be altered during a run for example to alter the rider speed along a zipline ride.

Finally, rides are limited to a single direction where a cable is used and limited to generally shortened durations where a rail is used.

As may be appreciated, it may be of benefit to a rider and ride operator to allow for cornering on a single ride, transitions between rails and cables, transitions in the governed speed and the possibility of having multiple riders on a single run yet providing for all of the necessary safety features and redundancies essential to trolley operation. As should be appreciated, recreational zipline applications are one possible application for the trolley and other aspects described however, other applications such as emergency evacuation applications may also be important commercial uses for such trolleys and associated tracks and cables.

The trolley systems and associated rails and tracks described herein attempt to address at least some of the above drawbacks or at least provide the public with a choice.

Further aspects and advantages of the trolley systems and associated rails and tracks will become apparent from the ensuing description that is given by way of example only.

SUMMARY

Described herein are improvements in trolley systems and associated rails and tracks. More specifically, the trolley may have an integrated brake system that can be adapted to slow or stop the rider based on various control inputs (internal or external). The track system may be formed from either a series of tensioned cables or tracks that are interconnected with a transition system. The trolley and track may be designed to integrate and allow the trolley to transition from one section, across the transition elements, onto the next section. The track system may be fitted with additional braking elements to retard the motion of the trolley. Additionally, the track may be fitted with other elements that provide an external input into the trolley to modify the braking operation of the trolley.

In a first aspect, there is provided a trolley system configured to fit to and optionally detach from a track system that the trolley system is configured to traverse, the trolley system comprising:
  a body,
  a portion of the body configured to be linked to an object,
  wheels, and
  an integrated brake system that imposes a brake force on a trolley wheel or wheels, the wheel or wheels transferring radial and lateral loads between a track and trolley body and if present, an object linked to the trolley.

In a second aspect, there is provided a track system configured to convey at least one trolley system substantially as described above.

In a third aspect, there is provided a system control configured to sense at least one aspect of at least one trolley system substantially as described above.

In a fourth aspect, there is provided an amusement ride comprising at least one trolley system substantially as described above.

In a fifth aspect, there is provided a safety and emergency egress comprising at least one trolley system substantially as described above.

In a sixth aspect, there is provided a goods and materials transportation system comprising at least one trolley system substantially as described above.

In a seventh aspect, there is provided methods of transferring a trolley system substantially as described along a track system and modulating braking of the trolley system based on at least one input signal.

BRIEF DESCRIPTION OF THE DRAWINGS

Further aspects of the trolley systems and associated rails and tracks will become apparent from the following description that is given by way of example only and with reference to the accompanying drawings in which.

DETAILED DESCRIPTION

Figure 1:
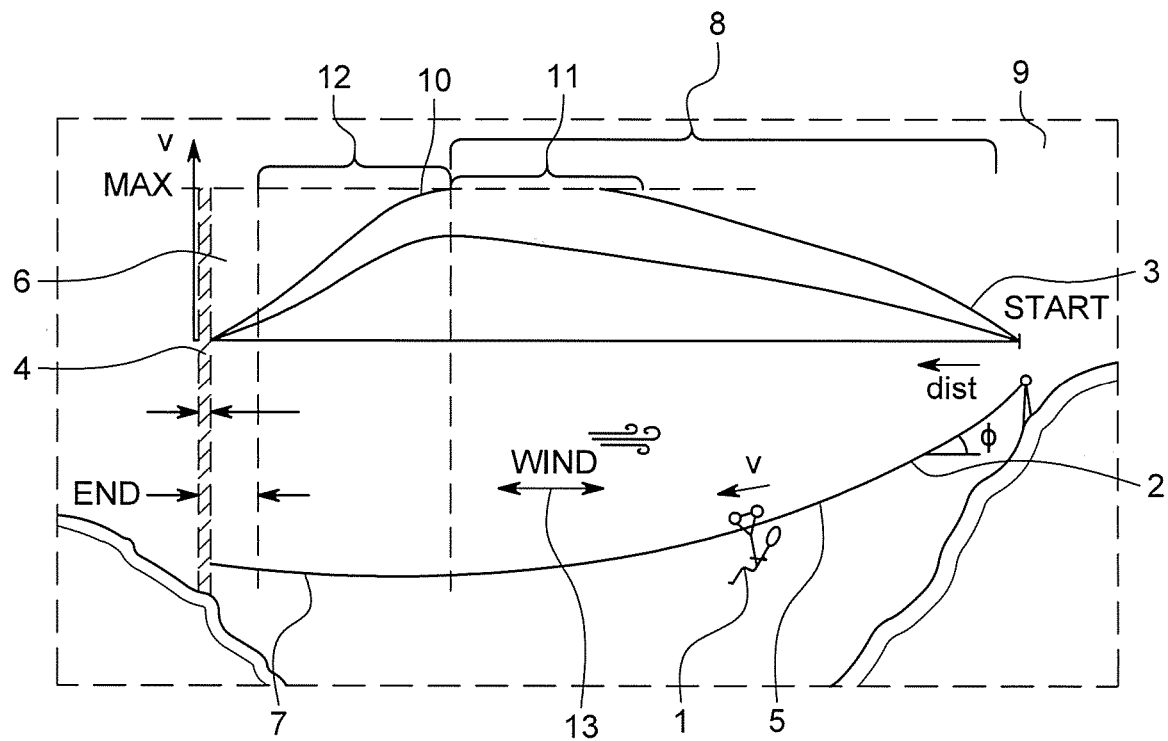
FIG. 1 illustrates an embodiment of a potential zipline application.

As noted above, described herein are improvements in trolley systems and associated rails and tracks. More specifically, the trolley may have an integrated brake system that can be adapted to slow or stop the rider based on various control inputs (internal or external). The track system may be formed from either a series of tensioned cables or rails that are interconnected with a transition system. The trolley and track may be designed to integrate and allow the trolley to transition from one section, across the transition elements, onto the next section. The track system may be fitted with additional braking elements to retard the motion of the trolley. Additionally, the track may be fitted with other elements that provide an external input into the trolley to modify the braking operation of the trolley.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The terms 'track', 'cable', 'line', 'rail', or 'transition' and grammatical variations thereof refers to any form of guiding means creating a predefined path for an external element such as a movable object or trolley connected to the guiding means to follow.

The terms 'line' or 'cable' and grammatical variations thereof unless otherwise stated refer to generally linear predefined paths for an external element connected to the guiding means to follow. The form of the line or cable may have a natural curvature in a vertical plane, e.g. a catenary profile shape, when subject to gravitational loads, and environmentally applied loads, such as wind, ice, and snow. Additionally these elements may exhibit flexibility along their length.

The terms 'rail' or 'track' and grammatical variations thereof unless otherwise stated refer to may be linear or non-linear or combinations of linear and non-linear predefined paths for an external element connected to the guiding means to follow. Such elements are generally considered rigid in their form.

The term 'track' or 'track system' and grammatical variations thereof as used herein may refer interchangeably to cables, rails, transitions or other guiding means.

The term 'trolley' and grammatical variations thereof refers to a movable object of which the motion is guided by a track or cable (guidance means). The trolley may be configured to transport an attached payload.

The term 'brake' and grammatical variations thereof refers to a means to retard the motion of, or provide a holding force on a movable object.

The term 'signal' and grammatical variations thereof refers to a means of communicating between two elements for the purpose of influencing operation or transferring information between elements. A signal may be internal within an object, or be external between elements. This may include electrical control signals, GPS signals, etc.

The term 'wheel' or 'wheels' and grammatical variations are referred to in this specification however, as noted above, the wheel may be another rotating component such as sheaves or casters and may also be a linear component such as a carriage or slide. Reference to the term 'wheel' or 'wheels' unless otherwise specified should not be seen as limiting and may incorporate other rotating components or linear components.

In a first aspect, there is provided a trolley system configured to fit to and optionally detach from a track system that the trolley system is configured to traverse, the trolley system comprising:
- a body,
- a portion of the body configured to be linked to an object,
- wheels, and
- an integrated brake system that imposes a brake force on a trolley wheel or wheels, the wheel or wheels transferring radial and lateral loads between a track and trolley body and if present, an object linked to the trolley.

In a second aspect, there is provided a track system configured to convey at least one trolley system substantially as described above.

In a third aspect, there is provided a system control configured to sense at least one aspect of at least one trolley system substantially as described above.

In a fourth aspect, there is provided an amusement ride comprising at least one trolley system substantially as described above.

In a fifth aspect, there is provided a safety and emergency egress comprising at least one trolley system substantially as described above.

In a sixth aspect, there is provided a goods and materials transportation system comprising at least one trolley system substantially as described above.

In a seventh aspect, there is provided methods of transferring a trolley system substantially as described along a track system and modulating braking of the trolley system based on at least one input signal.

The above aspects are now described in more detail below.

Trolley Generally and Applications

As noted elsewhere in this specification, described herein in one embodiment is a trolley and separate track system that may be used separately or together. The trolley and separate track system may have multiple applications, but common applications may include the use in amusement rides, safety and emergency egress, and the transportation of goods and materials. While it is envisaged that the system is primarily used for applications with a loss of elevation (primarily downhill) with unpowered trolleys it may be envisaged that the system also has application with elevation gain (primarily up hill) as well as on relatively flat or undulating ground. The system as discussed below primarily uses unpowered trolleys and tracks, however alternative powered embodiments may also be used.

One advantage of the trolley system design described herein is that the track system comprises at least one cable and at least one rail and the same trolley system may traverse both cable and rail sections. By contrast, art devices are typically designed to cater only cable or rail systems and not both. The trolley systems described herein may therefore be considerably more versatile than art systems.

Zipline Specific Description

An application envisaged for the use of the system may be in the amusement industry, whereby individuals or groups transition from an elevated higher position to a lower position. This is commonly completed with patrons (also called riders) attached to a trolley, cart, car, wagon, or the likes, and who ride down a cable, track, rail, or the like. The activity may be completed by an individual or in groups (more than one person). As noted above, the activity may not always operate from a higher position to a lower position, but may also work in generally uphill, flat, undulating, or any combination of the above configurations. One potential application could utilise having an individual rider on a tensioned cable in a generally downhill orientation although this should not be seen as limiting. This application is commonly referred to as a 'flying fox' or 'zipline'. The term zipline is generally used hereafter.

Zipline General Description with Ref to FIG. 1

FIG. 1 illustrates an embodiment of a potential zipline application. As illustrated, an individual (rider) 1 may traverse down a tensioned cable (zipline) 2 from the start 3 to the end 4. The cable 2 may have a general downward slope (the start 3 is higher than the end 4). The rider 1 is fastened to a trolley 5, which in turn is attached to the cable 2. As the rider 1 traverses the line 2 along a free ride section 8, they generate a velocity and acceleration (whereby acceleration is defined as a change in the velocity of the rider 1). The velocity generated by the rider 1 is a function of numerous factors including the slope of the line 2, the weight of the rider 1, the rolling resistance of the trolley 5 on the line 2, the aerodynamics of the trolley 5 and rider 1, gravity, wind speed, and wind direction. A larger number of these factors are variable and may change as the rider 1 traverses the cable 2 thereby affecting the velocity in a dynamic manner. The influence of rider 1 weight on velocity is also shown in FIG. 1 where the velocity profile of a heavy rider 9 is graphed alongside the velocity profile of a light rider 10. In some circumstances such as for a heavy rider, there may be a zone of maximum speed control 11 to avoid an overspeed scenario. There may be a braked section 12 after the freeride section 8 and as noted above a terminal braking zone 7 and narrow stopping zone 6. The velocity profile changes along the ride and as shown in the graph, the profile differs depending on rider weight. Another influence on rider 1 velocity profile may be the presence of a head or tail wind 13.

In the application shown in FIG. 1 the ideal outcome is that the rider reaches the end 4 point and is bought to a complete stop in a safe manner within a relatively short distance 6. Ideally this could occur for all riders 1 on all traverse conditions. However, the variables influencing the velocity of the riders 1 make this difficult and unlikely to occur.

Slowing and Stopping at the Terminal Location

Slowing down and stopping at a terminal location (see 7 in FIG. 1) in the art is typically achieved using a braking mechanism that is attached to the cable. When the trolley approaches the slowing/stopping location the trolley interacts with the external braking mechanism and slows the rider in a controlled manner allowing the trolley and rider to achieve a zero velocity (stop). This braking function must be achieved in a controlled manner so as to prevent injury to the rider through excessive deceleration forces or altering the rider trajectory such that they come into contact with a stationery object or the cable. Additionally, the external braking systems have to allow for a broad range of arrival speeds and forces present from different riders. For example, the maximum velocity achieved by a lightweight rider with adverse environmental conditions or using a trolley with high rolling resistance will have a lower maximum speed than a heavier rider with a tail wind and a trolley with low rolling resistance. The lightweight rider may not travel to the optimal landing location and may require rider retrieving from the cable at an unwanted or unsafe location. For the heavy rider with tail wind conditions, or with a trolley with low rolling resistance, they may achieve an excessively large velocity and approach the landing location with an unsafe velocity or with excessive arrival force. This may result in exceeding the operational parameters of the external braking mechanism, which could cause injury or death.

In the above scenarios, the operator of the activity may have to limit the range of operation of the system so as to prevent these undesirable conditions such as weight ranges, weather restrictions, needing a high maintenance frequency etc. This reduced throughput impacts the commercial viability of a business operation in an unfavourable way.

A lack of compatibility in existing zipline systems used is a common issue for the use of external braking mechanisms particularly about the terminal end region of a ride. Additionally, the external braking mechanism is most typically a stationary object that is impacted by the rider's trolley and accelerated to match the speed of the rider's trolley before applying a sufficient braking force to slow the rider down to bring them to a stop. This rapid acceleration of the braking mechanism creates a high inertial force (due to the momentum of the braking system). This inertial force is applied to the trolley and may result in an excess force spike or spikes being applied to the trolley or rider. The trolley system described herein does not require an external brake system particularly at the terminal location.

Art rides also rely almost or entirely on the terminal brake to slow the rider. Mid-span braking is not used or not used in a controllable manner.

Variable Integrated Brake System on the Trolley

The trolley and associated details described herein may resolve the above issues and may provide increased safety for the rider along with operational simplicity. The trolley system may use a rider trolley system with a variable brake system integral to the trolley. It may be appreciated that the brake system could take various forms, non-limiting examples including (in isolation and in combinations):

Friction drum brakes;
Friction disc brakes;
Viscous fluid brake;
Eddy current brake;
Magnetic brakes;
Electromagnetic brakes; and
Regenerative braking.

Brake Activation at a Threshold and Input Signals

The integrated brake system may be designed to firstly remain either fully or partially non-functional until the trolley exceeds a predefined threshold after which the brake system is activated. It is envisaged that the predetermined thresholds may be from an input/activation signal based on changes in distance, velocity, acceleration, force, or jerk (change in acceleration). Other forms of input signals may also be used to control integrated brake system activation.

Signals Internal to Trolley or External or Both

Additionally, the input signal for activation of the brake system could be achieved by an input/activation from within or integral to the trolley or via an external signal provided to the trolley, or both (either separately or in combination).

Effect of the Signal and Braking Onset

Once activated, the integrated brake system may be controlled to apply sufficient braking to the trolley to achieve the desired result. In the zipline example used previously, this activation may be to control the speed of the trolley to a predefined limit. Alternatively, activation could also be used to bring the trolley to a complete stop within a predefined distance or within acceptable acceleration limits, or a combination of the two.

Brake Modulation

The integrated brake system may have a modulating mechanism that allows changes in braking force to be applied to the trolley system as the trolley system traverses the track system. It is envisaged that the trolley and the associated integrated brake system could perform different functions when activated by different input signals. For example, in the zipline example used previously, it is envisaged that brake system could be initially disengaged or have limited engagement. When the speed of the trolley reaches an allowable upper threshold (maximum speed threshold), the brake may be engaged to a desired power level to maintain the speed of the trolley at this upper speed limit. In this configuration, the brake may modulate the braking power applied to adequately maintain the speed at the desired level depending on selected input parameters. Equally, the brake system may be configured to achieve any other form of functionality, such as: slowing acceleration of the trolley; bringing the trolley down to a desired speed threshold level; to bring the trolley to a complete stop; other combinations that result in a change in the speed or acceleration of the trolley.

Modulation Automatic and Dynamic

Modulation of the brake system may occur automatically and be dynamically adjusted. For example, input parameters influencing the speed of the trolley will also be changing dynamically and these may be used to interact with and dynamically change the braking performance. More detail is described below around brake activation and modulation of the brake once activated.

Brake Resets

For the above application, the brake system may be provided with the functionality of resetting once the task of the brake has been achieved. This resetting function could result in the complete disengagement of the brake system, or a change in the requested functionality of the brake system. Once reset, the brake system could have the ability to be re-engaged in a previous mode should the speed again exceed the allowable maximum speed threshold.

For the example shown in FIG. 1, a trolley system with the modulated braking functionality described in the example above could be ideal for the first stage shown (namely from the start to the end of the free ride section). This form of functionality could ensure that speeds of riders with a slow velocity are not slowed with unnecessary braking and also so that riders that could achieve excessive velocities are restrained to a velocity level that is considered acceptable.

Input/Activation Signal Details

It is also envisaged that the brake system in the trolley system(s) could be engaged into different braking modes through the use of different input/activation signals. The various means to activate and modulate a brake system response are described in more detail below. The input/activation signal(s) could be internal or integral to a trolley system or alternatively, externally applied to a trolley system. For example, in a zipline application, it may be desirable to have different maximum allowable speeds at various locations along a cable. This is shown in FIG. 1, whereby the maximum allowable speed in the free ride range may be set higher than what is an acceptable speed into the terminal braking zone. For this application, once the trolley system exits the free-riding zone the brake system may be engaged into a higher power mode via a signal, which reduces the maximum allowable speed for all riders to the acceptable entrance speed.

It is also envisaged, that the brake system in the trolley system could be engaged into a further mode that allows the trolley system to be slowed completely and brought to a complete stop. This mode could be activated as an emergency stopping mode or used as a means of stopping the trolley in the terminal braking zone. It is envisaged that this mode of braking could be engaged from a further signal, generated internal or integral to the trolley or externally applied to the trolley.

Modulation Controls

As may be appreciated, a brake system with a modulating power output could be controlled in numerous ways and could be asked to form numerous functions. It should further be appreciated that different means of activating a braking mode, both within or integral to the trolley and from external signals may also be completed. The examples used above should not be seen as limiting to the number of braking modes possible, the means of activating the braking modes, or the interactions between the braking modes.

Multiple Trolleys on a Track System at Once

Applications may also exist whereby it is beneficial to allow multiple trolleys onto a cable or track system at the same time. Examples of this application could include the emergency egress of multiple people from a high-rise building or from an oil platform. Existing trolley systems may not be used for this application as they do not have the ability to be externally signalled and bought to a stop should an incident occur, or signalled to slow down or speed up so as to prevent impacts between different riders. For existing trolleys, it is only safe to have a single person on the line at a time, thereby restricting their use for these forms of applications. This limits the potential for these existing systems to be used in this application. The trolleys described herein allow multiple riders onto a single cable or track. Each trolley may be individually signalled to adjust the internal braking system so as to avoid collisions. Likewise, all trolleys could be signalled to come to a complete stop should an emergency occur. This is a considerable advantage and allows the system to be used in alternative applications to existing systems.

The ability to have multiple riders on a single track or cable may also be very beneficial for amusement ride applications like mountain coasters, zip coasters and luge style rides; namely rides whereby patrons ride individual carts down concrete paths or tracks and have the ability to control (to a certain degree) the speed and/or the orientation of their own cart. The ability described herein to limit the potential for collisions between carts by automatically adjusting the braking applied to each cart and the ability to stop all carts should there be an emergency allows a greater throughput on the ride, with riders at closer proximity and with an increased level of safety.

In alternative embodiments, there may be provided signalling means within or connected to the track, which may send information or control aspects of the trolley movement as it traverses the track. For example, a signal may be sent to one or more trolleys to slow or stop at certain locations on the track. Slowing may be effected by selective operation of a braking system within the trolley, or located on the track. Other embodiments may contemplate using a signalling means as set out elsewhere within this specification.

Other Applications

Figure 2:
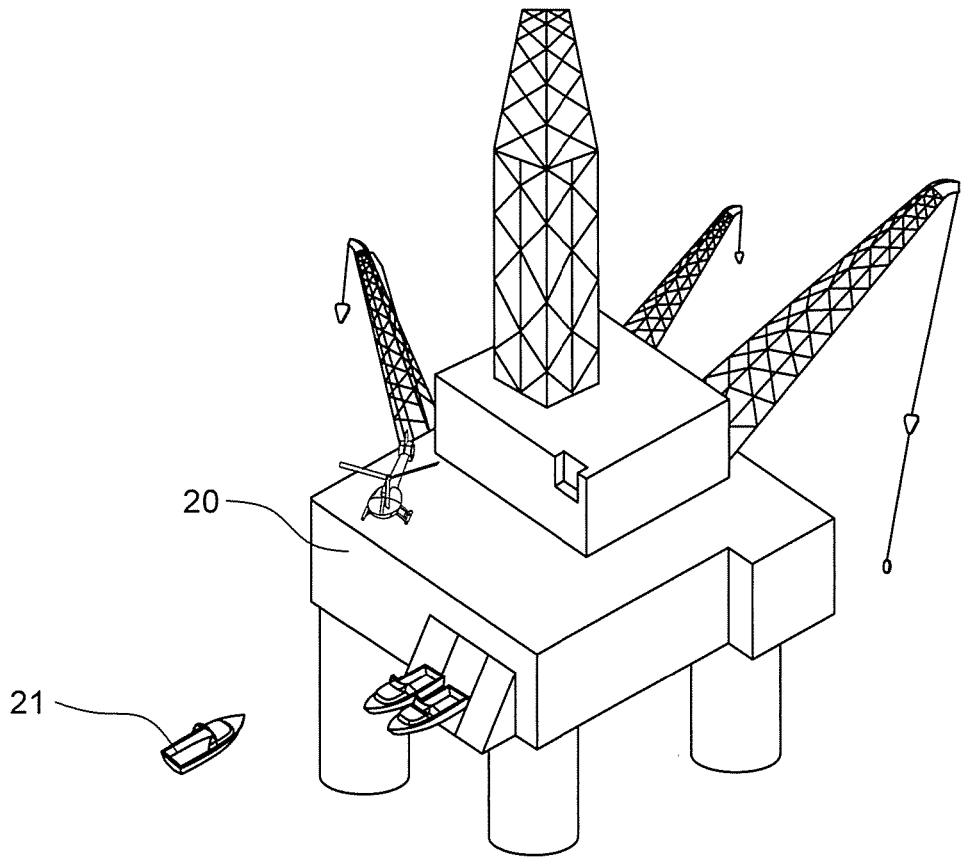
FIG. 2 illustrates an alternative embodiment of a potential industrial egress zipline application.
Figure 3:
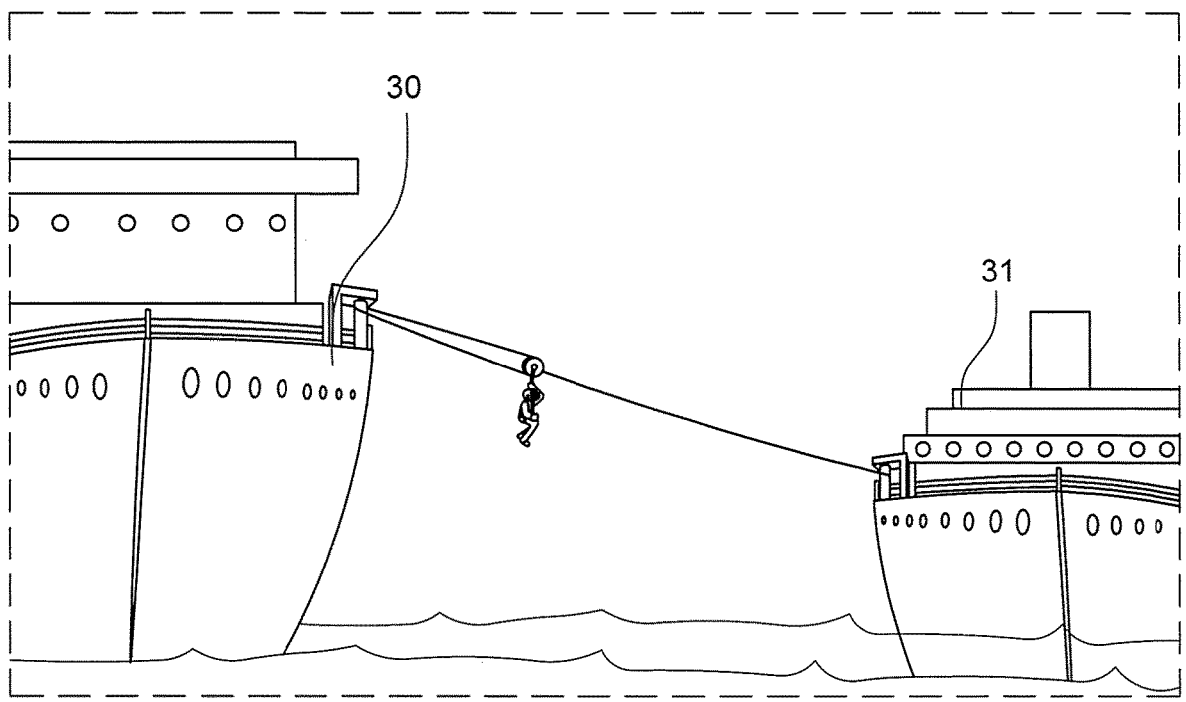
FIG. 3 illustrates an emergency evacuation application where the slope and sag of the cable could vary considerably.

Additionally, the trolley system described herein may be adaptable for a wide range of input parameters. This allows it to be used in unique applications where the inputs may vary significantly. One such example is transferring people from an oil platform 20 to a ship 21 as shown in FIG. 2 or from one ship 30 to another ship 31 as illustrated in FIG. 3. The relative location of the platform 20 and ship 21 or two ships 30, 31 could vary considerably as they are both floating. As such the shape and slope of any cable fixed between the two will also likely vary considerably. The system described herein could be used in this ship application to be configured so that the internal brake system adjusts the braking capacity to maintain a safe maximum velocity for all riders, provide the necessary terminal braking to bring the riders to a stop in the desired location and ensure a safe minimum level of separation between multiple riders on the system.

How the Internal Brake is Coupled to the Trolley—Wheels but Other Options Too

The manner in which an internal brake system may be integrated into the device is dependent on the device and the desired application. The brake system and the trolley system rotating components such as a wheel or wheels may be directly or indirectly rotationally coupled. For applications where the device has rolling or rotating components (wheels, sheaves, casters, etc) it is common to rotationally couple the brake system to the rotating component and use the braking system to retard the rotation. The coupling may be direct or indirect as noted such as via a secondary element that may include a clutch or transmission or belt or chain drive. In selected embodiments, the trolley system may have at least two wheels above the track system and at least one wheel below the track system.

For some applications, the brake system may act upon on a separate component, which in turn retards the motion of the device. Examples of this may include the provision of an additional wheel or caster where the primary function of the component is to retard the motion when coupled to the brake. Equally someone skilled in the art will see the potential for other forms of brake application that do not require rotating elements, such as the use of skid plates or linear eddy current braking systems.

Wheels/Castors

For the purpose of this specification, the brake system is described as being directly coupled to a wheel or a castor, however this should not be seen as limiting since other designs may be possible as noted above. A main function of the wheel or wheels may be to transfer radial and lateral loads between a track and trolley body and object linked to the trolley such as a rider.

Figure 60:
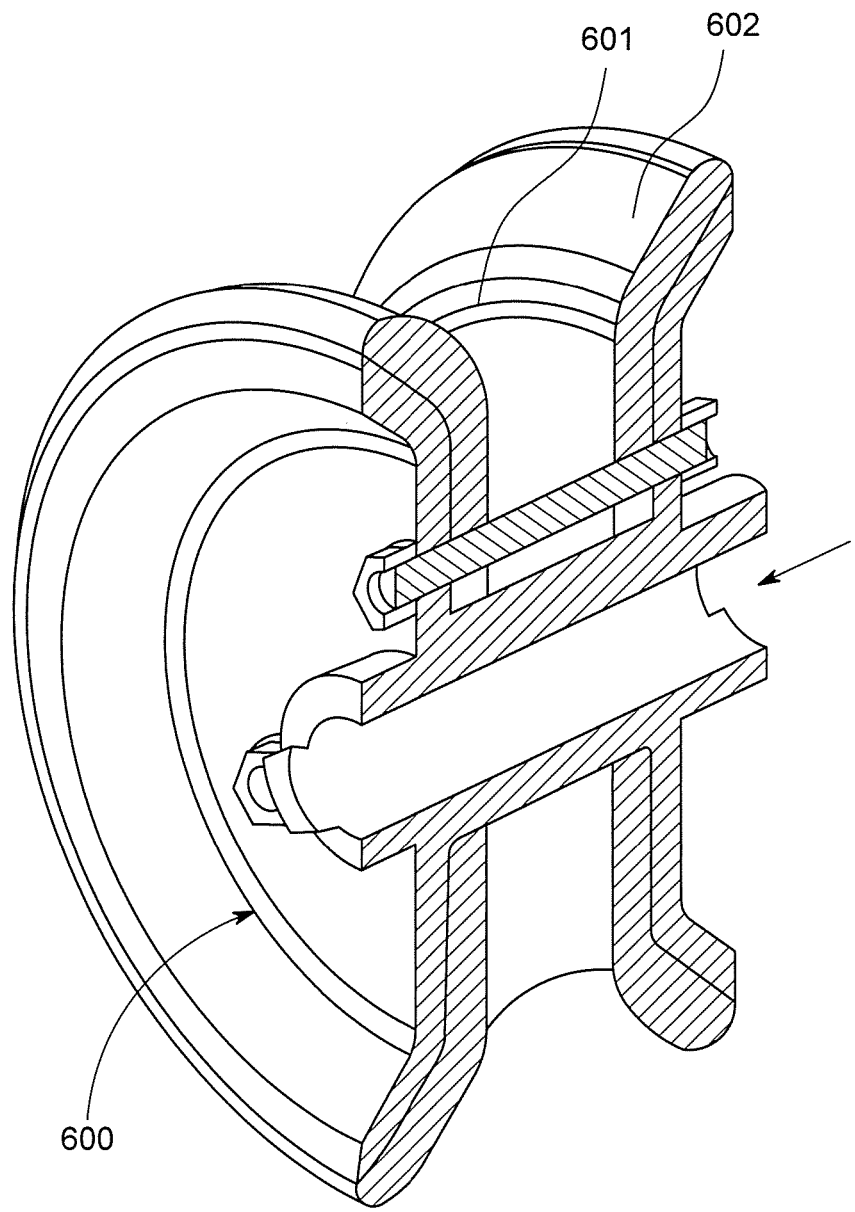
FIG. 60 shows a perspective cross-section view of the hybrid wheel.

Reference is made hereafter to a wheel (see FIG. 60) as seen when the zipline trolley is viewed side on. Each 'wheel', when viewed side on, may comprise a set of two wheels aligned coaxially, and the guiding means passes between or to one internal side of the wheels. A pulley may alternatively be used to achieve a similar function and reference to a wheel or wheels should not be seen as limiting.

Specifically, when applied to a zipline trolley, the trolley brake may be coupled to at least one of the wheels and may act to retard the rotation of the wheel when activated. Coupling between the brake and wheel may be achieved in various manners mechanically in some aspects such via drive cogs or other interlinking linkages (e.g. belts or chains) between the brake and wheel(s). The brake system may be coupled to a plurality of the trolley system wheels.

As should be appreciated, the wheel in this embodiment must provide enough traction to transfer braking torque imposed on the wheel to the track system to cause trolley braking. Despite braking being important in this configuration, equally important is to minimise rolling resistance of the wheels under non-braked operation to allow free movement of the trolley when braking is not imposed.

At least one of the trolley system wheels may be generally round in diameter with a dish profile and flanges extending out from the dish profile. The dish profile may be configured to receive a cable and/or at least part of a rail therein, the flanges extending about cable or rail sides when the at least one wheel traverses a cable or rail.

Each trolley system may have at least two wheels located in series on the trolley that fix to the track system from above and these upper wheels provide the main support as the trolley system traverses a track system. Each trolley system may have at least one wheel located on the trolley system generally below the cable or rail position in the trolley system and below the upper wheels. The lower wheel(s) may act to direct the trolley system from below the cable or rail during aspects of trolley system movement and act to help with retention of the trolley system on the cable or rail.

In one embodiment, the trolley may have a relatively short upper wheel base, namely the distance from the first wheel to the last wheel may be sufficiently short that any curvature in the cable or rail does not impose sufficient side forces on the trolley wheels to cause the wheels to derail from the cable or rail. This allows the trolley to turn tight radius corners without the concern of derailment. Derailment may occur when the relative angle of entry of the cable or track into the wheels is sufficiently large so as to start riding up the sidewall of the wheel.

The wheels may have a relatively deep profile to accommodate a high degree of misalignment of the cable within the dish profile—that is, the dish profile may extend sufficiently deep to at least accept the cable within so that at least 50% of the cable diameter is located within the dish profile when the wheel(s) and a cable are connected. This deep profile may provide help to ensure a high degree of overlap between the braked wheel and front wheel around the cable when applied in such a braked trolley configuration.

The trolley wheels may in one embodiment have an elliptical form which may allow the wheel to climb over slightly larger diameters as required, without seizing on wheel side flanges. This form may also ease cornering of the trolley by allowing a degree of side-to-side movement. The wheels may be coated with an elastomer layer that may absorb energy, aid traction, reduce noise and/or increase material longevity or service life of the components.

Hybrid Material Wheels

In one embodiment, at least one wheel may utilise a hybrid material design comprising use of at least two varying materials of differing hardness and coefficient of friction one material located about a wheel base and the other material located about the internal sides of the wheel that surround at least part of the track system sides. In a further embodiment, the materials for the wheel may include a material of graduated hardness and/or coefficient of friction.

Figure 59:
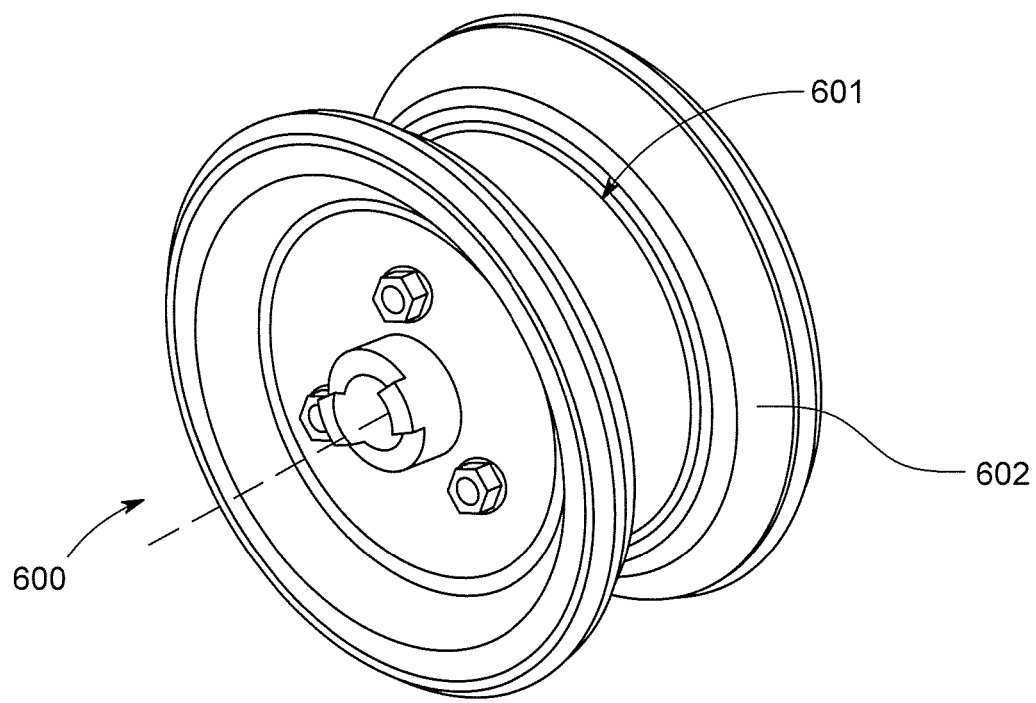
FIG. 59 shows a perspective view of a hybrid wheel.

Typically, compounds used to manufacture wheels such as those used in zipline applications are made from variants of polyurethane. Polyurethane is a plastic useful in linear rolling systems due to the material being somewhat soft but still hard wearing for rolling resistance applications along a cable or track material and a coefficient of friction that allows for effective braking and minimises unwanted slipping. Cornering of zipline trolleys such as that further described below may place unusually high demand on the wheel sides or flanges due to different rolling velocities between the base sheave diameter and the flanges. This different movement causes a shear stress on the wheel surface instead of a rolling stress. Polyurethane in this instance is not sufficiently durable when subjected to shear stress in the trolley systems described herein and degradation of the wheel walls may occur due to shear stress generation. One embodiment to address shear stress is that shown in FIG. 59, which shows a perspective view of a hybrid wheel 600, and FIG. 60, which shows a perspective cross-section view of the hybrid wheel 600. The hybrid wheel 600 may use a central section 601 of polyurethane to provide friction for braking, generally located about the rolling region of the wheel that in normal motion interfaces with a cable (not shown). For example, the hybrid wheel 600 may also comprise a different, relatively hard plastic material compared to polyurethane located at least about the flange internal sides 602 that is durable when subjected to shear stresses such as during a cornering motion of the trolley. The hard plastic material 602 may in one embodiment be polyethylene terephthalate or PETP although other materials of a suitable hardness and durability may also be used. The hybrid design could be manufactured by a sandwich assembly or by over-moulding of the polyurethane onto the hard plastic. The selection of materials and components in the profiles may be selected to achieve desired strain and shear compatibility of the wheel system and trolley system. The hybrid wheel 600 described may also have a skeleton manufactured from steel or aluminium to provide a central core. Fasteners may also be used to further increase the wheel flange strength and rigidity.

In further embodiments, the various components of the hybrid wheel such as the central and/or wall components and/or the main body or skeleton may be replaced by new components where for example the materials of the hybrid wheel become worn, damaged, or where different properties of the wheel system are required. These embodiments are particularly well-suited to trolley system wheels manufactured as a sandwich assembly, although other form of construction may also be suited to these embodiments. A method of replacing the hybrid wheel components includes removing the hybrid wheel from the trolley, separating the worn/damaged or otherwise selected components to be replaced from the hybrid wheel, replacing the selected component, and reassembling the hybrid wheel system.

Trolley and Track System Capture and Removal

Referring back to the zipline example (shown in FIG. 1), the zip trolley is required to be captured onto the cable and allow the rider to safely traverse the cable to the end. It is also common for the trolleys to be removed from the cable at the end of the ride and transported back to the start, where the trolley must then be safely reattached to the cable. Some systems (e.g. mountain coasters) may have a closed system whereby the trolley or cart is rarely removed from the track once installed.

Skidding Problem

For all braking systems that are applied from within the moving objects it is important to limit the ability of the braking system to skid on the surface over which they are traversing. Skidding may occur due to numerous factors, but is driven by a loss of traction between the rolling element and the surface over which it is rolling. Most commonly this occurs when the motion of the rolling element is retarded to a greater extent than the friction between the rolling element and the surface it is rolling on may accept. The friction that is generated between the two surfaces is a function of the normal force applied to the two elements (amongst other things). Thereby, maintaining a strong normal force favourably reduces the potential for skidding.

Side-to-Side Movement Problem

Aside from the above braking design considerations, a further important design consideration not necessarily dependent or related to braking, is to allow for at least some degree of side to side motion about the longitudinal axis of the rail or line on which the movable object or trolley runs. Side to side movement may be a natural movement caused by the rider attached to a trolley for example being moved about a corner or being moved due to cross winds and the like. Some degree of tolerance for this side-to-side movement may be important (as is the ability to correct excess side to side movement). Further, it may be important that, despite side to side movement, the movable object or trolley remains linked to the rail or line at all times.

Trolley Pivot Arm Wheel Brake Mechanism

In one embodiment, the trolley may have a pivot arm, one side of the pivot arm being configured to be linked to an object and the opposing side comprising a braking wheel, the braking wheel being urged by the pivot to bear on the cable or rail when braking is actuated.

Figure 4:
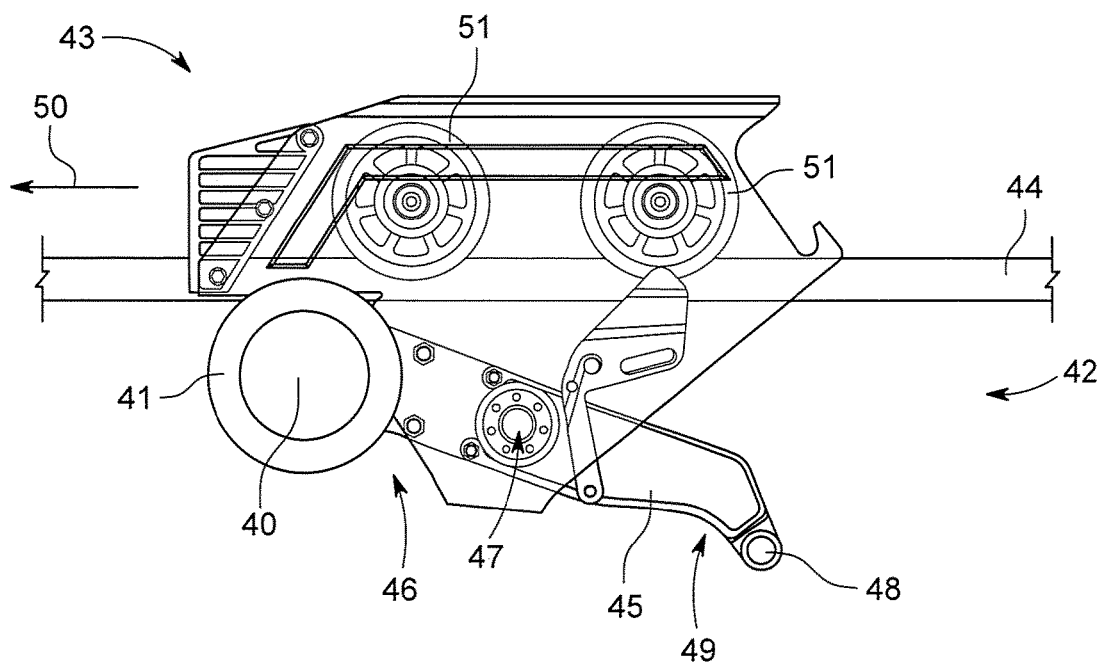
FIG. 4 illustrates a potential configuration of braking technology to trolley.

One potential configuration based on the above description is presented in FIG. 4. In this configuration, the brake 40 may be attached to a wheel 41 that is located to the underside (arrow 42) of the trolley system 43. This ensures the centre of mass of the trolley 43 is located below the cable 44 on which the trolley 43 rides thereby preventing the trolley 43 from tipping or rotating (inverting) on the cable 44 when the trolley 43 is unloaded.

As shown in FIG. 4 the brake 40 is attached to the trolley 43 via a pivoting arm 45. The brake 40 may be located on one side 46 of the pivot 47 and a rider 48 is attached to the other side 49 of the pivot 47. In this configuration, the weight of the rider 48 acts through the pivot 47 to apply a normal force to the brake 40, which forces the brake wheel 41 against the cable 44. The level of force that is applied by the brake wheel 41 to the cable 44 may be a function of the weight of the rider 48 and the relative distances between the attachment of the rider 48 and the braked wheel 41 from the pivot 47. Accordingly, the level of force exerted on the cable 44 by the brake 40/brake wheel 41 will be proportional to the weight of the rider 48. This provides considerable advantage as a heavier rider 48 will require additional pressure to be exerted on the cable 44 to minimise the potential for skidding.

Adjusting the relative distances between the pivot 47 and the attachment of the rider 48 and brake 40 or brake wheel 41 may allow the force exerted on the cable 44 by the wheel 41 to be modified. Placing the brake wheel 41 closer to the pivot 47 relative to the rider 48 attachment point will create a mechanical advantage and increase the force above that of the weight of the rider 48 attachment point. Increasing the distance relative to that of the rider 48, will reduce the force below that of the weight of the rider 48.

The brake wheel 41 on which the brake 40 is attached may also be located towards the front 50 of the trolley 43 or leading wheel(s) being the wheel(s) that move first along a rail or line 44. Firstly, this ensures that this brake wheel 41 receives any external input signals from the cable 44 prior to other wheels on the trolley. Additionally, as braking force is applied, the forces applied to the trolley 43 from any mass that is located below the cable (in this example a rider's 1 weight) will try swing forward into the direction of motion thus increasing the braking force. Locating the brake wheel 41 in a forward location allows this increased force to help with engagement of the wheel 41 on the cable 44 and limit the potential for skidding. For applications where the centre of mass of the system may be above the trolley 43, (like a rider in a cart above a track—not shown), then the centre of mass will try and move forward as the trolley system brakes and in this case it may be more advantageous to locate the brake wheel 41 to the rear of the trolley 43.

As drawn in FIG. 4 the pivot 47 may be located at a point evenly spaced between two upper wheels 51. When the system is not braking, both upper wheels 51 remain under load from the weight of the rider 1 and therefore track evenly along a cable 44 or rail (not shown). If it is more advantageous to have additional weight on a front wheel 51, the location of the pivot 47 may be moved towards the front wheel 51 location and the opposite may also be completed to increase weight on the rear wheel 51. It may be important to ensure that both wheels 51 retain some load. It is noted that keeping the pivot 47 located between the wheels 51 ensures that at least a portion of the rider 48 is transferred to the front and rear wheel 51, which may be important for functionality in certain applications. Placing the pivot 47 in front of the front wheel 51 changes the balance of loads and could result in the rear wheel 51 wanting to lift off the cable 44. It is noted that the ability to vary the pivot 47 to change the load balance between the wheels 51 may be an important consideration, which may be accommodated in this embodiment.

Furthermore, the brake wheel 41 may be located on the opposite side of the trolley 43 to the two upper wheels 51. As the trolley 43 proceeds down a cable 44 or rail (not shown), the rolling direction of the braked wheel 41 in this embodiment is in the opposite direction to the upper wheels 51. As shown in the FIG. 4 embodiment, the braked wheel 41 will rotate clockwise whereas the upper wheels 51 will both rotate anti-clockwise as the trolley 43 moves from right to left.

Another benefit from the configuration shown in FIG. 4 occurs when the trolley 43 interacts with any external systems that interfere with its motion. External systems that interfere may be a transition point on a cable 44, an input signal for the brake 40, or a terminal braking system. When the motion of the trolley 43 is slowed by an external system, the weight hanging below the system (e.g. a rider 48) will tend to swing forward thereby applying an additional normal force to the brake wheel 41 and providing an increased clamping force between the cable 44 and the brake wheel 41. This acts to prevent the trolley 43 from disengaging with the cable during the period of braking.

As drawn in FIG. 4, the location of the brake wheel 41 may be in close proximity to the adjacent (upper) wheel 51 located on the top of the cable 44. This close proximity ensures that any normal force (i.e. a force applied perpendicular to the longitudinal extent of the cable 44) applied to the cable 44 from the braked wheel 41 causes a pinching action on the cable 44 between these two wheels 51. This pinching action works to increase the clamping pressure of the trolley 43 on the cable 44 and limits the potential for the braked wheel 41 to skid relative to the cable 44 or rail (not shown).

Placing the braked wheel 41 on a pivoting member 45 as described above may have the following additional benefits:
  It allows the trolley to be simply added to and removed from the cable by creating an opening between the top and bottom wheels though which the cable may be removed;
  It allows the system to accommodate different sized cables and tracks by adjusting the size of the orifice between the underside of the top wheels and the top side of the braked wheel. This is a key requirement to allow the trolley to transition between different cable and track;
  It also may be a key provision for allowing the system to traverse over locations that provide external triggering elements to the brake system.

A pivoting arm (disposed on the trolley or track or other part of the track system) may be used as a signalling means, for example to signal a change in speed or braking modulation in accordance with pre-determined set points or parameters.

It will be appreciated that the foregoing are non-limiting examples and other methods may not require a pivoting arm to generate a signal.

Rigid Body Trolley

In an alternative embodiment, the trolley may comprise a rigid body, the cable or rail passing between the mid-section of the body so that the body fits over the rail or line with part of the body above the rail or line and part of the body below the rail or line, the body further comprising at least two spaced apart upper wheels that sit astride the cable or rail, the upper wheels may also be connected to a brake mechanism, and a lower wheel or wheels that are located on the lower section of the body beneath the cable or rail passing there through.

The above alternative zipline trolley 300 is illustrated in FIG. 29 to FIG. 32. In this embodiment the pivoting arm is replaced with a rigid body 301, the cable or rail passing between the mid-section 302 of the body 301 when viewed from a front-side or rear-side elevation (FIGS. 30 and 31) so that the body 301 fits over the rail or line with part of the body 301 above the rail or line and part of the body 301 below the rail or line.

In this embodiment, the trolley body 301 may be formed as an extrusion, moulded or by other means, an example shape being that shown in FIG. 53 to FIG. 56. An extrusion may be desirable to lower manufacturing costs and tooling however is not essential. The extrusion may be fitted with mating side elements, these elements providing options for additional strength, component attachment, mounting, and combinations thereof. In the embodiment shown in FIG. 53 to FIG. 56, the body 301 has a C-shape with an opening 530 therein that the guiding means passes through. The body 301 is made up of an upper 531 and lower body 532 section joined via supports 533 that sit astride the guiding means. As shown in FIG. 29 to FIG. 32 the body 301 further comprises at least two spaced apart upper wheels 303 that sit astride the guiding means and a lower wheel or wheels 304 that are located on the lower section of the body 301 beneath the cable or rail passing there through.

The rider attaches to the trolley body 301 about the lower body section 305, the attachment point shown as a larger circular opening towards the rear side of the zipline trolley 300 as shown in FIG. 53 to FIG. 56 and FIG. 29 to FIG. 32.

As noted above, the body 301 may comprise a lower wheel or wheels 304 located at the leading side of the trolley 301, the leading lower wheel or wheels 304 roughly aligned or sitting generally forward of the upper leading wheel 303, although configurations with alternate locations may provide the desired function and are within the scope of this disclosure. The term 'leading wheel' as noted earlier refers to the wheel(s) that travel first along the rail or line when the zipline trolley is in a normal operating movement of the trolley along the rail or line. In this alternative embodiment, the rider is attached to the zipline trolley at a point rearward of the leading lower wheel and to the lower section of the body zipline trolley body. During movement along a cable or line section, the lower wheel or wheels 304 may not touch the cable or line, being located sufficiently far from the upper wheels 303 to prevent touching. In the event of unusual motion of the trolley 300 or cable such as jumping or other up or down movement causing the upper wheels 303 to lift from the cable or line, the lower wheels 304 may be spaced close enough to the cable or line as to engage, at least temporarily, the cable or line and therefore prevent the zipline trolley from disengaging the cable or line. The lower wheel or wheels 304 may be used however to guide and govern or control movement of the zipline trolley when traversing a track or rail section. In this scenario, the tracks or rails are generally fitted around at least part of the cable or line leading to a great diameter or width top to bottom meaning the zipline trolley opening or gap between the leading upper 303 and lower 304 wheels at least needs to compensate for a larger spacing. The lower wheels 304 in this embodiment engage, or near engage, the lower side of the track or rails with the upper wheel or wheels 303 remaining engaged with the upper surface of the track or rails. As noted below, lead in and lead out sections may be used to assist with lower wheel engagement and disengagement.

As may be appreciated, in this alternative embodiment no pivoting arm is used and there is no pinching of the lower wheels or widening of the gap between the upper and lower leading wheels. The lower wheel or wheels may be used in this embodiment for the purpose of preventing excessive uplift and potential derailment of the trolley onto transition and rail sections described further below. The lower wheel or wheels also provide full capture of the trolley to the rail to prevent derailment when passing the transitions and rail elements of the system. The lower wheel or wheels may also assist with vertical plane alignment of the trolley preventing or limiting side-to-side movement. This may be important to avoid derailment and may also be helpful where track fins are used to align the trolley relative to the track fins (described further below).

Further Alternative Trolley

In a yet further alternative embodiment the trolley may have a rigid body or chassis with upper wheels and lower wheels, the upper wheels mating with a cable or rail and connected to a brake mechanism, the lower wheels opposing each other with an opening between the wheels sufficiently wide to allow a cable or rail between the opposing lower wheels, the lower wheels also being angled relative to the cable or rail so that one side of the wheel external face is configured to interfere and bear on a rail passing through the lower wheels.

Figure 76:
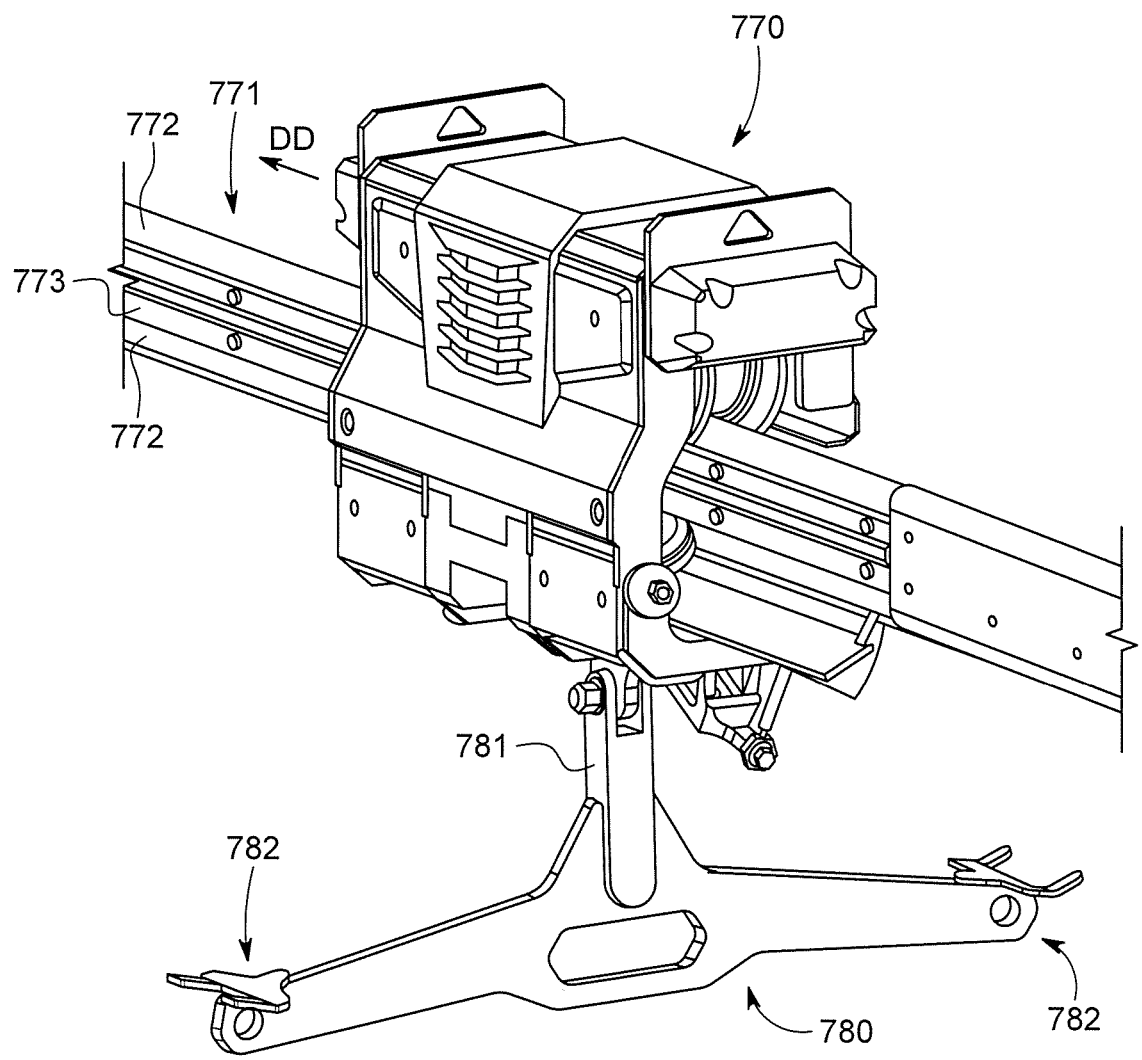
FIG. 76 illustrates a further alternative trolley embodiment.
Figure 83:
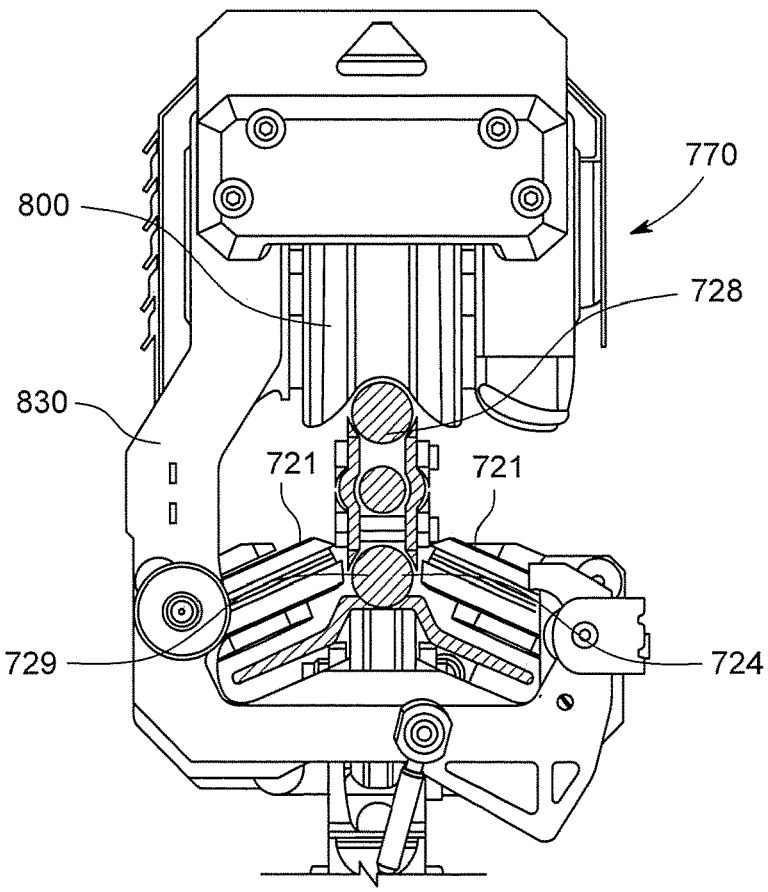
FIG. 83 shows a front view of the trolley embodiment of FIG. 76 when traversing a rail.

The above further alternative embodiment trolley 770 may take a form like that shown in a perspective view in FIG. 76. FIG. 83 shows the same trolley 770 embodiment front on with a rail 724 passing through the trolley 770. In this case, the trolley 770, like that above, is defined be having a rigid body or chassis 830 with upper wheels 800 and lower wheels 721. The chassis 830 is described further below. The upper wheels 800 mate with a cable or rail and may have at least one wheel 800 connected to a brake mechanism. Friction between the upper wheel(s) 800 and cable or rail 724 forms the basis of braking for the trolley 770. The brake mechanism itself in this embodiment may be housed in the space formed between the forward and rear upper wheels 800.

Figure 82:
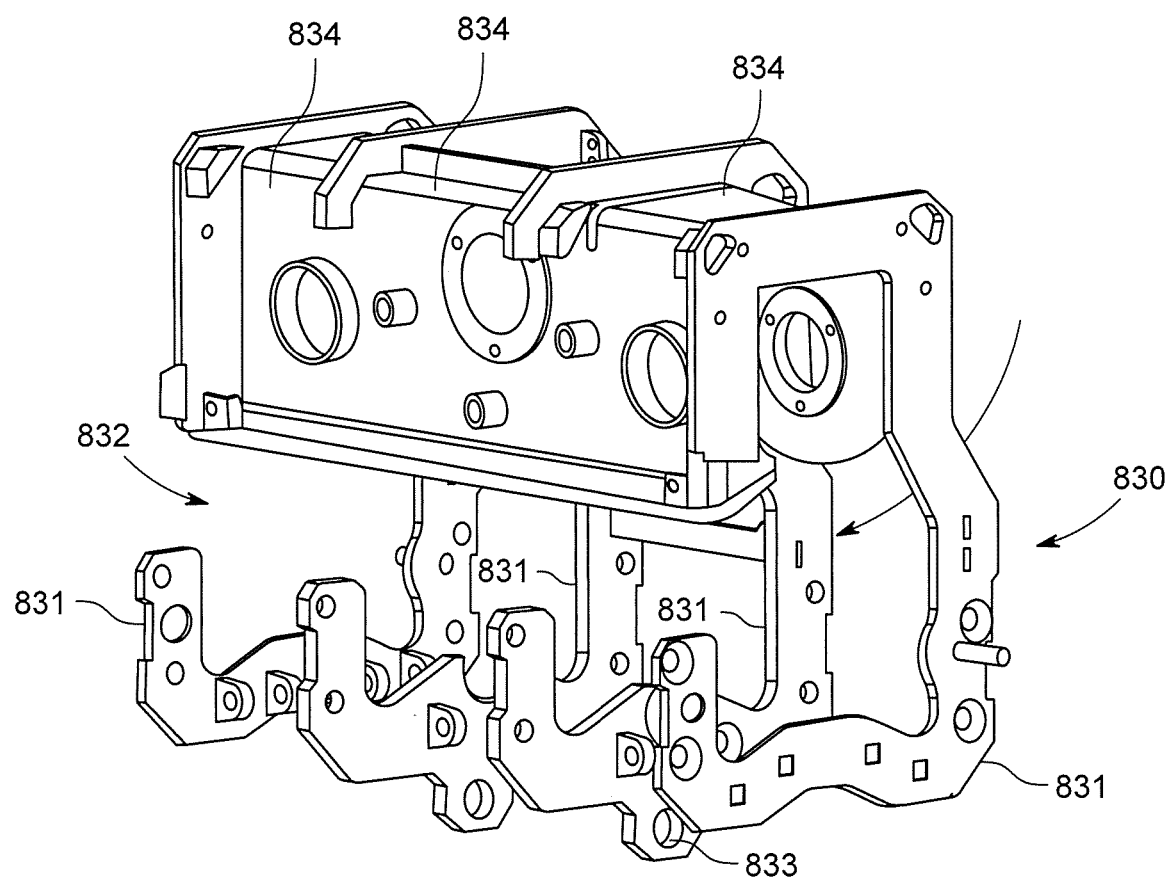
FIG. 82 shows a detail perspective view of a trolley chassis based on the embodiment of FIG. 76.

An example rigid body chassis 830 for a trolley 770 is illustrated in detail FIG. 82. The chassis 830 may provide support for the rider throughout the ride duration, must provide sufficient stiffness and deflection under loading and must allow a cable to pass in and out as the trolley 770 transitions from rail to cable. Finally, the chassis 830 must also support trolley 770 sub-assemblies. In the embodiment shown in FIG. 82, the trolley 770 chassis 830 shown comprises a series of C shape sections 831 that are aligned together in series to provide a common side opening 832 where a cable may pass into or out of. The chassis 830 may have mount points 833 for a spreader bar (discussed further below). The chassis 830 may also have a central body 834 linking the C-shape sections 831 together and which houses other parts of the trolley 770 assembly.

The trolley 770 described in this embodiment has lower wheels, termed later herein as jockey wheels. Two lower wheels may be used that oppose each other with an opening between the wheels sufficiently wide to allow a cable or rail between the opposing lower wheels. In this trolley embodiment, the lower wheels are angled relative to the cable or rail so that one side of the wheel external face may interfere and bear on a rail passing through the wheels.

More details regarding this trolley embodiment will be described below.

Airflow from the Front Wheel(s)

A benefit of placing a rotating wheel or wheels at the front of the trolley in the embodiments described above may be to allow increased airflow into the braking components. This airflow may assist with cooling of the braking components if required and reduce the potential for degrading the brake performance.

Brake Placement Below the Track

As noted above, the brake in some trolley embodiments may be located below the cable or rail. When the trolley system is used on rails that have a potential to capture water on the top surface, locating the braked wheel on the lower side of the rail may in some embodiments be useful to reduce the potential for the braked wheel from skidding in any ponded water. Additionally, locating the brake on the lower side of the rail may allow water expelled from the brake and brake housing to fall away from the track rather than onto the track surface. This further reduces the potential for skidding on a wet surface. For certain braking types, like eddy current braking, the application of water to the braking components may be helpful to assist in cooling of the brake components without degrading braking performance. Brake placement below the cable or rail is not however essential and as noted above, other trolley embodiments may have the brake located above the cable or rail.

Brake System Modes

The brake system may be activated into a variety of functional modes. Using the zipline example shown in FIG. 4, the brake could form one of three modes; a first speed limiting mode, a second speed limiting mode to a lesser velocity, and a third terminal braking mode with stopping functionality. For example, the internal brake system may be configured to be engaged into an emergency mode (different to a normal operating mode) based on at least one input signal that allows the trolley to be brought to a complete stop. The internal braking system may in a 'normal' mode stop motion of the trolley system on a track system. The internal braking system may in a 'normal' mode slow motion of the trolley system on a track system. The term 'normal' refers to the trolley system operating within predetermined limits of measures such as speed, jerk, acceleration and so on. The term 'emergency' may refer to the trolley system exceeding the predetermined limits noted.

Numerous other functional modes may be used and reference to just the three noted modes should not be seen as limiting. The different modes could be used at different parts of a ride to cause terminal braking or to wash off excess speed perhaps where the brake is a pass through or mid-span brake.

Signal Details

It is envisaged that the brake system may be activated into each of the various modes using the input/activation signals noted above, the signals either generated within or integral to the moving element (e.g. trolley) or from a signal generated external from the trolley which causes a function change internally within the trolley.

Internal Signalling

Examples of methods of generating an internal signal may include but are not limited to the following (in isolation or in combination):

Distance measurement—the distance that the device has translated along a ride or since a previous signal may be measured and a specific distance travelled or time duration since a last signal may trigger a fresh signal. This may be measured as a number of revolutions of the braked wheels or be a more direct measurement of distance;

Velocity measurement—a signal may be generated when the trolley or wheel(s) velocity exceeds or falls below an acceptable threshold velocity;

Acceleration measurement—a signal may be generated when the acceleration exceeds or falls below an acceptable threshold acceleration;

Jerk measurement—jerk is defined the change in acceleration. A signal may be generated for changes in jerk of the device or any of the elements particularly if the measured jerk exceeds or falls below an acceptable threshold jerk level;

Brake location and swing measurement—the brake may be attached to a braked wheel, which may be attached to a swing arm on the underside of the trolley. The relative location of the brake or swing arm in respect to the trolley body (or top wheel) may be determined and used as a signal for example to avoid excessive swinging of the rider beyond a predefined 'normal' position. Likewise, the direction of movement of the swing arm could be used as a further measure and signal (closing of the gap below a predefined distance);

Rider weight measurement—the weight of the rider may be transferred to the brake system mechanically. Accordingly, it is possible to use the static weight of the rider as an input/activation signal to the brake to select a braking power requirement even for example, before a ride takes place. Additionally, as the trolley behaves dynamically, accelerating or decelerating during a ride due to numerous factors, the braking signal caused by rider weight may change accordingly through variations in G-force as the ride progresses, wind forces on the rider and so on;

As the trolley may moves dynamically the dynamics of the rider acting on the trolley may vary and these changing dynamics may be used as signals. For applications where the rider is hanging below the trolley then, the angle at which the rider's weight is applied to the mounting location may change due to the dynamics of the ride. Likewise the centre of mass of the rider may move forward or backwards from a static position during the ride. These changes in weight and angle may be used as input signals for the brake functionality.

The above list should not be seen as limiting and other signals or combinations of signals may be generated within or integral the device.

External Signalling

The brake on the trolley may also be subjected to a series of external signals that may be used to activate braking modes and functionalities. Potential sources of external signal may include, but are not limited to, the following (in isolation or combined):

Track transitions—the track system and trolley described herein may be capable of traversing transition elements to for example move from a cable section to rail section and/or from a rail section to a cable section. In trolley embodiments described herein, when the trolley meets a transition, the distance between the upper and lower wheel(s) of the trolley changes—for example the distance location of the between upper and lower wheels may increase initially and then may rebound back together at least somewhat. This external input on the trolley wheel separation distance caused by the transition may be used as a sensor whereby the internal trolley brake may be activated into different modes depending on the size, shape, length, number, spacing of transition element, or any combination of these effects;

External proximity sensors—the internal trolley brake could be activated due to proximity sensors located in the path of the trolley. The proximity sensors could take multiple forms or styles, including the use of magnetic sensors or resilient tags that interfere with motion of the trolley along the track system to activate or alter the behaviour of the brake. The external proximity sensors may be mechanical in nature, electrical/electronic, or combinations of mechanical and electrical/electronic sensors;

Wheel rotation—as the trolley proceeds along the track system, a trolley with upper and lower wheels will have the top wheels rotate in a different direction to the lower wheel(s) unless a gearing system is used. This difference in rotation direction may be used to transfer different input signals to the brake. For example, as the top wheel rotates anti-clockwise, a signal induced by the top wheel may be generated in an anti-clockwise direction. This may be differentiated by a signal generated from the lower wheel(s) that may be rotating clockwise. A signal could be imparted into the different wheels from a variety of means including offsetting of the start of the track sections on the transition elements so that the top or bottom wheel (or a related but separate element) comes into contact first with the transition. Alternatively, proximity sensors like those noted above, may be used near either wheel to active an action, the direction of wheel rotation differentiating the brake response;

Induced electric signal—the trolley and associated brake activation could respond to any form of induced electric signal;

A radio frequency or Wi-Fi™ signal may be used to activate various modes of operation of the internal trolley brake;

RFID signals may be used to activating various braking modes. The RFID signal may be passive or active depending on the application desired. If RFID signals were regularly spaced along the track system for example, they could form a two-way communication whereby the relative location of the trolley with respect to the FID signals could be measured as a signal and the time taken to traverse a section of the rail could also be measured as a signal;

GPS positioning on the trolley may be used as a signal for determining when to apply braking. Further, this GPS information could be communicated to a system/network of other trolleys and/or control systems associated with the trolley and a wider guiding system;

Using external electronic signals, the trolleys could be interconnected and communicate with each other noting their relative location and speed. This external electronic signal could then be used to adjust the internal trolley brake in any specific trolley to ensure a suitable spacing was maintained.

Signalling Example

Figure 5:
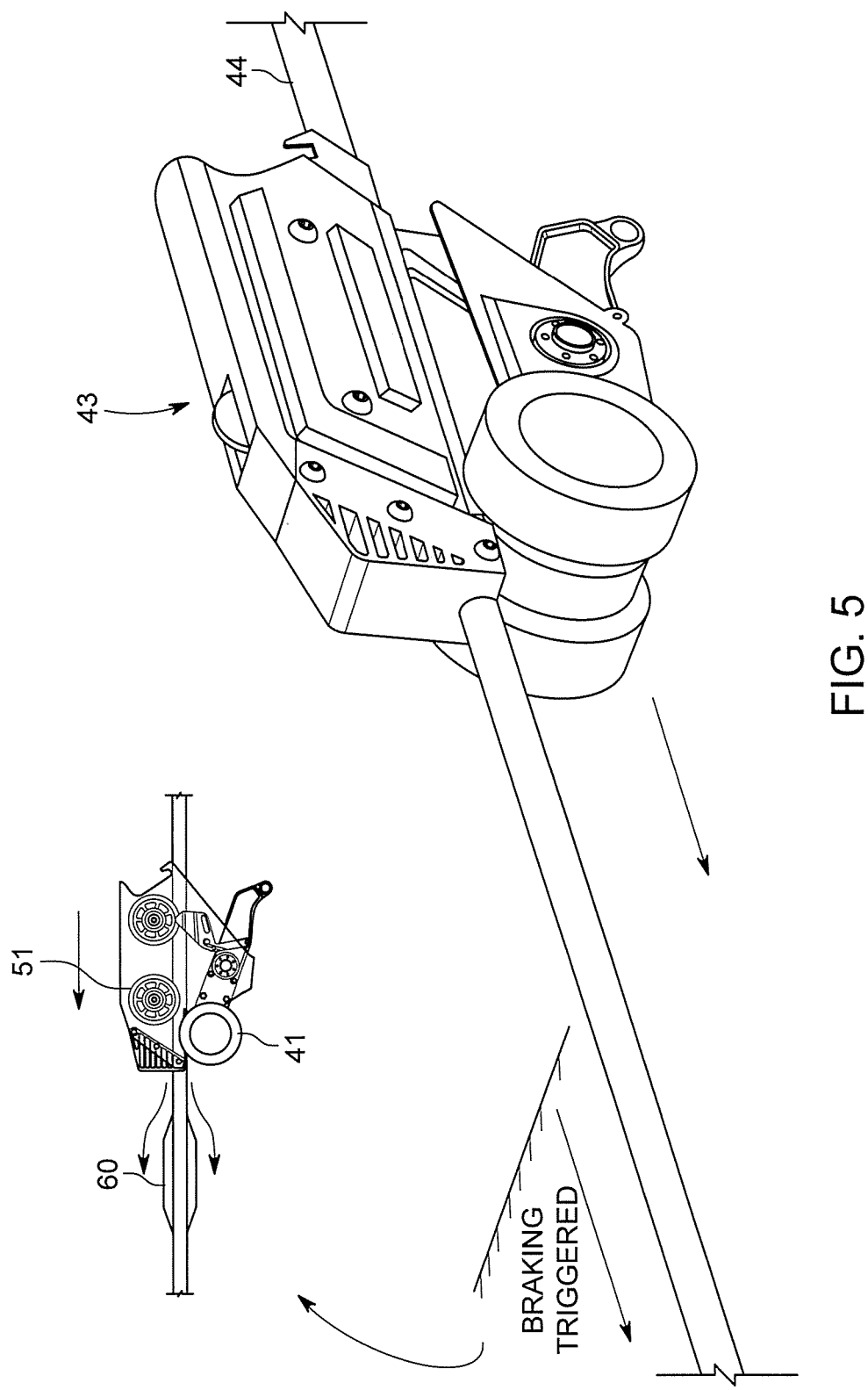
FIG. 5 illustrates a schematic showing brake movement when transitioning onto track from cable.
Figure 6:
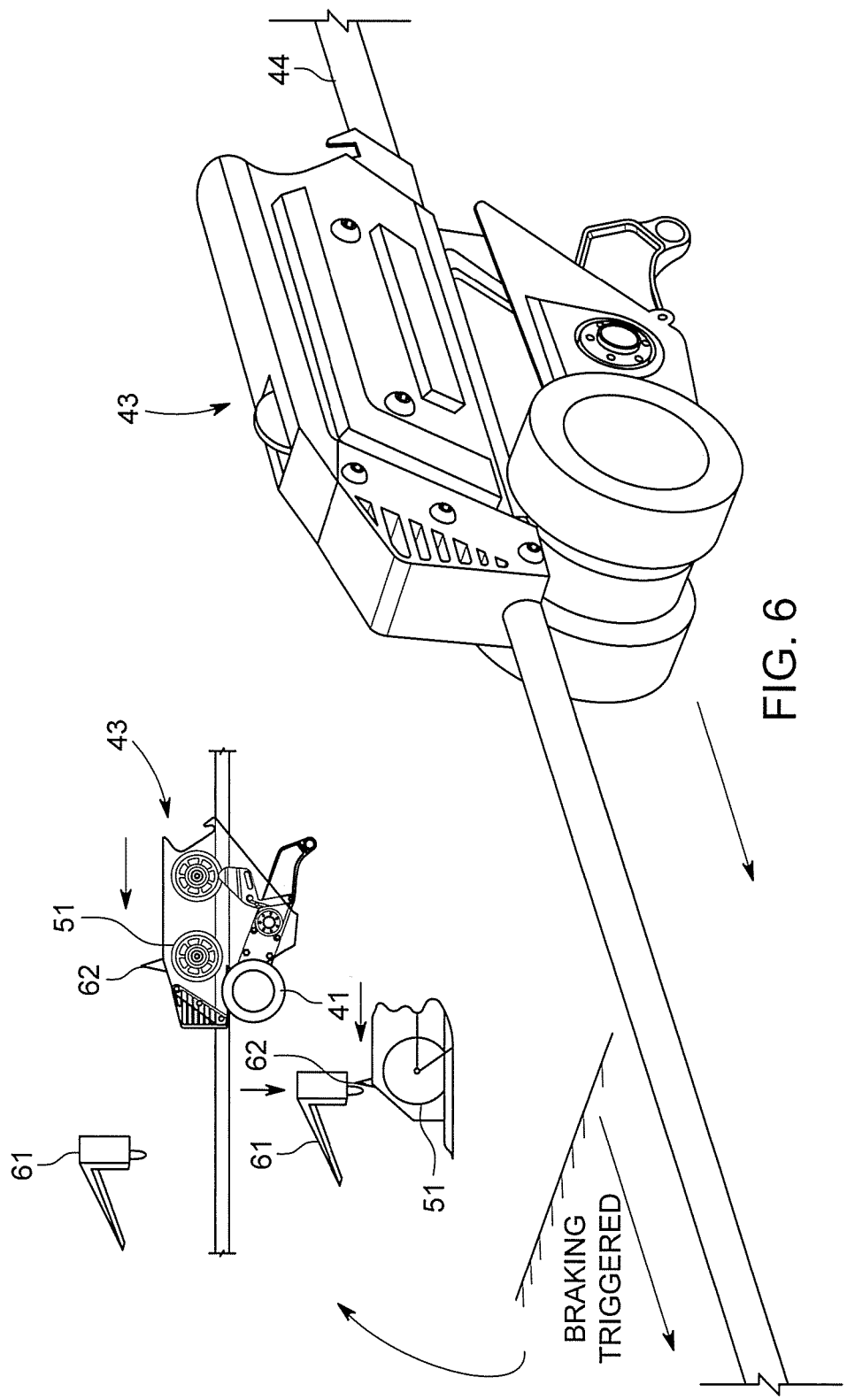
FIG. 6 illustrate a schematic showing alternative input signals from track to trolleys.

FIGS. 5 and 6 describe examples of two possible trolley configurations and brake movement triggers when transitioning into a track from a cable (FIG. 5) and a schematic of alternative input signals from track to trolley (FIG. 6). FIG. 5 shows the trolley 43 of FIG. 4 and use of an enlarged portion of cable 60 as an external trigger to the trolley 43 brake 40. Wheel 41, 51 separation is caused by the enlarged portion of cable 60 which in turn may act to activate brake 40 activation. FIG. 6 shows an external tag 61 that interferes with trolley 43 e.g. a complementary tag 62 mounted on the trolley 1 when the trolley 43 passes the external tag 61 and interference then causes a signal activating the brake 40 by for example a mechanical lever or proximity sensor (not shown).

Internal and External Signalling

It is also noted that any of the signals (internal or external) could be combined to form an additional series of signals (i.e. exceeding a velocity threshold after a set distance has been travelled). The signals or combined signals may also be combined with time (a set time after a velocity threshold has been achieved). Additionally, the internal signals such as those noted above may also be combined with external signals to produce a braking response.

Brake Modulation Detail and Example

Having a modulated braking system integrated into the moving element (trolley) or attached to the moving element (trolley) may be an important feature of the described system. Having the ability to modulate the braking power produced at any time by the braking system allows the system to alter the braking to achieve the desired braking performance.

In the example presented in FIG. 1, a trolley system traverses a cable system. In the first zone of this application, the trolley is required to activate the brake system and modulate the speed of the individual trolleys so as not to exceed the allowable peak speed. If the brake system is not modulated, but simply results in the application of a fixed and predefined braking force, then the likely result will be one where the motion control performance varies greatly across the range of input conditions. This is also true of the slow-down portion and terminal braking section in the same figure.

Figure 7:
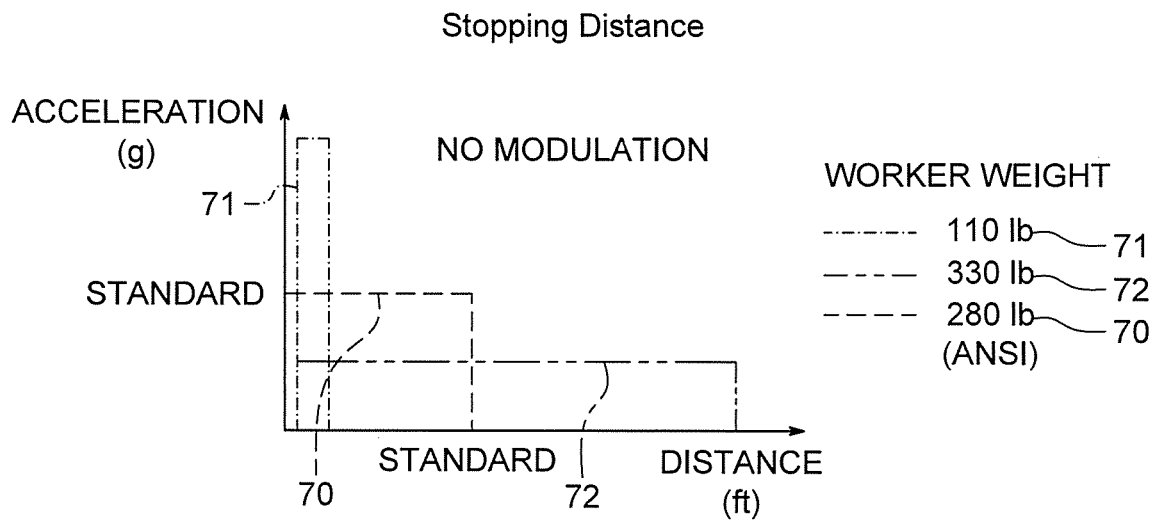
FIG. 7 illustrates a graph to show stopping distance variation when no modulation is imposed.

As an example of the above, in a terminal braking section (shown in FIG. 1 as item 7), the effect of extreme rider weights is shown in FIG. 7 which compares distance to acceleration. If a brake is installed to the trolley to ensure a "standard" weighted system stops in the desired "standard" distance (see the dashed line marked 70 in FIG. 7) then the brake will deliver too strong a braking force for lightweight trolleys or trolleys with lower speeds. This trolley, under the power of the "standard brake" with low weights or low velocities will be retarded with a high deceleration and will slow or stop in a shorter distance than is desirable (line 71 in FIG. 7). For similar trolleys operating with heavy weights, or high velocities, the fixed brake will deliver insufficient braking force and the trolley will travel a longer distance than is desired under a relatively low rate of deceleration (line 72 in FIG. 7).

Figure 8:
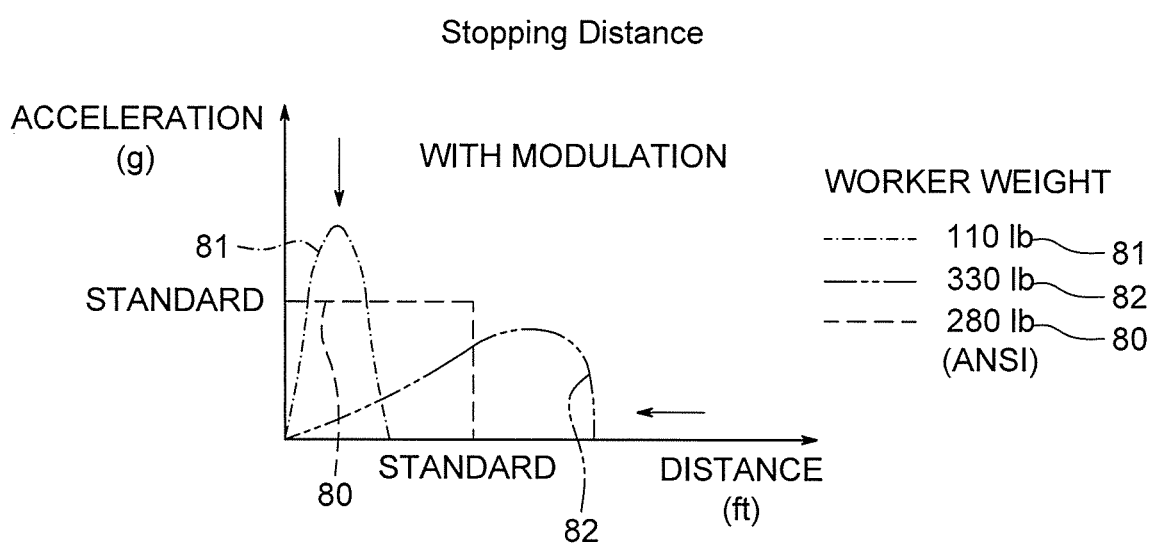
FIG. 8 illustrates a graph showing stopping distance with modulation brakes (variable power brakes)

If a modulating brake is applied to the trolley braking, the braking effort applied to the trolley and attached travelling mass may be adjusted to achieve a desired braking performance over a wide range of input variables. An example of this is shown in the graph of FIG. 8 again comparing acceleration and distance profiles based on different rider weights, whereby a brake with adjustable (modulating) braking effort is installed on the trolley. For this example, the "standard" is shown again as a dashed line item 80. Braking for the trolley operating under lightweight conditions may be modulated to a low power range, thereby reducing the braking force on the trolley to control the level of deceleration and increasing the distance that retarding occurs over as shown by line 81. Likewise, the braking effort of the brake may be increased for the trolley operating under heavy weight conditions (line 82), thereby increasing the braking force and shortening the distance that the heavy weight mass is decelerated over. In providing capacity to modulate the braking effort on a trolley, an option exists to reduce the variation in stopping distances and decelerations experienced by trolley and mass and therefore temper any significant distortions in acceleration or distance travelled before stopping.

Alternative modulating means may be achieved by varying the braking effect based on distance traversed in the terminal braking zone. In one example, braking may be graduated from a minimum value to a maximum value along the terminal braking zone. In this case lightweights will be subjected to lower braking effects initially and lowered to a desired speed progressively. Heavier weights will traverse the initial section with minimal effect but be subjected to braking effects in sections further along the terminal zone. The result of this modulation is that both light and heavy weights achieve the desired arrest in speed within less variation in distance than that of a fixed or non-modulated system. The above terminal braking in a terminal zone may be employed using a pass though braking means.

The aim and benefit of brake modulation may be to increase safe operation of a trolley and minimise the distance required to terminate travel of the trolley and optionally, an attached mass such as a rider on the trolley. The example used above is specific to the slowing and halting of a trolley in a desired terminal location zone under variable input conditions of variable operational weight. It may be appreciated that the application of modulated braking to a trolley system may have beneficial application under other operational phases of a travelling trolley system. One such example may be the ability to control or govern the maximum speed that the trolley may traverse along a defined path of motion. In this example the braking system may be modulated to provide sufficient braking to the trolley to balance the forces acting on the trolley such that the trolley does not accelerate or decelerate when the control speed is achieved while in the region where speed governing is desired. Other sensed metrics of motion (for example, the internal or external signals as noted above) may be used as the target for motion control, including combinations thereof.

Modulation has wide application in the control of motion in a travelling trolley system. As such, these examples should not be seen as limiting. Further, the use of braking modulation may be applied to vary the characteristic behaviour (or 'feel' in the case of human based travel systems) of the trolley system to achieve a desired characteristic. Other examples and applications of modulated braking systems of trolley motion systems are therefore within the scope of this disclosure.

Modulation to the braking refers to variation of the braking effort to achieve a desired motion behaviour of a trolley system. A system may be configured so that modulation responds to a location along the travel path, or exceeding a threshold of a motion characteristic, or in response to an input in travelling weight. One skilled in the art may appreciate that modulation may respond to other inputs, measures, and/or conditions, and that the examples disclosed here should not be seen as limiting.

Modulation Type

The specific means of modulating the braking effort may be dependent on the method employed for providing braking effort. The desired modulation-braking characteristic may be independent of the braking method employed; the control method specific to a braking method being the means of achieving the desired modulation characteristic. A number of examples of braking methods are provided herein with examples of modulation control means. These examples are provided for illustrative purpose and should not be considered limiting.

As noted above, modulation to the braking refers to variation of the braking effort to achieve desired motion behaviour of a trolley system. The level of modulation, or the control set point for modulation, may be determined by a number of methods, or modulation type-fixed, passive controlled, or active controlled. In one embodiment, fixed, active or passive brake modulation may occur automatically and may be dynamically adjusted during trolley movement along a track system.

Fixed Modulation

A fixed modulation method may be one where the level of braking effort is set to a predefined level within a range of possible brake efforts. The value of the predefined level may be arrived at for any number of reasons as decided by the application, and this is not necessarily important in describing this modulation type. The significant feature is that braking is set at a predefined level prior to operation, based on the needs of the application, and may be altered to another predefined level at another time, prior to another operation based on the needs of the application at that time.

An example illustrating a fixed modulation type is where a zipline trolley may be operated embodying a fixed modulated brake. In this example the level of braking or braking effort may be set to a predefined level based on the environmental wind conditions. The brake may be modulated to a high predefined level of braking under tail wind conditions to control travel speed. In the event that this trolley is later operated under head wind conditions, the brake modulation may be predefined to a low level of braking effort to achieve the desired travel speed along the zip-line.

In another example, the brake may be modulated to a predefined level of braking effort based on the weight applied to the trolley. When operating with a different applied weight, a different level of modulation may be predefined prior to operation. In the application of a zip-line trolley, this fixed modulation may be predefined by an operator altering a setting on the trolley brake prior to the zip-ride, based on the measured weight of the rider. Alternatively, the trolley may contain a means for predefining the level of fixed modulation directly from the rider weight prior to operation of the trolley brake.

Passive Modulation

Passive modulation refers to time varying change to the braking effort based on the inherent kinematic, and/or dynamic interaction of unpowered control elements acting in response to inputs and conditions present at a discrete instance of time. Expressed another way, there is no external power input and the modulation imposed has no knowledge of the past or ability to predict future events. The modulation level at a time instant may be completely governed by the motion kinematics and dynamics and the forces/conditions applied at that time instant. Described differently, modulation may vary in response at any instance in time relative to the inputs on the system at that instant and only within the predefined kinematic and dynamic behaviour of the control system.

One such example of a passive control system for the purpose of illustrating the concept, is a centrifugal friction brake that modulates braking based only on the speed at that instance in time and governed by the centripetal force applied to a fixed friction surface.

Active Modulation

Active modulation refers to time varying change to the braking effort based on control of the braking means in response to sensed parameters where the modulation may be controlled by elements separate to those sensing the sensed parameters. Further, an active system may have the means of responding to previous values of sensed parameters and/or controlling based on prediction of required braking behaviour based on known sensed parameters and/or behaviours of operation.

One such example of an active modulation system is one where an electromagnetic eddy current brake has its electrical control power modulated by a powered electronic circuit in response to the value communicated by a speed sensor and the measured location of travel.

Modulation of a Wider Trolley System

Modulation control of a brake effect should not be confused with passive and active trolleys referred to as part of a trolley traveller system. Modulation of braking within the modulation control type may be influenced by control conditions determined by an overall trolley system control. Such aspects of an overall trolley control may be the determination to trigger or command a different or alternate modulation characteristic of a brake modulation system, be it fixed, passive, or active brake modulation. It should be appreciated by one skilled in the art that each of these modulation systems is only capable of modulated control within the capability of the modulation type. Triggering or commanding of a different or alternate modulation characteristic may be independent of the brake modulation control itself. Further, the capacity to trigger or command a different or alternate modulation characteristic may be provided within a fixed, passive, or active controlled modulation system.

Modulation Mechanism Examples

A variety of brake modulating mechanisms may be used.

As noted previously, the internal brake in the moving element (e.g. trolley) may take multiple forms and configurations. As an example the brake could be an eddy current brake system utilising magnets formed into a magnetic circuit, a conductor and relative motion between the two. Modulation of this eddy current braking may be possible by altering any number of variables including (in isolation or in combination):

Magnetic strength;
Magnetic circuit;
Direction or angle of magnetic flux;
Relative speed of conductor and magnets;
Interaction between the conductor and magnets;
Mechanical properties of the conductor;
Material properties of the conductor;
Temperature of the system or components.

Alternatively, if the braking system was a friction brake, the friction brake may be modulated by altering any number of variables including (in isolation or in combination):

Friction material;
Applied pressure;
Operating temperature;
Number of friction surfaces.

Alternatively, if the braking system was a fluid brake, the fluid brake may be modulated by altering any number of variables including (in isolation or in combination):

Fluid viscosity;
Flow area;
Fluid pressure;
Turbine geometry (in the case of turbo machines);
Flow rate.

In addition to the methods and variables stated above, other ways may also exist to alter the braking force/effort of a brake system.

A desired characteristic for modulation and the control means for modulation of the brake to this desired characteristic may be dependent on the specifics of the application and braking type selected. Specific embodiments to achieve this within a braked trolley, and the control triggering and command interaction from an overall trolley system control, are not detailed herein, however it should be appreciated that one skilled in the art would not limit themselves to a single method or embodiment or a limited scope of methods or embodiments, and all combinations thereof are considered within the scope of this disclosure.

For example the application of a modulated eddy current brake in a trolley may have the advantage of providing contactless (frictionless) braking free from effects of wear, noise and contamination. The modulation of such a brake may be achieved for in the examples shown in the graphs illustrated in FIG. 9 and FIG. 10.

Figure 9:
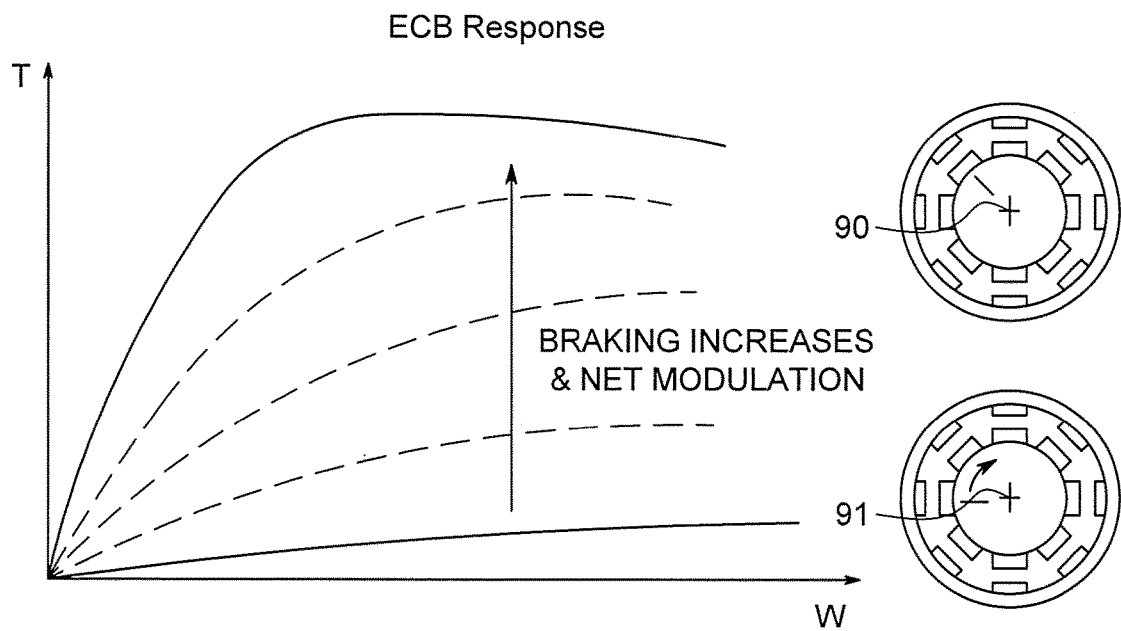
FIG. 9 illustrates a graph showing the effect of a modulating brake (an eddy currant brake (ECB) response) through interference with a magnetic circuit.

In the first of these two examples shown in FIG. 9 (a rotary configuration of eddy current brake), the braking is modulated by varying the magnetic circuit through rotationally adjusting the position of an inner and outer magnetic array relative to each other (a simple example being shown in FIG. 9 as item 90 (magnets at opposing polarity) and item 91 (magnets at a common polarity), changes in alignment occurring by the magnet arrays rotating relative to each other. By doing this, the magnetic flux (shown as w on the x-axis of FIG. 9) acting on an electrical conductor may be varied. This variation of magnetic flux acting on the conductor may directly influence the braking effort or torque (shown as T on the y-axis of FIG. 9) provided by the brake when in motion. Relative movement of the magnetic arrays may be activated by a control and/or activation means to vary the braking effort. This modulation may be achieved through fixed, passive, or active modulation methods. One such example is the passive modulation of the braking effort in response to operational speed, where the modulation of the brake may be controlled to limit the speed to a defined maximum. Passive adjustment of the magnetic array positioning may be varied to balance the forces applied on the trolley to govern the speed. For heavier rider weights and/or tail winds, and/or varying slopes, the magnet array may be positioned to achieve an increase in braking effort.

Figure 10:
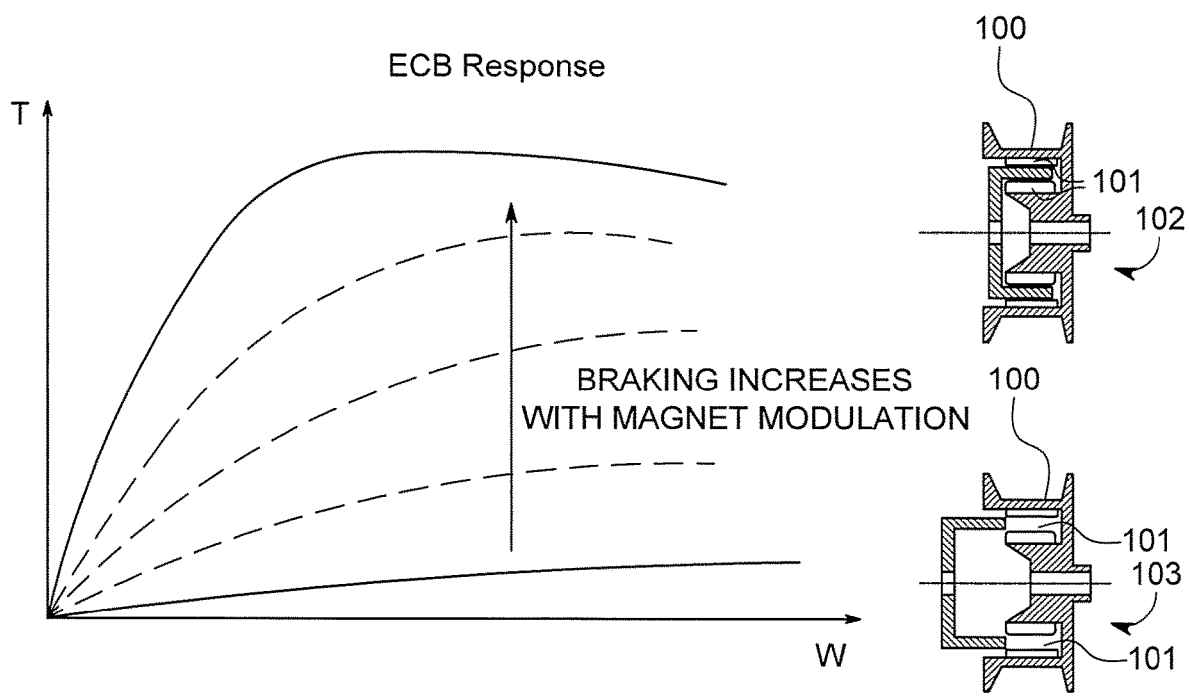
FIG. 10 illustrates a graph showing the modulating power of a brake through adjustment of conductor location relative to magnetic circuits.

In the second of the two examples shown in FIG. 10, the braking effort may be varied by altering the overlap of a conductor 100 with a fixed magnetic array 101. A schematic of this style of brake is shown as item 102 (conductor and magnet array overlapping) and item 103 (conductor and magnet array separated). In this rotary brake example, moving the conductor 100 axially to increase the overlap with the magnetic array 101 may increase flux (w on the X-axis) and the braking effort (T on the Y-axis). Braking effort may be reduced by the opposite motion of moving the conductor 100 axially to reduce the level of overlap. In the same method of the first example, control of speed may be achieved for the range of input conditions by modulation of the variable element—the conductor 100 overlap.

Figure 23:
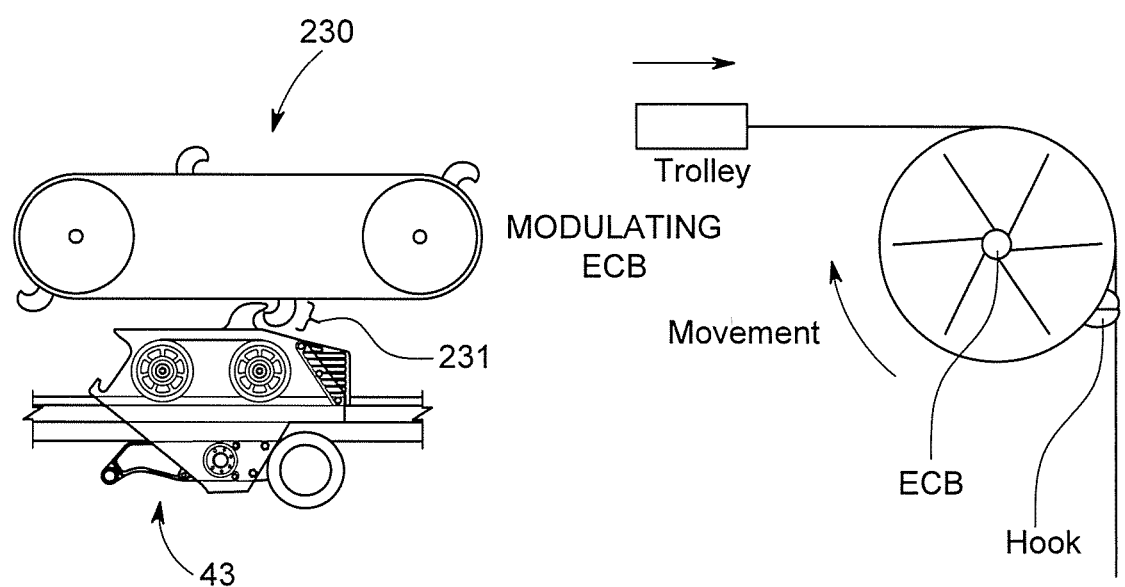
FIG. 23 illustrates a clothesline style braking system.
Figure 45:
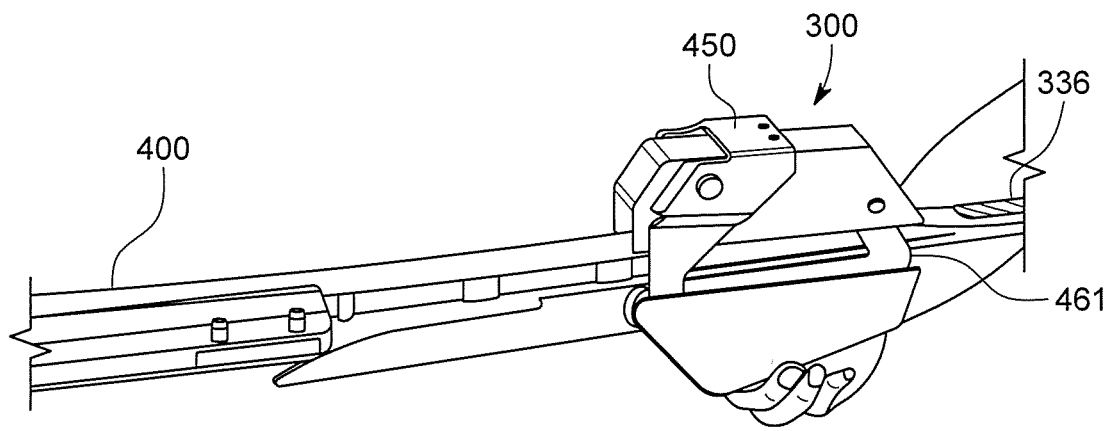
FIG. 45 illustrates the zipline trolley embodiment of FIG. 29 moving up the lead in or transition section from cable to track.
Figure 61:
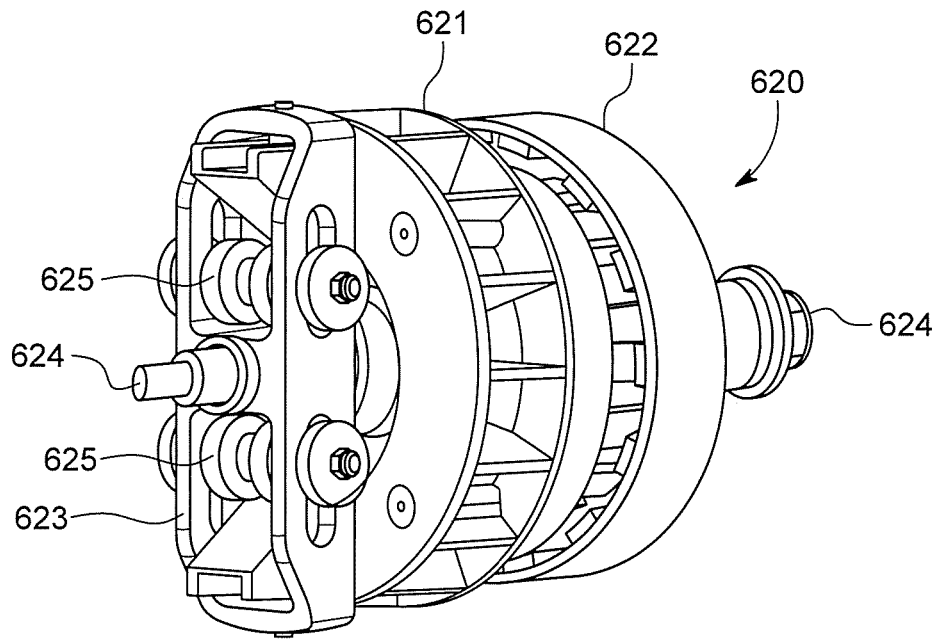
FIG. 61 shows a perspective assembled view of an embodiment if assembled ECB assembly.
Figure 62:
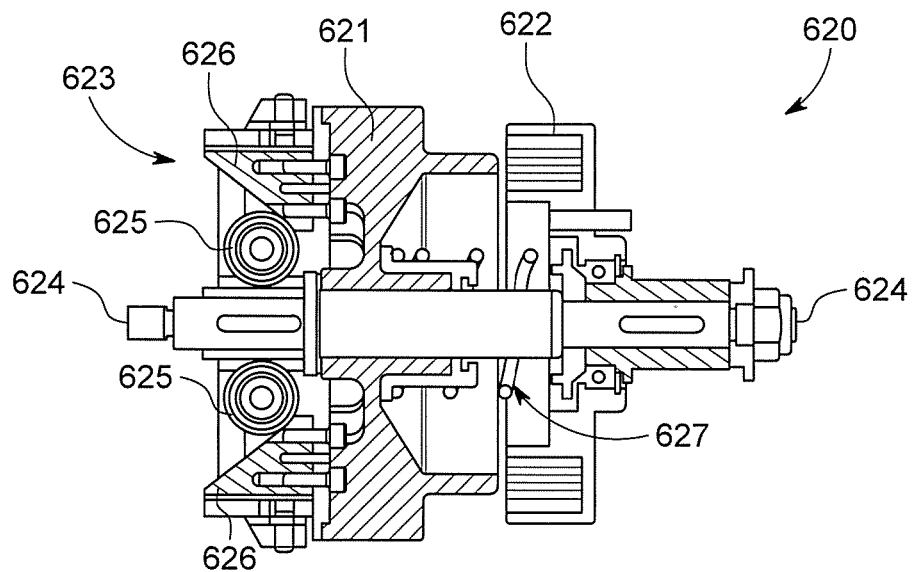
FIG. 62 shows a cross-section side view of the ECB assembly.
Figure 63:
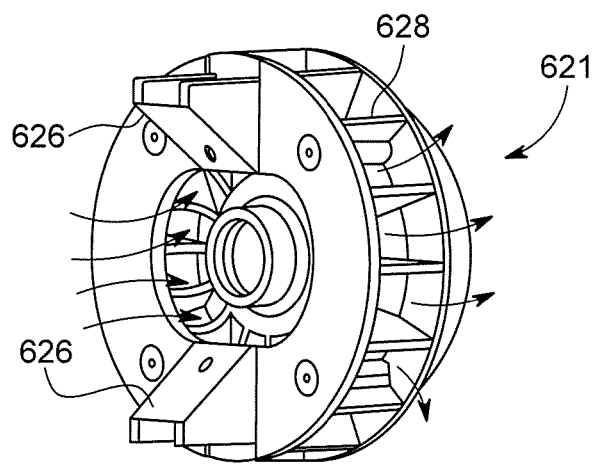
FIG. 63 shows a perspective view of the ECB assembly conductor assembly alone.
Figure 64:
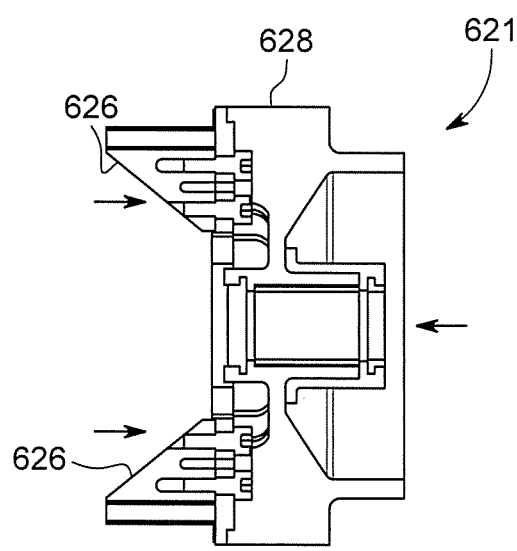
FIG. 64 shows a side cross-section view of the conductor assembly alone.
Figure 65:
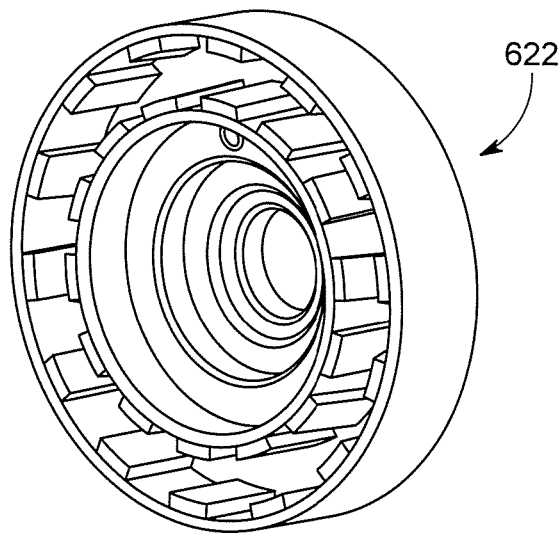
FIG. 65 shows a perspective view of the magnet array alone.
Figure 66:
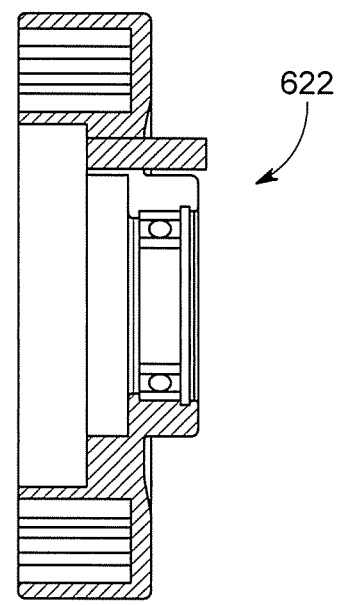
FIG. 66 shows a side cross-section view of the magnet array alone.
Figure 67:
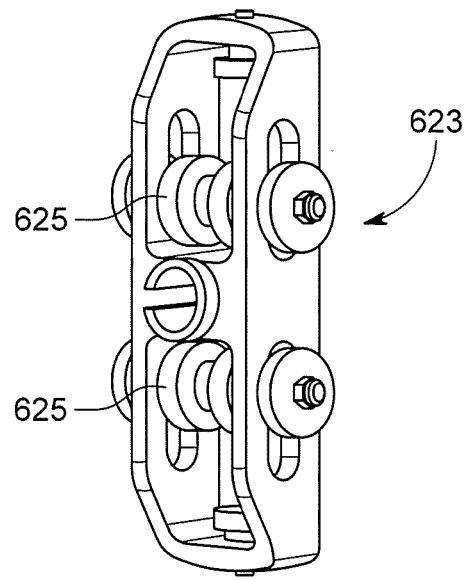
FIG. 67 shows a perspective via of the modulation mechanism alone.
Figure 68:
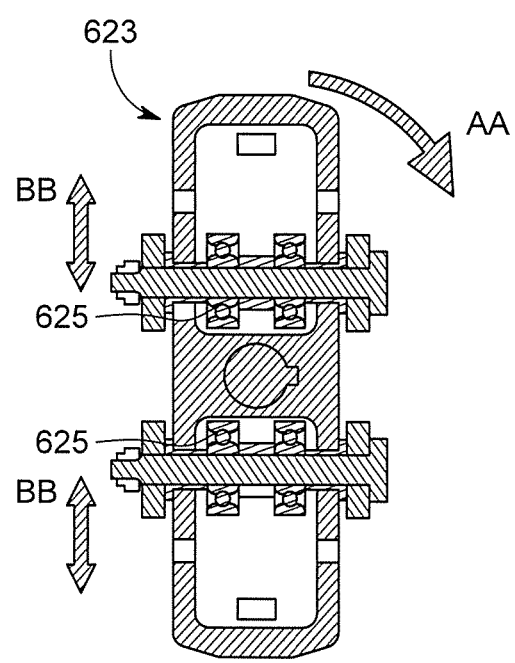
FIG. 68 shows a rear cross-section view of the modulation mechanism alone.

FIG. 61 to FIG. 68 show a further alternate modulating eddy current brake (ECB) assembly 620. FIG. 61 shows a perspective assembled view of an assembled ECB assembly 620. FIG. 62 shows a cross-section side view of the ECB assembly 620. FIG. 63 shows a perspective view of the conductor assembly 621 alone. FIG. 45 shows a side cross-section view of the conductor assembly 621 alone. FIG. 65 shows a perspective view of the magnet array 622 alone. FIG. 67 shows a side cross-section view of the magnet array 622 alone. FIG. 67 shows a perspective via of the modulation mechanism alone 623. FIG. 68 shows a rear cross-section view of the modulation mechanism 623 alone. In this embodiment, the ECB assembly 600 is designed to sustain the trolley at a velocity set point throughout the ride and when that set point exceeds a threshold, the brake effect is activated. Once the velocity drops below the threshold, the brake effect may deactivate. Best seen in FIG. 62, the ECB assembly 620 design has three key components being a conductor assembly 621, a magnet array 622 and a modulation assembly 623. These are all arranged about a shaft 624 and the shaft 624 transmits ECB assembly 620 braking torque to the trolley wheel(s). The conductor assembly 621 rotates about the shaft 624 in concert with the shaft 624 speed of rotation. As shown in FIG. 23, the conductor assembly 621 may be located outside the magnet array 622 under normal operation to ensure no ECB forces are generated. When the shaft 624 rotates to an extent that exceeds the velocity threshold, weights 625 in the modulation mechanism 623 move outwards in direction BB due to centrifugal force. This outwards BB movement imposes an axial load on the conductor assembly 621 by the weights 625 moving along a ramped surface 626. The modulation mechanism 623 may itself spin around direction AA too to further increase the centrifugal force imposed on the weights 625. In the embodiment shown in FIG. 62, the load applied by an axial compression spring 627 is selected to overcome or at least reduce variations in the axial movement of the conductor assembly 621 into and out of the magnetic array 622 caused by the various forces acting on the trolley system as it travels along the cable and/or track. In the embodiment shown in FIG. 61 to FIG. 68, the conductor assembly 621 at one side has ring shape and that ring is moved into the magnet array 622. The ring is formed from a conductive material. The more the conductor assembly 621 ring overlaps the magnet array 622, the more the eddy current brake effect increases. In addition, the faster the relative speed of motion is between the conductor 621 and magnet array 622, the greater the eddy current brake effect. As the conductor 621 slows due to imposed eddy current brake forces, the conductor 621 is urged back out of the magnet array 622. As a result a modulated brake response results and the rider is held at a constant velocity set point once the velocity threshold is reached irrespective of rider weight or other factors such as wind. The conductor assembly 621 also comprises heat dissipating design to absorb heat generated during braking is dissipate this via the body 628 of the conductor assembly 621 and cooling fan blades.

Note that the energy generating power produced by the trolley systems such as those described herein may be considerable (500W or more). This requires a considerable brake energy response to counteract the moving energy. Along with this is the need to allow for a degree of rapid movement of the trolley along tracks hence the brake effect must not be too sensitive. Art eddy current systems such as those used in fall safety units or autobelay devices may not be suitable since they are designed to be highly sensitive to external movement and hence would lock or brake too quickly. The above design addresses the system requirements through several effects such as centrifugal force and axial load transfer. The onset of braking and degree of braking may be tuned through varying the weight used in the modulation mechanism, varying the ramp angle, varying the bias strength. Varying aspects of the conductor and magnet array may also be important. One approach taken by the inventors was to alternate the magnet polarity in the array to have north south pairing on either side of the conductor ring. This was found to generate the greatest braking torque for the smallest magnet volume.

Transfer of Brake Effects to a Wheel or Wheels and Belt Drive

Figure 74:
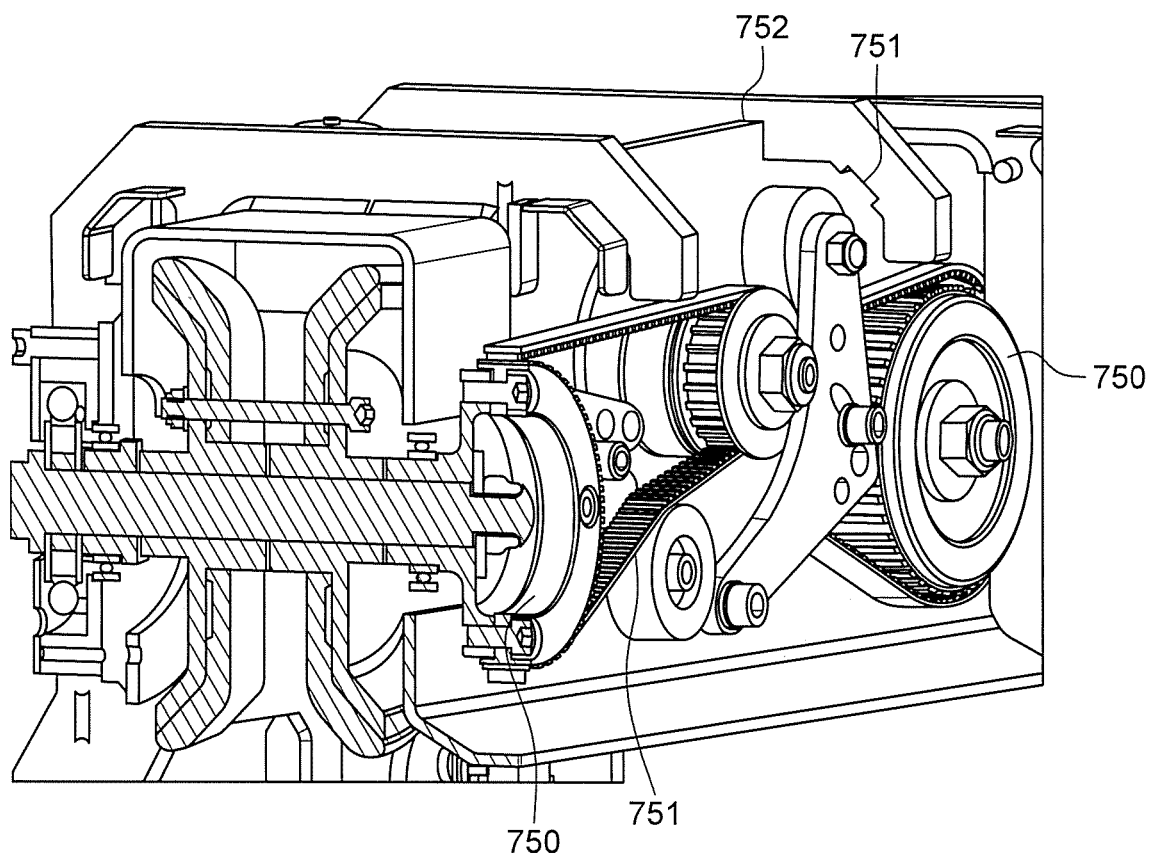
FIG. 74 shows a perspective view of a trolley brake transfer with a cover removed to illustrate the belt drive and upper wheels.
Figure 75:
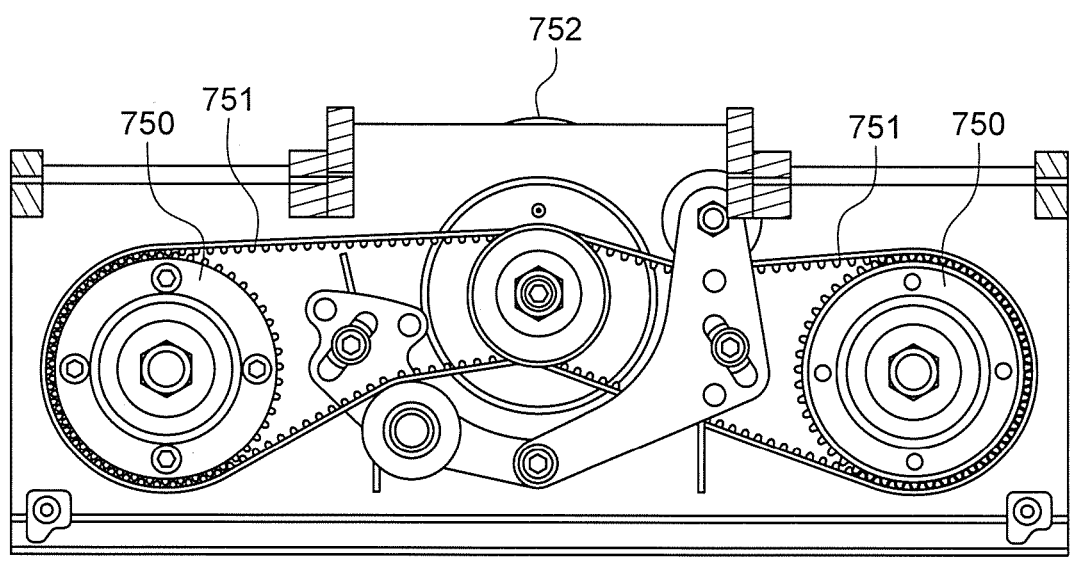
FIG. 75 shows a front view of the above trolley brake transfer with a cover removed.

As noted above, various brake mechanisms may be used and that brake effect imposed on a wheel that interacts with the track be that a cable, rail, transition or other track component. The brake effect may be transferred to the wheel directly—that is the wheel and brake may be directly linked. Mechanically, direct linkage may be efficient however this may lead to bulky trolley designs and compromised brake designs, or incompatibility in operational speeds between the wheel and brake systems. Alternative embodiments may have the brake effects transfer indirectly to the wheel or wheels. As shown in FIG. 74 and FIG. 75, the brake effect may be transferred to a wheel or wheels 750 via a belt drive 751. In the embodiment shown in FIG. 74 and FIG. 75, the brake 752 may be located intermediate two upper wheels 750 and dual belt drives 751 may be used to transfer the brake 752 effect across both wheels 750. That is the brake system 752 is coupled to a plurality of trolley wheels 750. This design may be useful so as to avoid the trolley moving along freely on one wheel. Further, a belt drive allows for the ability to gear the brake effect and to change this gearing. The dual belt system further allows the chance to fully utilise the total available wheel traction for braking. This may be important since, as braking occurs, a rider may swing fore and aft of the trolley connection to the track and hence the effective traction on a wheel also changes. If full reliance for braking were limited to one wheel, skidding may occur. With both wheel rotations tied together, no skidding can occur unless both wheels lock, a situation less likely to occur than when one wheel might lock.

Rail Designs

As noted above the guiding means may be a rail. Rails as used in the trolley systems described may comprise a variety of shapes and configurations, the exact shape being one that complements the end application, cost of materials, installation complexity and a shape and configuration that complements the trolley design and trolley features. Rails may be used for a variety of reasons, one being the greater ability of a rail to cause trolley direction changes. Cables used in zipline applications typically have a linear path and are suspended between pylons. Cables could turn about a pylon for example and having a rail section about the cable turn may be important to more strongly govern the trolley position and orientation about the turn.

Figure 13:
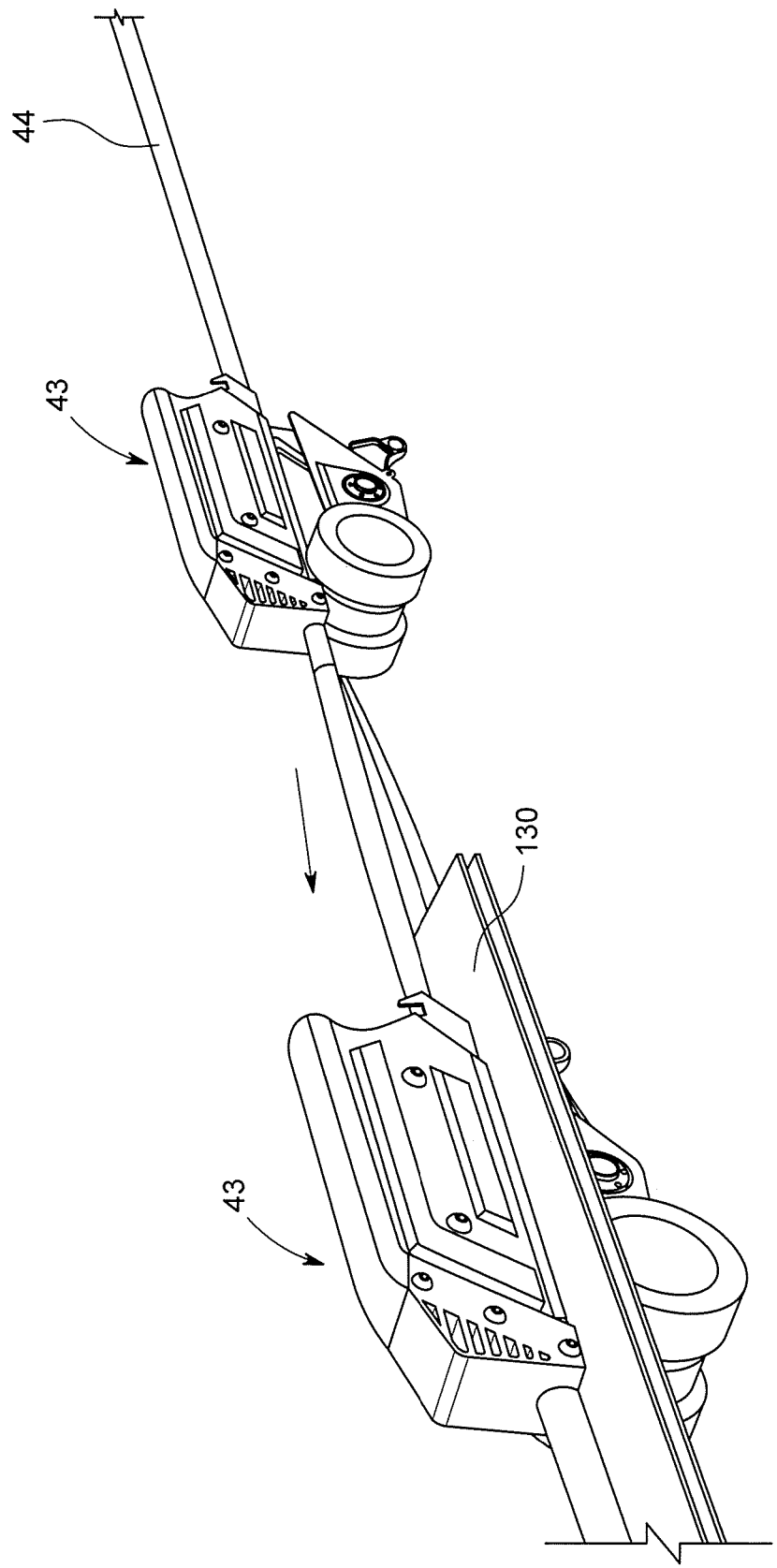
FIG. 13 shows a schematic of trolleys transitioning from cable to track as viewed from an on-coming direction.
Figure 14:
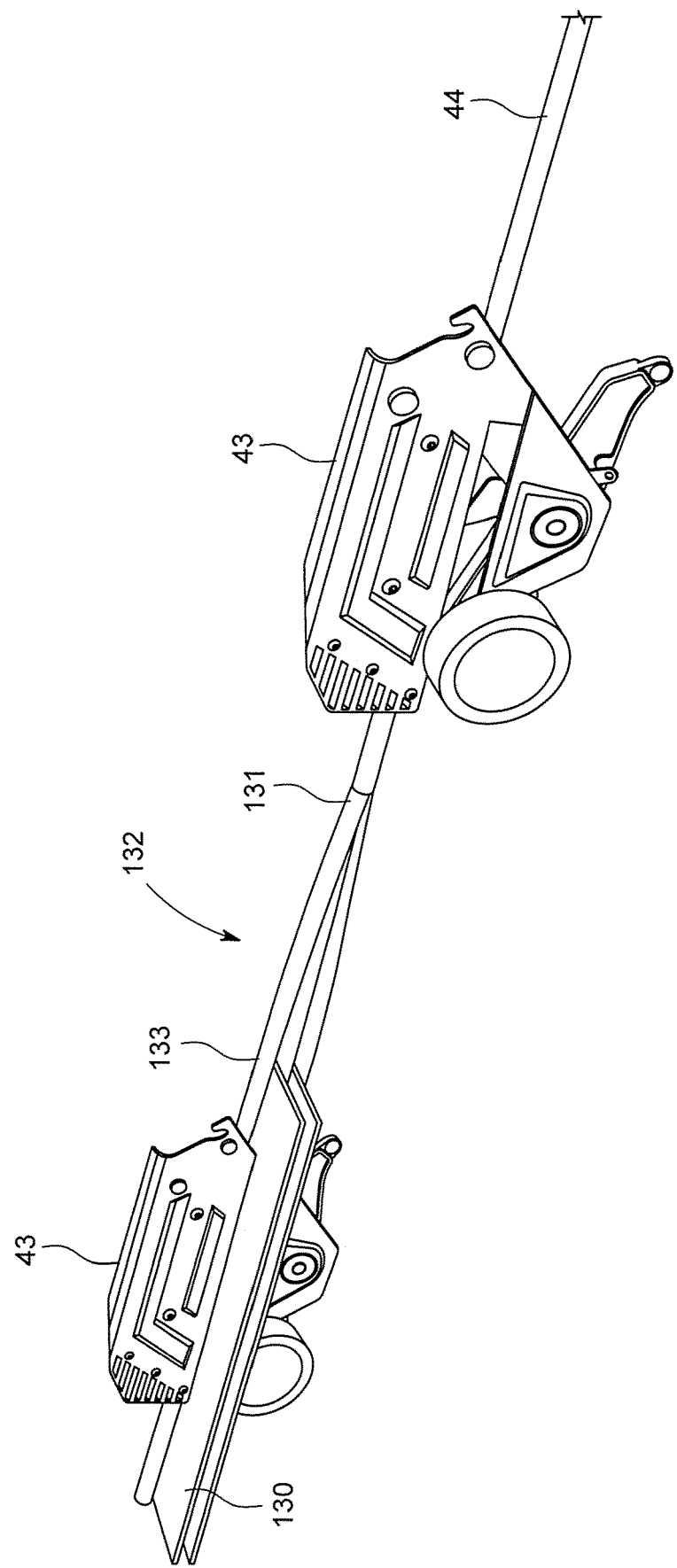
FIG. 14 shows a schematic of trolleys transitioning from cable to track trolleys moving away (reverse direction)
Figure 15:
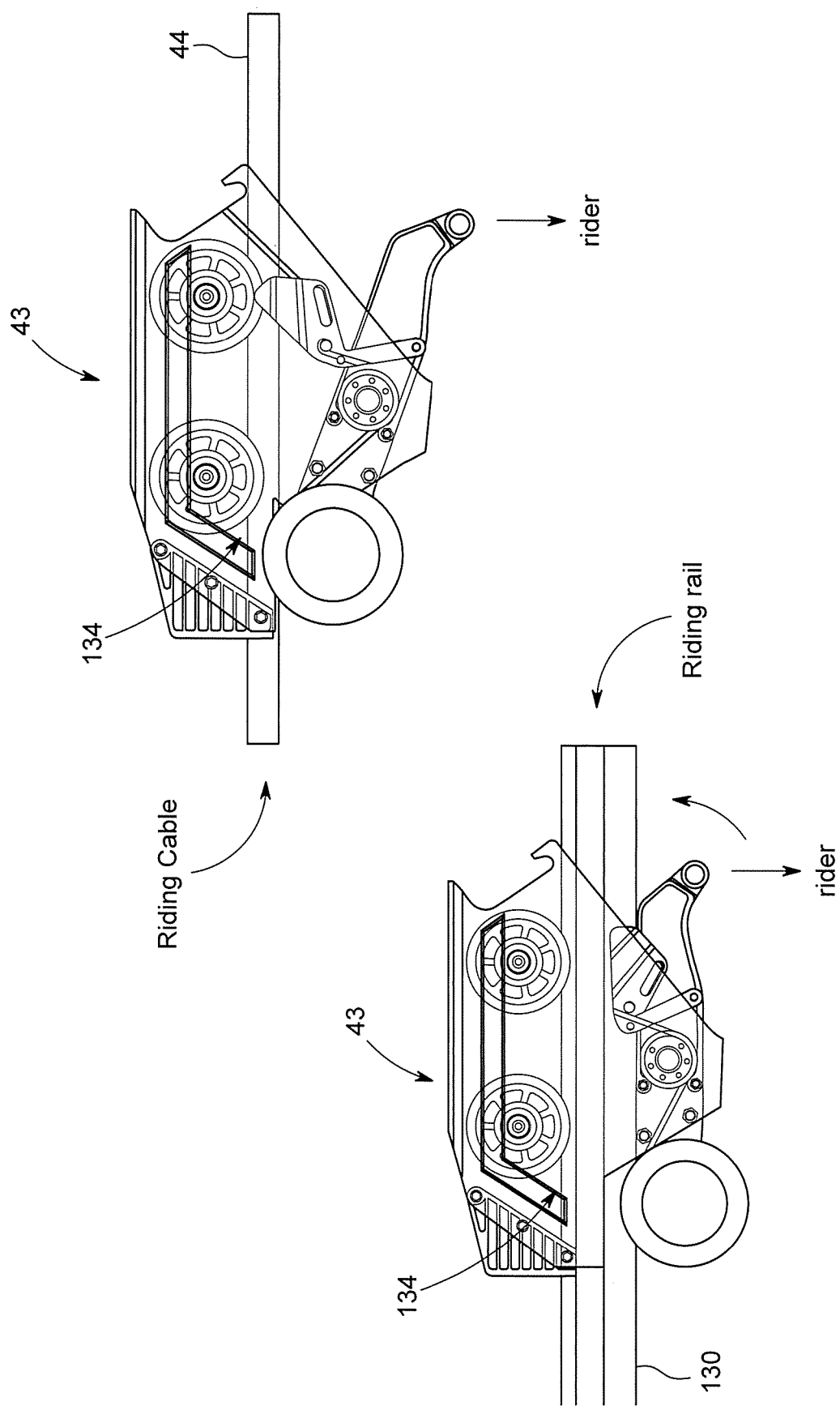
FIG. 15 shows schematics of trolley gating action when on cable and track.

In one embodiment, the trolley system may be configured to traverse along a rail, the rail shaped as a generally flat elongated section aligned in a vertical plane on which upper trolley wheels are located and elongated flanges midway along rail depth that communicate with the trolley. FIGS. 13-15 illustrates one form of rail having a generally flat elongated section aligned in a vertical plane on which upper trolley wheels are located and elongated flanges midway along rail depth that communicate with the trolley.

Figure 40:
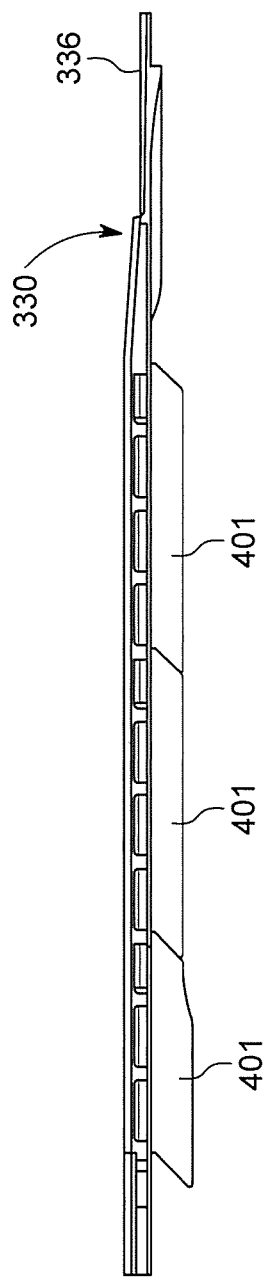
FIG. 40 illustrates a side view of the track section shown in FIG. 39.
Figure 41:
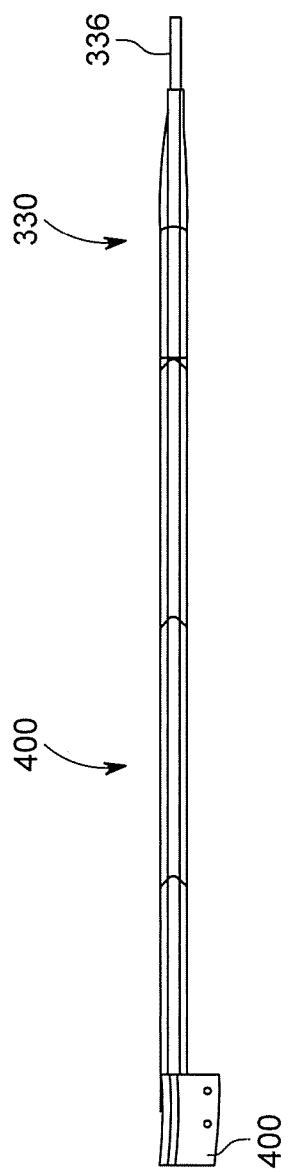
FIG. 41 illustrates a view from above of the track section shown in FIG. 40.

In an alternative embodiment, the trolley system may be configured to traverse along a rail, the rail shaped as a generally flat elongated section orientated in a generally horizontal alignment, the rail having an extension extending above the centre of the rail that mates with at least one trolley system wheel. FIG. 40 and FIG. 41 illustrate this alternative rail profile, the rail in this case also having a generally flat elongated profile but in this case being orientated in a generally horizontal alignment, the rail having an extension extending above the centre of the rail that mates with the upper wheels of the trolley. Some rail sections in this embodiment may have fins (described further below) incorporated.

In a yet further alternative embodiment as illustrated in FIG. 76, the trolley system 770 may be configured to traverse along a rail 771, the rail 771 comprising two bars 772 in a generally vertical plane with spacers 773 there between. The bars 772 may have a circular section, although other sections may be used. This rail 771 design allows three dimensional track shapes to be manufactured using relatively simple two-dimensional curved sections of rail 771. Using relatively flexible rail 771 mounted to rigid pipe allows for fine-tuning of the trolley rail running surface to ensure a smooth ride. If for example, prefabricated sections were bolted together, it is more likely that mis-alignment would be present resulting in a potentially less smooth ride.

Track or Cable Transition System

The trolley system may be configured to traverse a transition, the transition located between a cable and rail or rail and cable, the transition acting to guide trolley system movement and orientation. As noted, the track system may have an allowance for transitioning between rail or cable systems. This embodiment may require unique features in the trolley, in the transitions between elements, and in the elements themselves. Typically art zipline rides are designed to operate only on cables or only on rails and do not and cannot transition between different track systems. Cable to rail transitions in particular involve some complexity. Cable tension from rider weight is transferred through axial tension back to the cable pylon or tower anchor to avoid stressing the cable at the transition section. In one embodiment, the cable is able to slide through the transition section in a controlled manner as the tension varies with rider weight and position along the cable.

The transition may have a shape that causes the trolley to change in vertical orientation and/or lateral orientation as the trolley traverses the transition. The transition for a cable to rail trolley system traversing may initially match a catenary shape of the cable to avoid bending of the cable and then, may match the required gradient of the subsequent rail. Cable transitions to rails may also include varying gradients of rail and this style of transition may benefit from the above style of transitions.

Transition sections may be bolted in place on or over a cable if desired or used separate to a cable. Rail section placement could be temporary for example to allow for cable servicing and inspection, or could be fixed for normal use.

Figure 88:
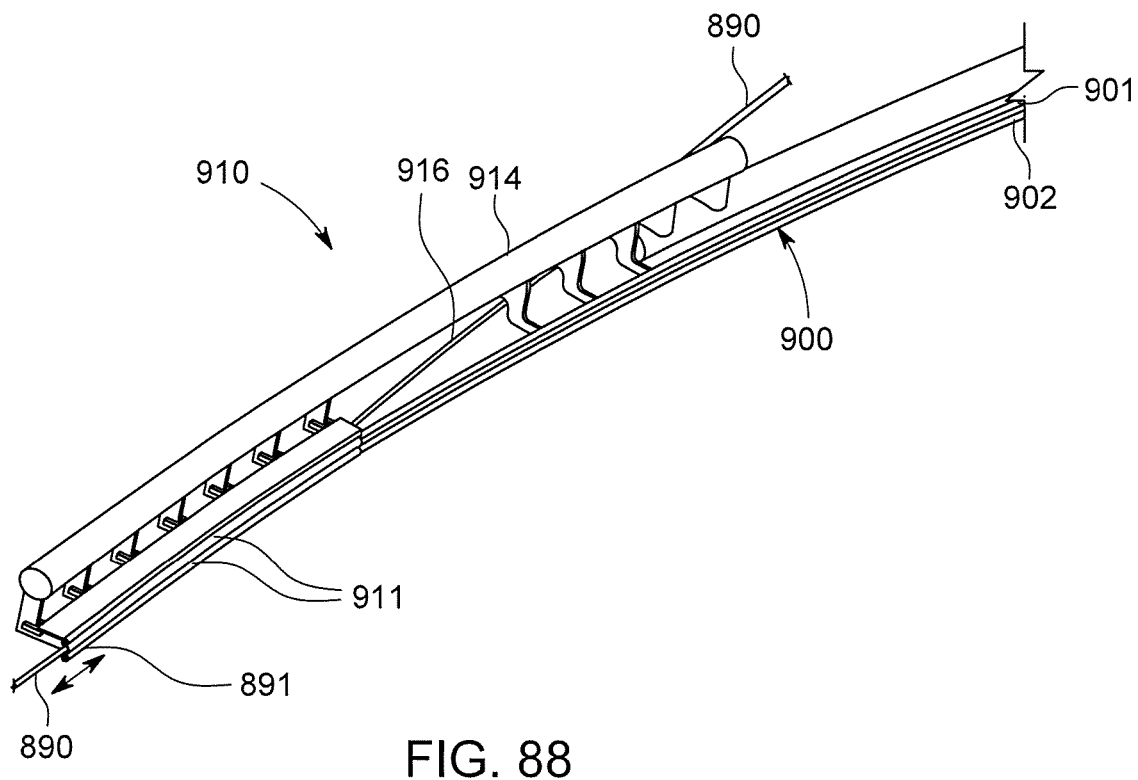
FIG. 88 shows a perspective view of a cable to rail transition.
Figure 89:
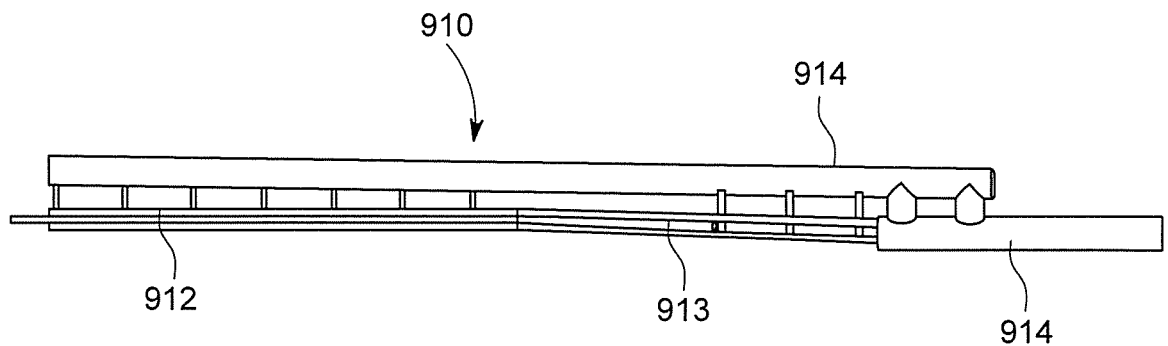
FIG. 89 illustrates the same transition as FIG. 88 but in a front elevation view.
Figure 90:
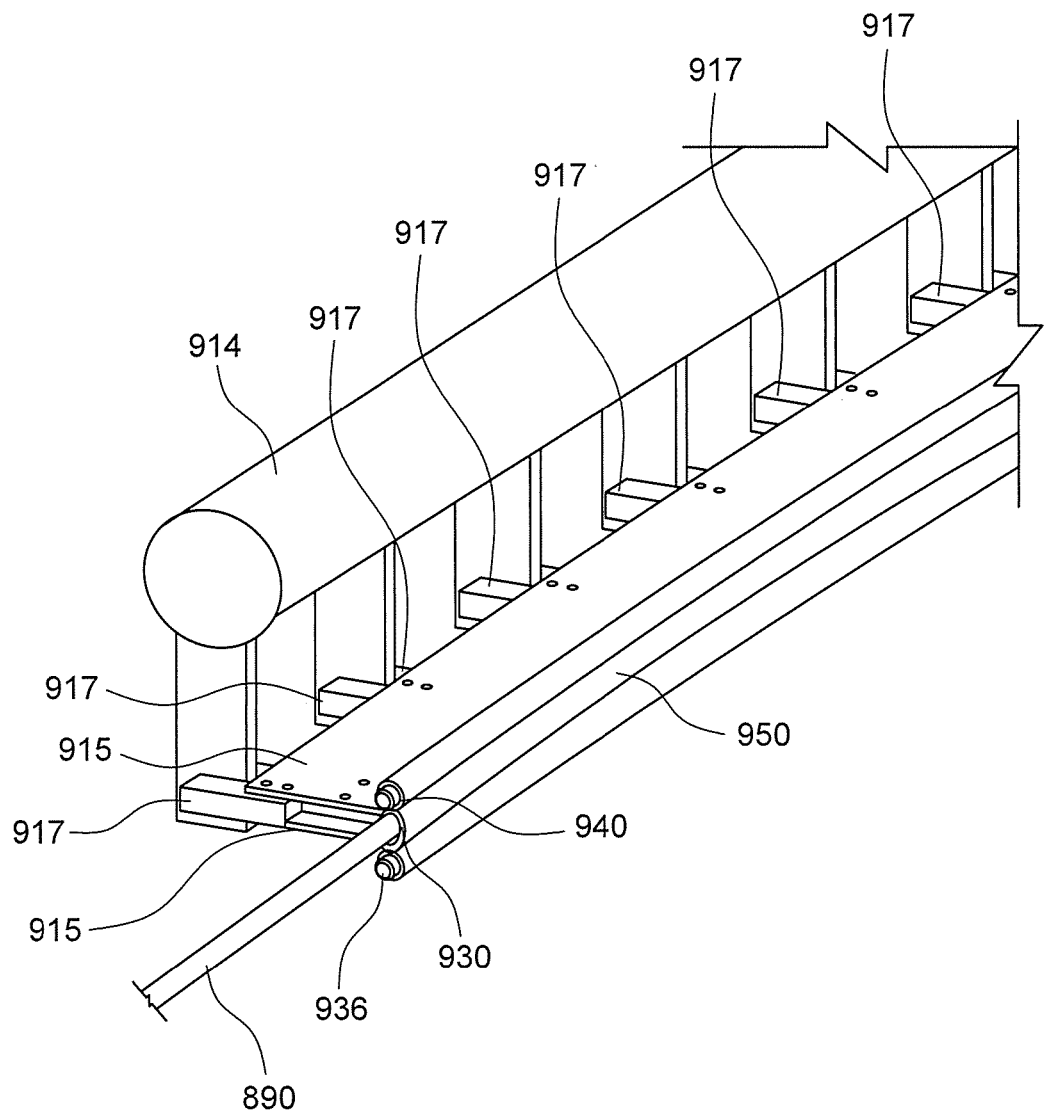
FIG. 90 illustrates a detail perspective view of the cable to transition entry point of the embodiment of FIGS. 88 and 89.

An example of the above transition is shown in FIGS. 88 to 90. FIG. 88 shows a perspective view of a cable 890 to rail 900 transition 910. FIG. 89 illustrates the same transition 910 but in a front elevation view. FIG. 90 illustrates a detail perspective view of the cable 890 to transition 910 entry point.

The lead in section 911 of the transition section 910 is fitted to a part of the cable 890, the cable 890 remaining unaltered in orientation at the transition 910 entry. The cable 890 enters the transition 910 at a point intermediate the rail 900 height in this example and the trolley upper wheels (not shown) in this example then transfer over the rail top bar 901 and continue to traverse this top bar 901. The lower wheel(s) (not shown) may engage at least to some extent the lower bar 902 of the rail 900. The rail 900 bars 901, 902 then redirect the trolley (not shown) from the cable 890, in this example by the rails 900 curving away from the cable 890. The cable 890 path as illustrated is unaltered and continues to the next pylon or tower (not shown) exiting the transition 910 at a point distal to the transition 910 lead in section 911 noted above.

The transition 910 best seen in FIG. 89 provides a gradient in transition from cable 890 to rail 900. Three distinct stages are illustrated in FIG. 89, the first stage 912 being a gradient matched to the cable 890 catenary to avoid stress and bending on the cable 890. The second stage 913 may have an increased gradient to traverse an elevation difference between the cable 890 catenary and a subsequent rail 900 section. The third stage 914 may match the gradient of a transition 910 support member 914 until the transition 910 is complete and the trolley (not shown) moves on to a standard rail section 900.

The cable 890 may displace axially through the transition section 910 due to fluctuating tension on the cable 890. This may occur for example due to intermittent rider loads on the cable 890.

The top and bottom bars 901, 902 or rail sections 900 may be bolted together about a cable 890. The bars 901, 902 along part of the transition 910 may be linked to flanges 915 best seen in FIG. 90. These sections 915, 901, 902 of the transition 910 may be removable and replaceable. Removal might be important to allow for inspection of a cable 890 portion obscured by the transition 910 during normal operation.

The rail bars 901, 902 may be linked to a track 900 support member 914. The track support member 914 may be used to provide a central structure for the rails 900 and assist to retain and align the rails 900 and other transition 910 parts. The track support member 914 in this example may take the form of an elongated round tube or bar however other shaped support members may be used. The support member 914 may be offset during at least part of the transition 910. An aim of the offset may be provide an open path for the cable 890 to exit the transition 910 marked by arrow 916.

Linkages 917 may link the rail 900 bars 901, 902 and support member 914. At the cable 890 and transition 910 interface, the linkages 917 may provide at least some degree of movement tolerance between the transition 910 position or more specifically the rail bar 901, 902 position and the cable 890 position. The linkages 917 are ideally of variable length so that local variations in cable 890 and transition 910 or rail 900 position may be taken up by the linkages 914, an aim being to avoid any stress on the cable 890 caused by local shape changes that might interfere with the catenary shape of the cable 890. In the embodiment shown, lap joints are used between the linkages 917 and rail 900 flanges 915, the lap joints overlapping to the extent required to fix the transition 910 support member 914 and rails 900/rail flanges 915. Due to this design, and the fact that cable 890 tension is transmitted directly back to the tower or pylon, no axial load due to cable 890 tension is imparted on the track support member 914.

Webbing 920 may be incorporated between the rail 900 round bars 910, 902 along at least part of the transition 910 path. As shown in at least FIG. 88, webbing 920 may be incorporated about a cable 890 exit point (item 916). The webbing 920 may be used instead of the linkages 917 noted above to allow a clear path for the cable 890 to travel as it exits the transition 910. The webbing 920 may be of variable length hence catering for varying sized openings 916 that may be needed, for example, depending on the rate of curvature of the rail bars 901, 902 from the cable 890-*a* tight radius may have a shorter opening required than a wide radius.

FIG. 90 shows how the rail bars 901, 902 at the first stage 912 of the transition 910 may include spigots 930 in their openings. The spigots 930 may act to help transmit any torque applied to the bars 901, 902 as a trolley (not shown) meets the bars 901, 902 from the bars 901, 902 to the support member 914 and in doing so relieve any localised stress formation. The entry point for the cable 890 into the transition 910 may also comprise a cable guide 940. The cable guide 940 may have a radius that allows for deflection of the cable 890, particularly under vertical load to avoid cable 890 fatigue occurring as repetitive trolley traversing occurs about the transition 910. The cable guide 940 may be manufactured from a sacrificial material that is replaced from time to time, the sacrificial material taking up wear and tear that might otherwise be transmitted to the cable 890. The cable 890 may also be further protected at least during the first stage 912 of the transition 910 via at least one additional sacrificial material 950 located between at least part or all of the cable 890 exterior and transition 910 elements. The sacrificial material 950 in this case may be shaped as a sleeve that fits over the cable 890 about the transition 910 or part thereof. This sacrificial material 950 may be important to absorb energy imparted on the cable 890 due for example to axial loading on the cable 890 due to axial displacement of the transition 910.

The ability for a trolley to be captured on a first element e.g. a cable or rail and safely transition onto a second element e.g. another rail or cable, may have considerable benefits in a range of applications, including amusement rides, emergency egress systems, goods transfers, and transportation systems. For all applications, it is critical to ensure the safety of the system by having the moving element, e.g. a trolley, fully captured on the cable or track system at all times. Failure to maintain capture could result in derailment.

Gating and Transitions

One important design aspect of zipline trolley design may be the need to keep the trolley attached to the guiding means be that cable or rail sections at all times and retain fail safe mechanisms to ensure that errant movement is arrested to prevent trolley derailment. That said, a completely and permanently enclosed trolley interior that the cable or track feeds through is not ideal since this prevents transitions from cable to rail sections, the rail sections being relatively wider in a horizontal plane than a cable. Further, for servicing or rescue of a rider, it may be useful to be able to disengage the rider from the cable or track irrespective of where the zipline trolley is along the cable or track. As a result it may be useful to incorporate a gating mechanism. The trolley system may in one embodiment comprise at least one gating mechanism that closes the trolley interior during movement but which opens the trolley interior about a rail section. The gating mechanism may operate automatically or manually as the trolley system traverses a track system. Manual opening may be useful for example to allow an operator to access the trolley system interior for maintenance. Automatic opening (and closing) may be useful to ensure smooth trolley system traversing of the track system.

The following example refers back to the application of the technology as an emergency egress system for escaping off a high rise building as illustrated in FIG. 2 and FIG. 3. The use of this example should not be seen as limiting, and the system may be used in a broad array of applications.

Figure 11:
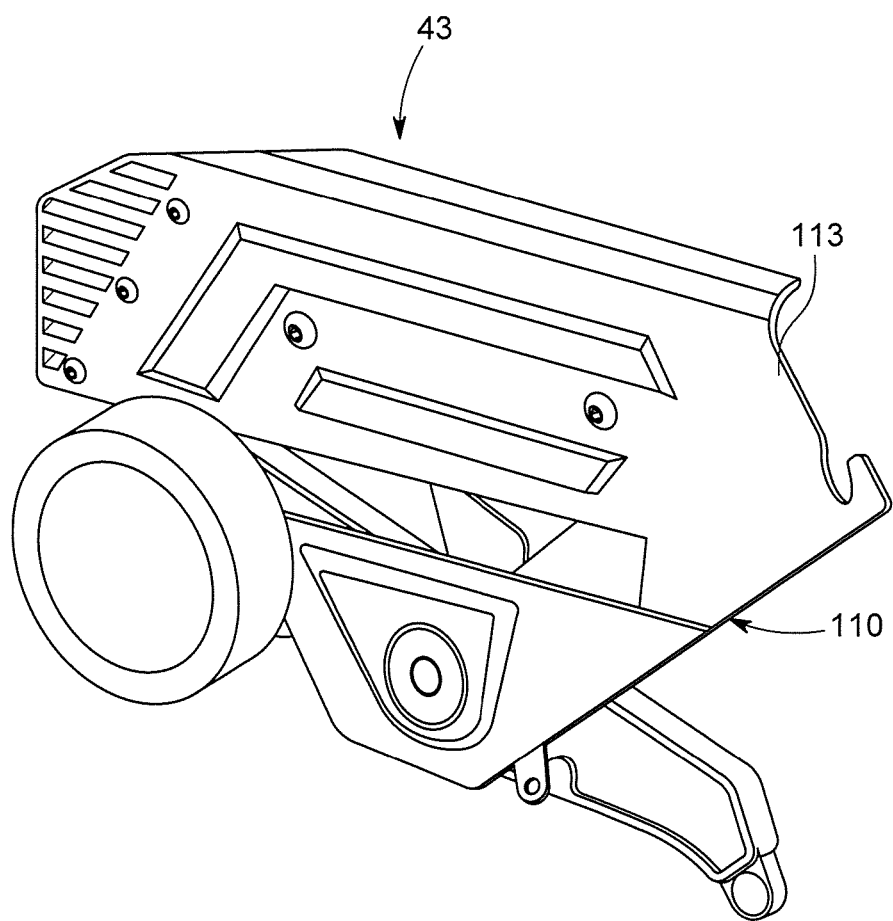
FIG. 11 illustrates images of one possible embodiment of trolley.
Figure 12:
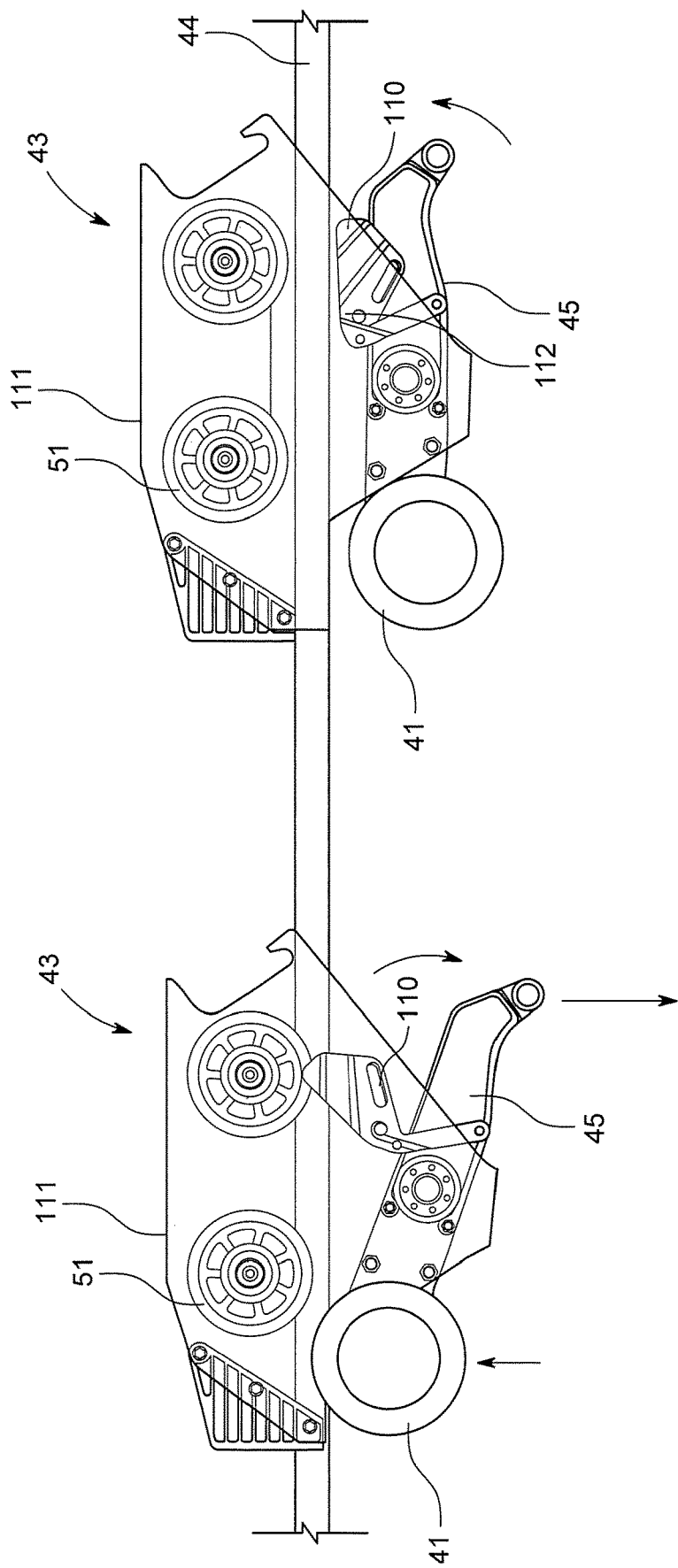
FIG. 12 shows schematics of loading a trolley on a cable and interaction of the trolley and cable once secured together.

The trolley system described earlier in FIG. 4 is now further described in FIG. 11 and FIG. 12 as regards gating. The trolley 43 may has a side entry gate 110, which may be used to install the trolley system 43 onto and remove it from the cable 44 or track (not shown) onto which it is placed. FIG. 12 shows the system with the exterior cover 113 of the trolley system 43 removed and the trolley 43 located on a cable 44. To install this trolley 43 onto a cable 44, it is required to lift the rider 1 mounting location on the pivot arm 45 up towards the body 111 of the trolley 43. This motion causes the trolley 43 arm 45 to pivot and lowers the braked wheel 41 away from the cable 44. This provides sufficient clearance to allow a thin section of the track or cable 44 to escape from between the front wheels 41, 51 of the trolley system 1. Attached to the pivot arm 45 of the trolley 43 may be an interlocked gate system 112, as shown in FIG. 12. When the pivot 45 is lifted upward, and a secondary release element is activated, the interlocked gate 112 is free to move and the gate 112 may open. If the secondary release element is not activated, the gate 112 will not be able to be release fully to the extent that the cable 44 or track will not be able to be installed past the gate 112 and into the path of the wheels 51.

When the interlocked gate 112 is fully opened, the trolley 43 may be installed onto the smallest section of the cable 44 or rail (not shown) by offering it up sideways (laterally) to the cable 44 or rail. Once the cable 44 or track is located in the correct location between the wheels 41, 51 of the trolley 43, the rider 1 mounting point may then be pulled downward and the gap between the braked wheel 41 and the front wheel 51 of the trolley 43 may close to capture the cable 44 or rail. At the same time, the interlock gate 112 may also be closed thereby preventing the cable 44 or rail from extracting from the rear of the trolley 43. At this point the cable 44 or rail may be fully encapsulated by the trolley 43 and the system may be safe to operate. When the weight of the rider 1 is taken by the trolley 43 via the rider 1 mounting location, the pivot arm 45 may then not be manually lifted upward which assists to prevent the trolley 43 from derailment off the cable 44 or rail under normal operation.

As noted above and with reference to at least FIG. 12, the zipline trolley may incorporate gating systems that can selectively open and lock closed.

Figure 29:
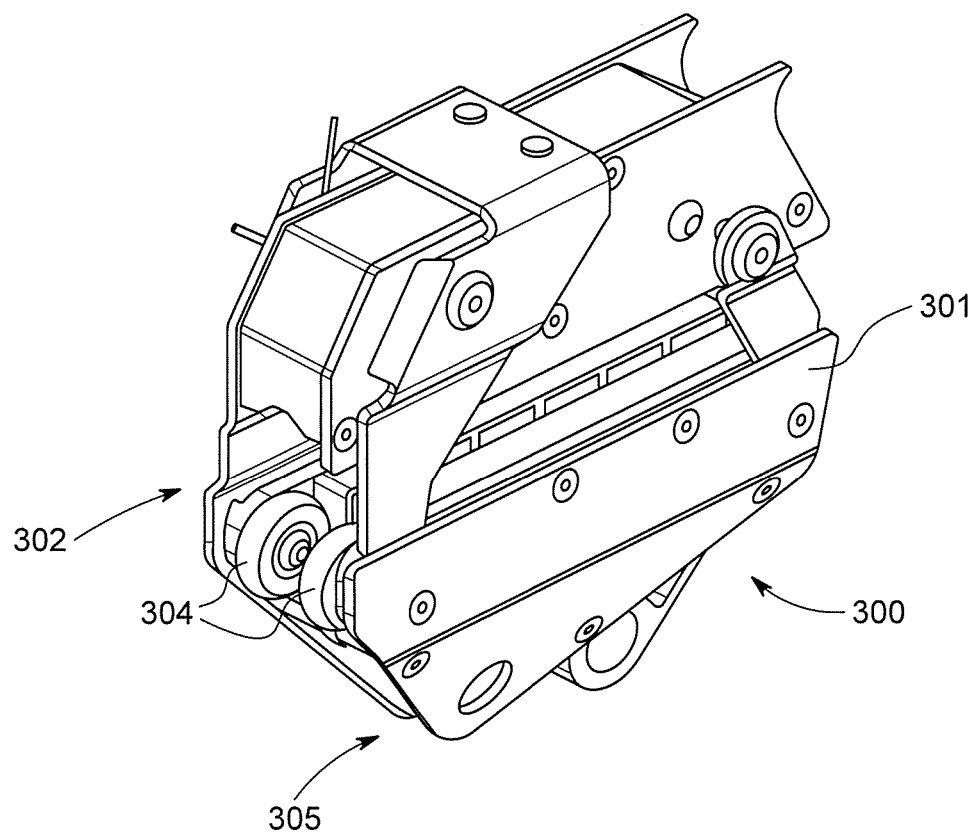
FIG. 29 illustrates a perspective view of an alternative zipline trolley embodiment.
Figure 30:
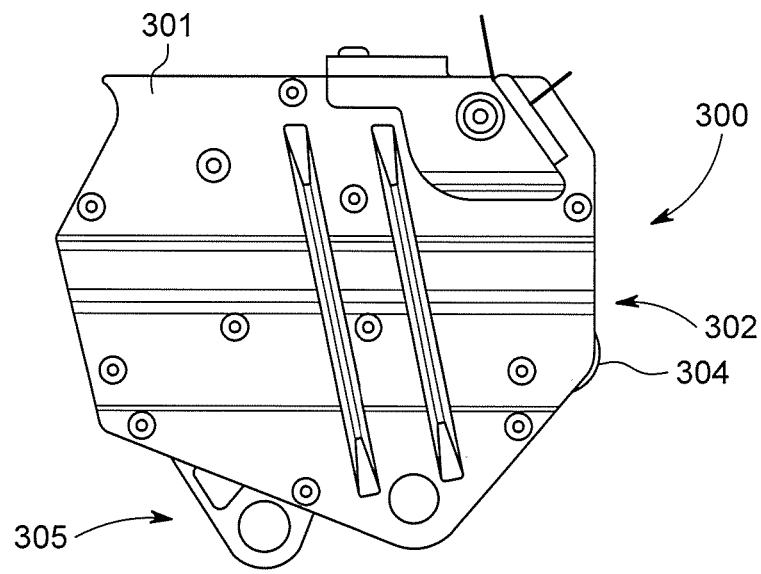
FIG. 30 illustrates a rear-side elevation of the alternative zipline trolley embodiment of FIG. 29.
Figure 31:
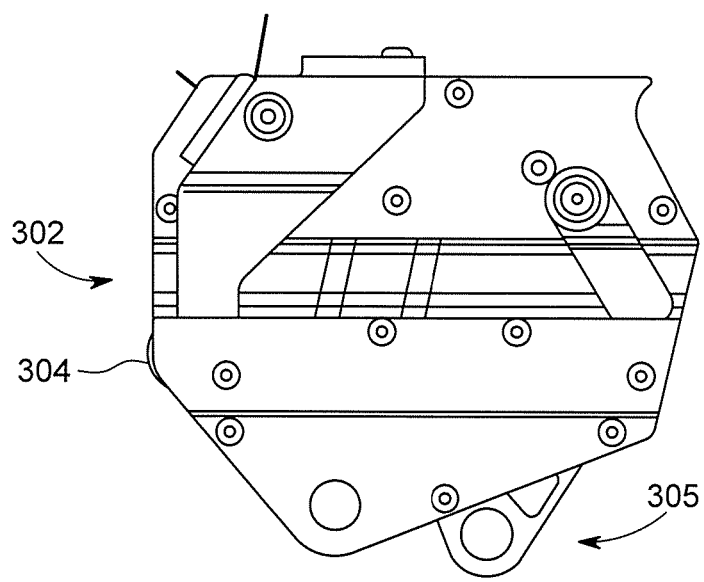
FIG. 31 illustrates a front-side elevation of the alternative zipline trolley embodiment of FIG. 29.
Figure 32:
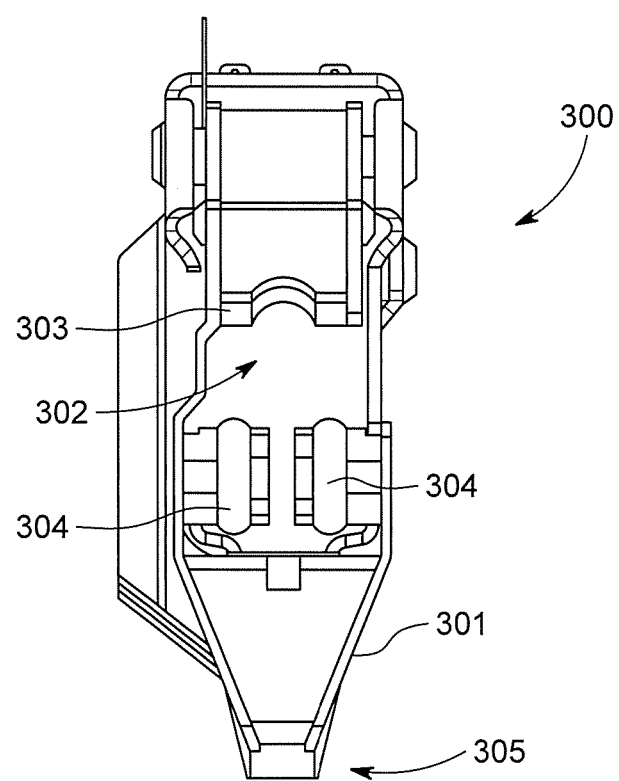
FIG. 32 illustrates a front elevation about the leading face of the zipline trolley embodiment of FIG. 29.
Figure 33:
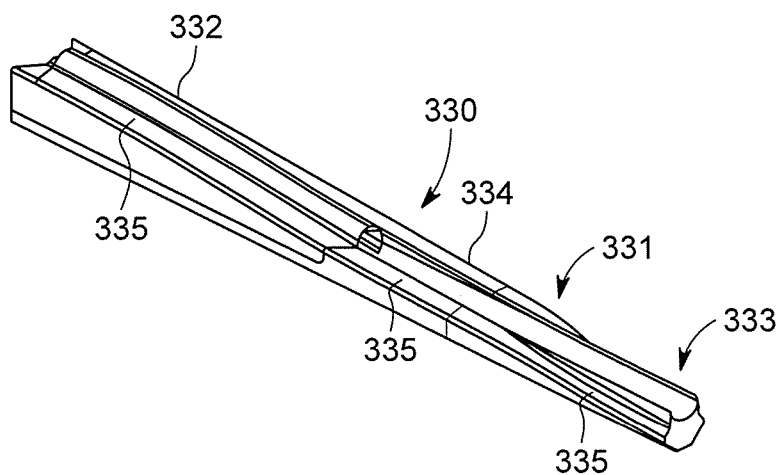
FIG. 33 illustrates a perspective view of a lead in section of track.
Figure 34:
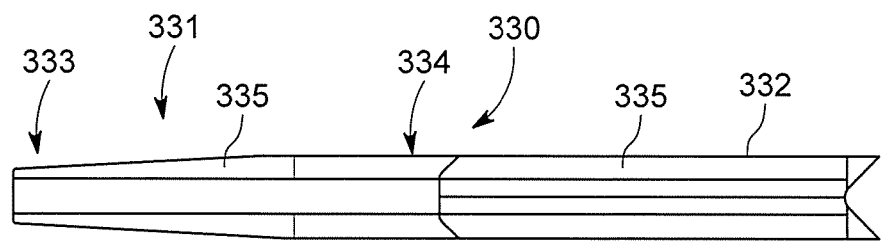
FIG. 34 illustrates a view from above of the lead in section of track of FIG. 33.
Figure 35:
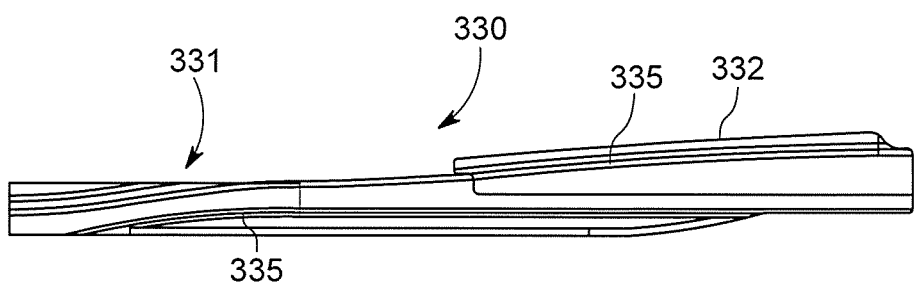
FIG. 35 illustrates a side view of the lead in section of track of FIG. 33.
Figure 36:
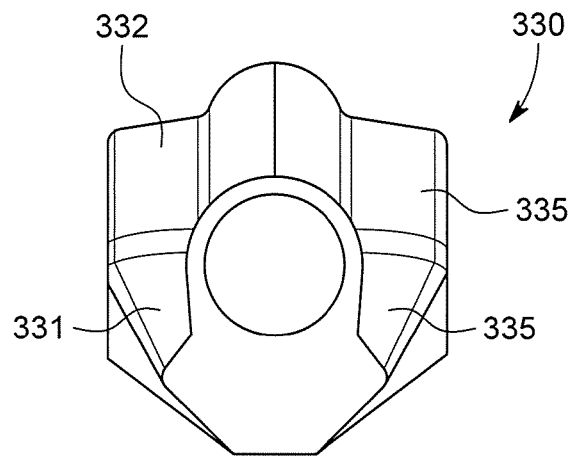
FIG. 36 illustrates an end view of the lead in section of track of FIG. 33.

As an alternative mechanism to that described above, a gating mechanism is described below with reference to FIG. 44 to FIG. 52 using the zipline trolley 300 shown in FIG. 29 as a further embodiment. As noted earlier, the trolley 300 may comprise a body 301 with upper 303 and lower 304 wheels and the cable 336 or rail 400 passes through the body 301 of the trolley 300 between the wheels 303, 304. Also as shown in the Figures, a trolley 300 side may comprise gates, in this embodiment being a forward main gate 450 and rearward trailing gate 451.

Figure 44:
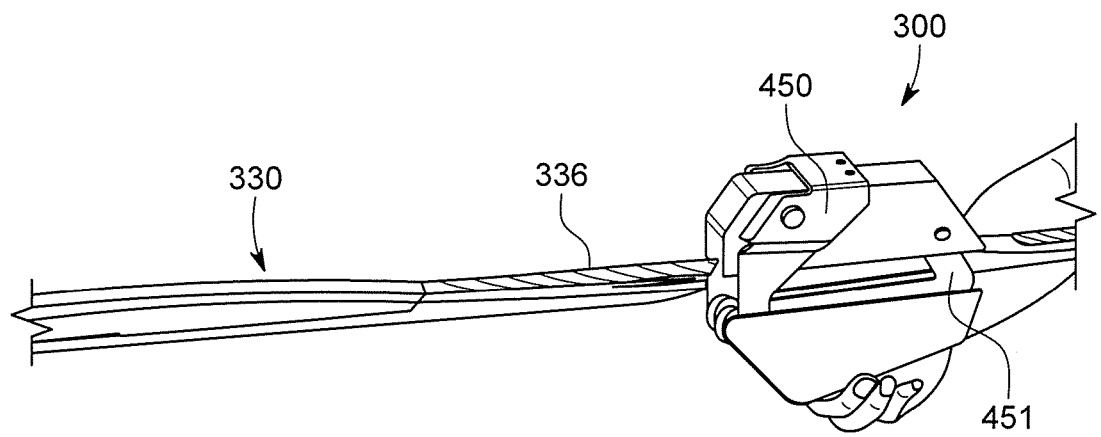
FIG. 44 illustrates the zipline trolley embodiment of FIG. 29 traversing a cable run prior to transitioning to a track section.

FIG. 44 illustrates the trolley 300 traversing a cable 336 prior to transitioning to a rail section 400. The forward gate 450 and trailing gate 451 are both closed preventing the cable 336 from moving out of the body 301 interior. In this configuration, the gates 450, 451 are locked shut with an interlock between the forward and trailing gates 450, 451 preventing the trailing gate 451 from opening unless the forward gate 450 opens.

FIG. 45 shows the trolley 300 moving up the lead in or transition section 330 from cable 336 to rail 400. As can be seen in FIG. 45, the rail 400 extends out sideways from the cable 336 longitudinal axis in a generally horizontal plane.

Figure 46:
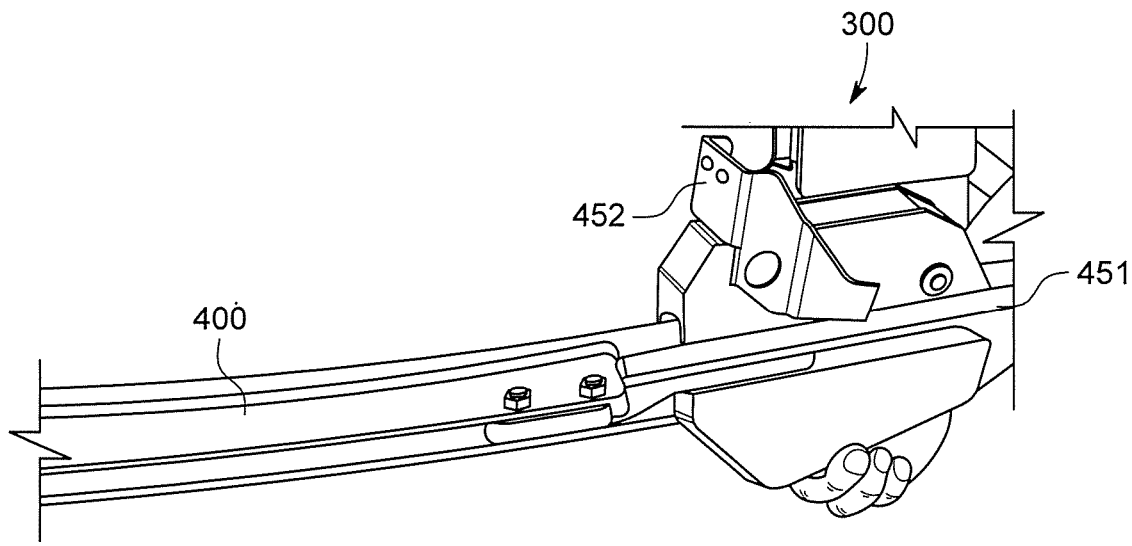
FIG. 46 illustrates the zipline trolley embodiment of FIG. 29 interacting with an entry flange during transition to a track section.

Immediately prior to a rail section 400 extends a horizontally mounted entry flange. As shown in FIG. 46, the lower wheel or wheels 304 travel beneath the entry fin (described further below) and, as the entry flange enters the trolley 300 body 301, the entry flange strikes a lower section of the forward gate 450 causing the gate 450 to pivot about a pivot point located on the upper section of the trolley body 301 and thereby opening the trolley 300 side. The entry flange may be shaped to cause disengagement of the gate interlock prior to or at the same time as the entry flange strikes the forward gate 450 to allow the forward gate 450 to pivot freely. Note that the forward gate 450 once pivoted has a section that extends above the body 301 of the trolley 300. In FIG. 46 the entry flange has entered part of the trolley body but not yet struck the trailing gate 451. As the entry flange moves further into the trolley body 301, the entry flange strikes the trailing gate 451 causing the trailing gate 451 to also pivot up and over the entry flange. The trailing gate end 451 then drags over the upper track 400 surface thereafter. It should be appreciated that alternative configurations are possible for triggering and unlatching of the forward and trailing gates 450, 451. These are considered within the scope of this disclosure and references made in the above should not be seen as limiting.

Figure 47:
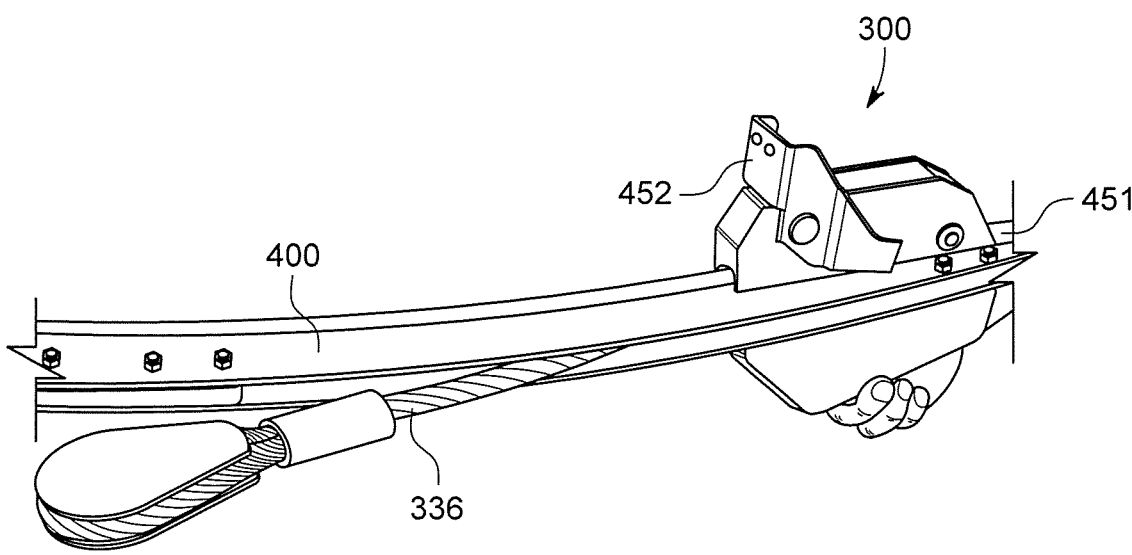
FIG. 47 illustrates the zipline trolley embodiment of FIG. 29 moving about a track section.
Figure 48:
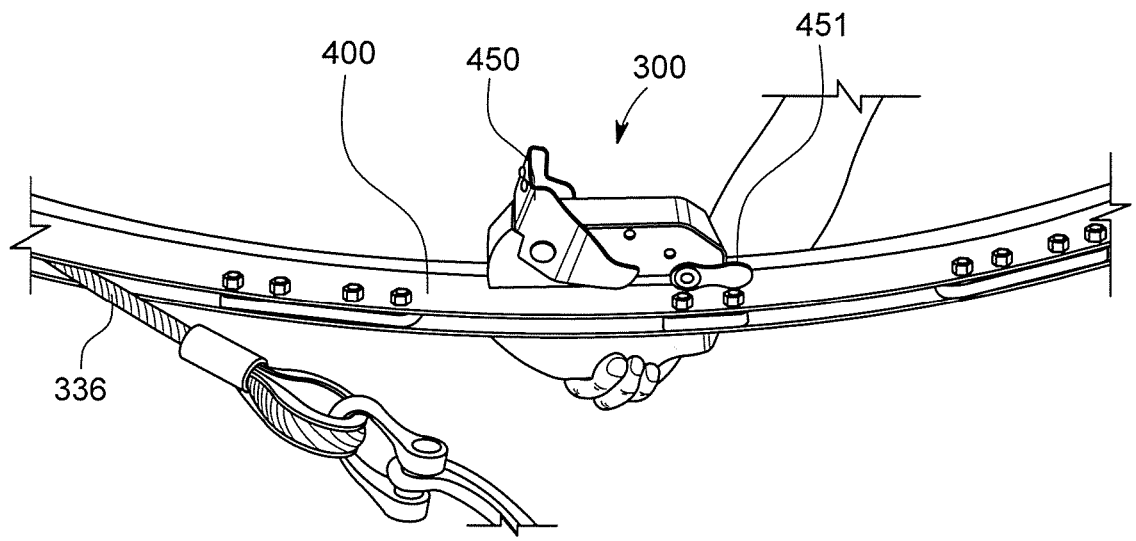
FIG. 48 illustrates the zipline trolley embodiment of FIG. 29 moving about a track section.

FIG. 47 and FIG. 48 illustrate the trolley 300 now moving about a rail section 400, the rail section 400 turning 90 degrees relative to the first cable 336 section. As can be seen, the forward gate 450 remains pivoted up with a section remaining above the trolley body 301 while the trailing gate 451 remains pivoted above the rail 400, one end trailing along the rail 400 upper surface.

Figure 49:
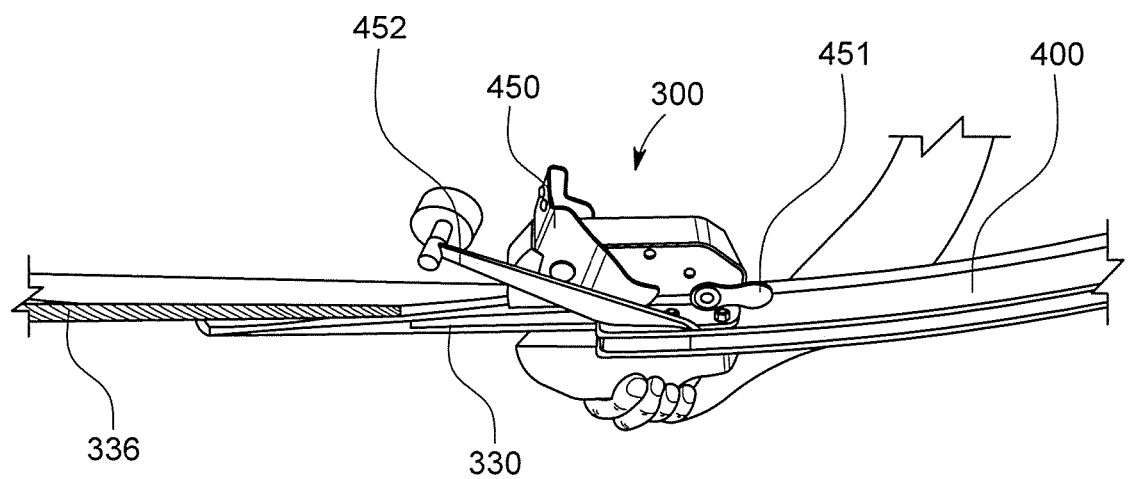
FIG. 49 illustrates the zipline trolley embodiment of FIG. 29 about to transition off the track section and onto a new cable section.
Figure 50:
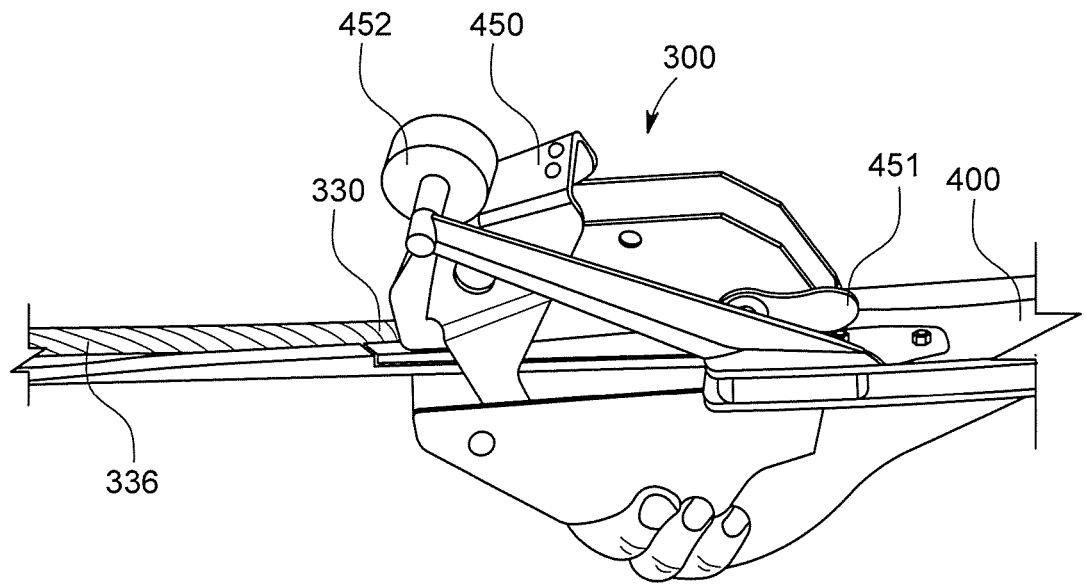
FIG. 50 illustrates the zipline trolley embodiment of FIG. 29 with the forward gate striking the bump bar and pivoting back down to a closed position prior to commencing cable movement
Figure 51:
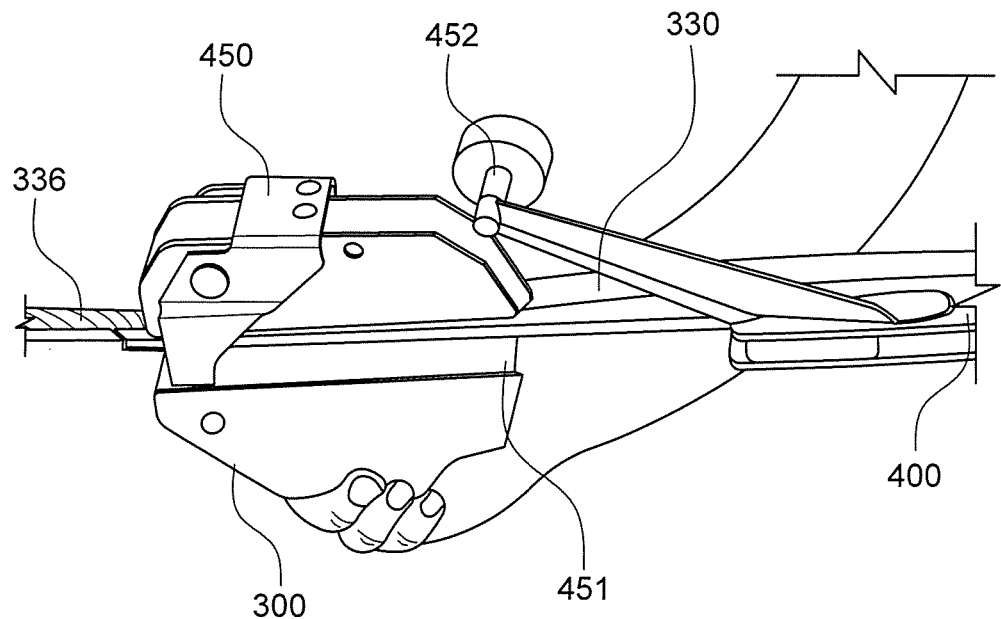
FIG. 51 illustrates the zipline trolley embodiment of FIG. 29 having traversed slightly further forwards towards a new cable section, the forward gate now locked closed and the trailing gate now also closed.
Figure 52:
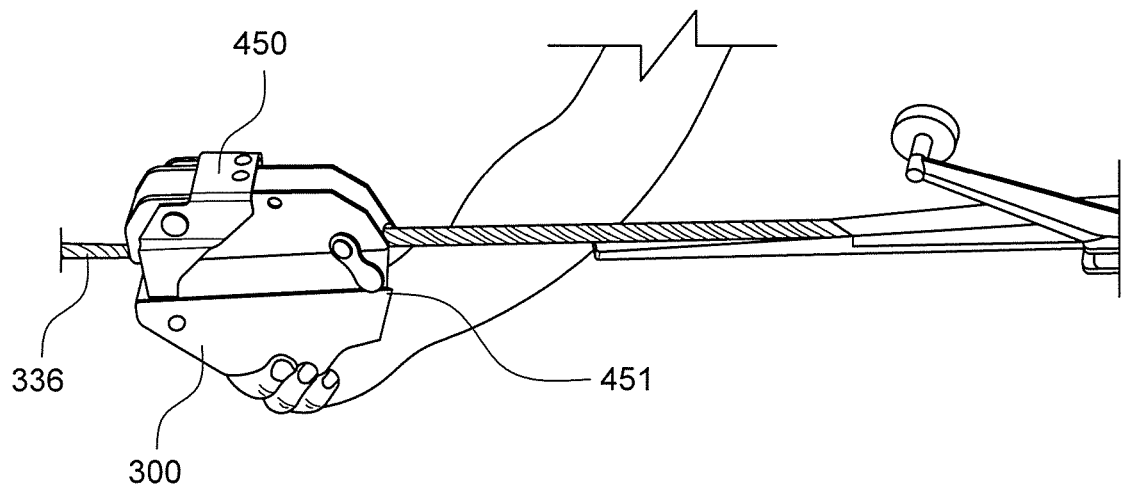
FIG. 52 illustrates the zipline trolley embodiment of FIG. 29 having moved fully onto the next section of cable with the gates closed
Figure 53:
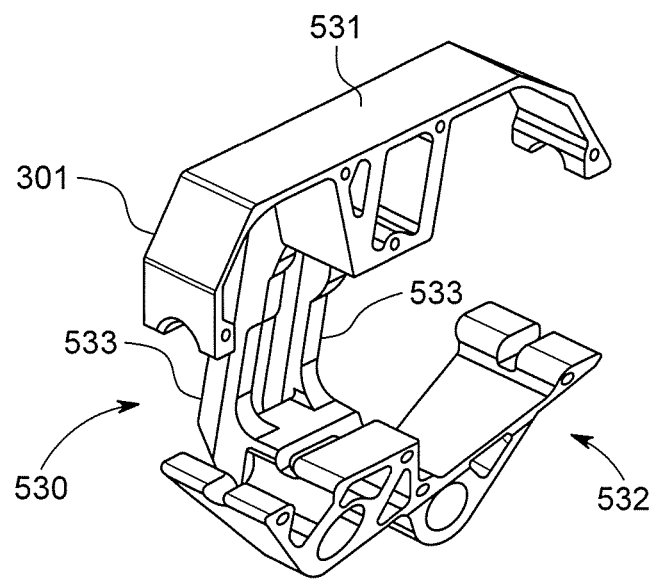
FIG. 53 illustrates a perspective view of a body section used in the zipline trolley embodiment of FIG. 29.
Figure 54:
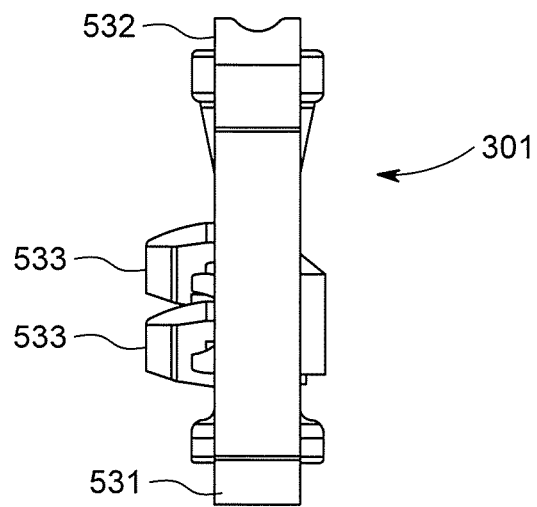
FIG. 54 illustrates a view from above of a body section used in the zipline trolley embodiment of FIG. 29.
Figure 55:
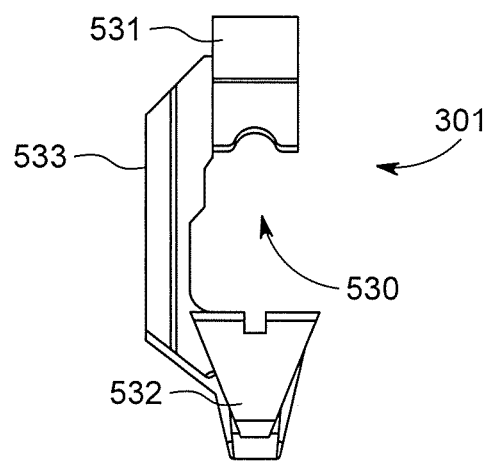
FIG. 55 illustrates a front view of a body section used in the zipline trolley embodiment of FIG. 29.
Figure 56:
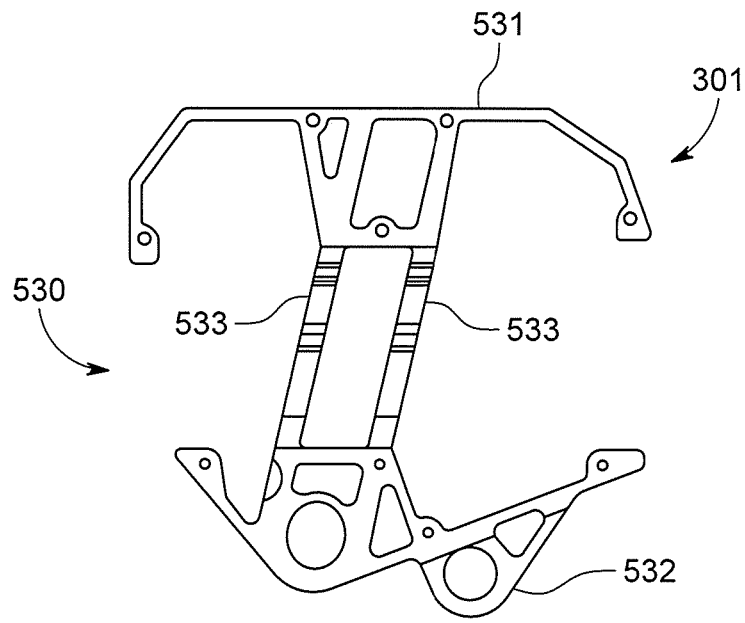
FIG. 56 illustrates a view from a first side of a body section used in the zipline trolley embodiment of FIG. 29.

FIG. 49 shows the trolley 300 about to transition off the rail section 400 and onto a new cable 336 section. As shown in FIG. 49, the rail 400 has a lead out section 330 described in detail above. A bump bar 452 or other obstructing member is located above the lead out section 330 that the trolley 300 may pass under but which the raised section of forward gate 450 will strike as the trolley 300 traverses down the lead out section 330. FIG. 50 shows the forward gate 450 striking the bump bar 452 and pivoting back down to a closed position prior to commencing cable 336 movement and FIG. 51 shows the trolley 300 having traversed slightly further forwards, the forward gate 450 now locked closed and the trailing gate 451 now also closed as any obstruction to trailing gate 451 pivot movement down (the track) is removed. The interlock mechanism may be configured so that the trailing gate 451 may only open if the forward gate 450 is open and the trailing gate 451 may automatically lock closed once the forward gate 450 is closed. FIG. 52 shows the trolley 300 having moved fully onto the next section of cable 336 with the gates 450, 451 closed.

Figure 71:
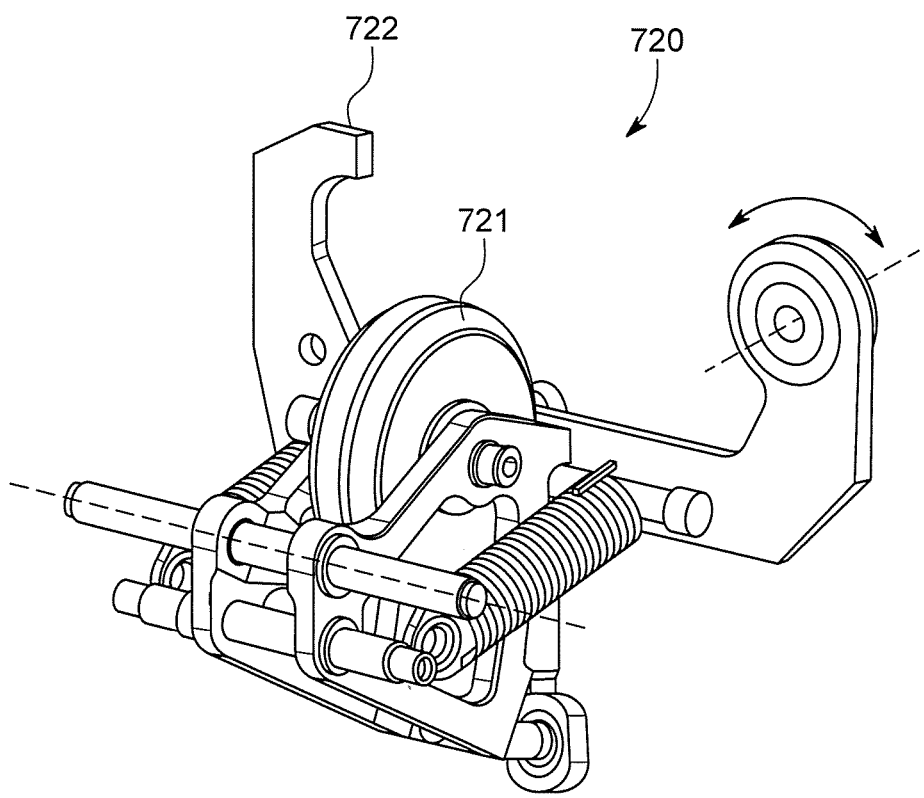
FIG. 71 shows a perspective view of an alternative gating embodiment.
Figure 84:
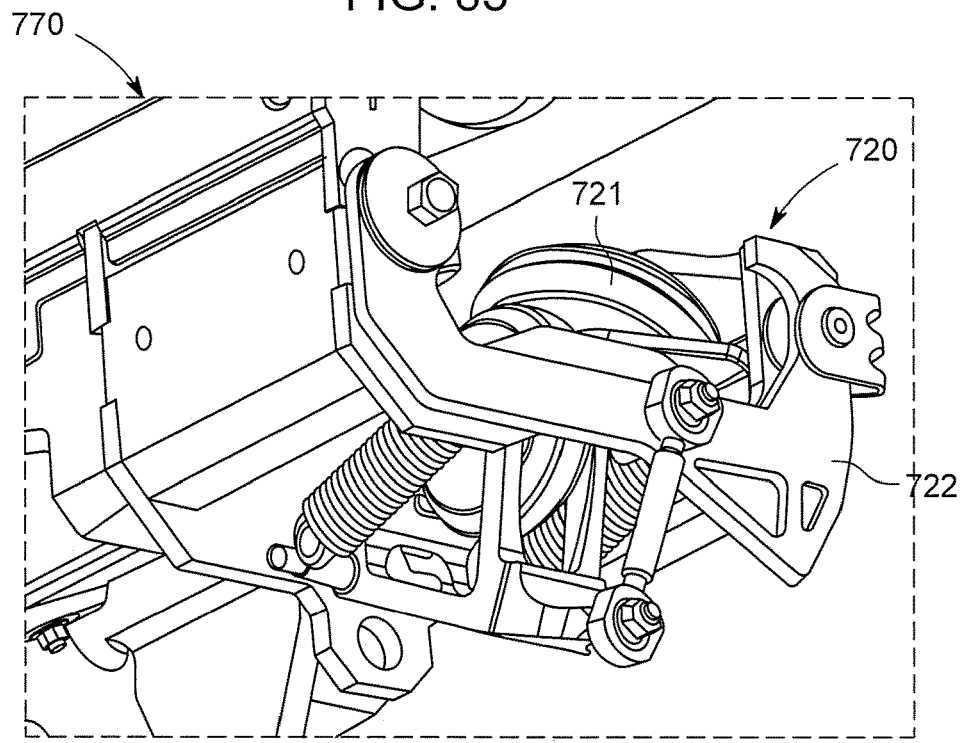
FIG. 84 shows a detail view of the gating embodiment for the trolley of FIG. 76 in an open rail traversing section of track.
Figure 85:
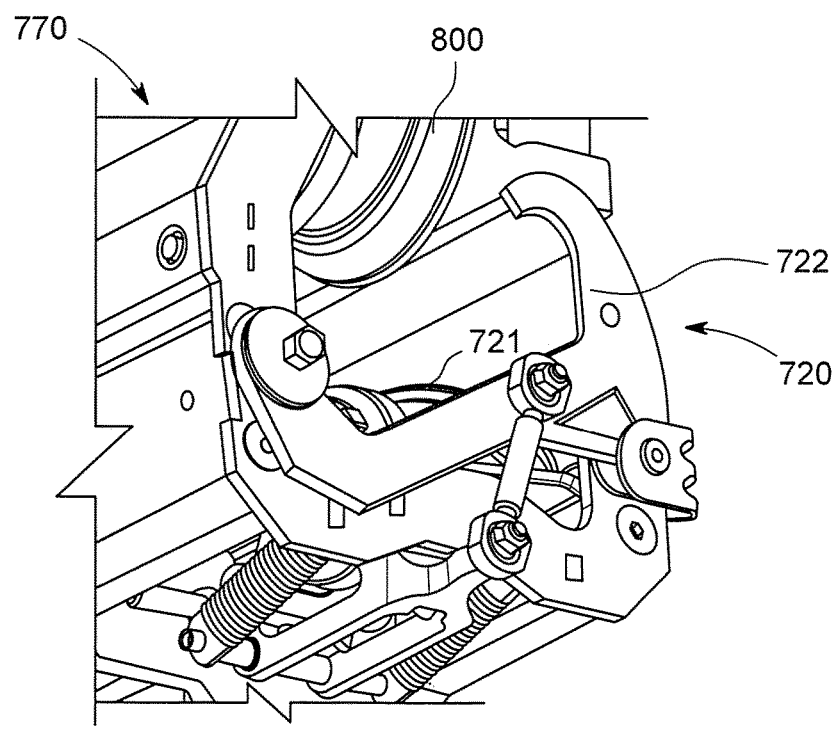
FIG. 85 shows a detail view of the gating embodiment for the trolley of FIG. 76 in a closed cable traversing section of track.

A further gating embodiment is shown in FIG. 71 and more details in FIG. 84 (gate open configuration) and FIG. 85 (gate closed configuration). In this embodiment the gating concept is similar to above but does not operate stand-alone from the trolley. Two gates 720 are fitted, one at each end of the trolley 770. These gates 720 are intended to retain the rider on the cable if the upper wheels 800 de-rail. The gate 720 geometry and the chassis 830 of the trolley 770 may be shaped to guide the cable back into the upper wheels 800 in the event of a derailment. The gating 720 actuation uses a jockey wheel 721 acting on a ramp. This ensures smooth and robust running for high-speed transitions. Gating movement is limited in the 'open' which helps to ensure that the jockey wheel 721 provides retention of the trolley 770 on rail sections. In this embodiment the gate mechanism may be linked to the lower jockey wheel(s) 721, so is opened, held open and then allowed to close based on the way the lower wheels 721 interact with a rail section 724. This mechanism is described elsewhere in this specification with reference a lower wheel or jockey wheel 721.

As should be appreciated other forms of gating and automation may be used and the above embodiment should not be seen as limiting. The above gating embodiment may however be useful in that it may prevent unwanted release from cable or rail guiding member sections yet can adapt to different guiding members rapidly and automatically with a minimum of moving parts and complexity. As should further be appreciated, a concealed or otherwise release actuator may be incorporated into the design to allow an operator or rescue services for example to also open the gates were maintenance or rescue trolley removal required. Release however like this may be concealed and not generally accessible to avoid unwanted gate opening. Release may be activated by use of a tool.

Lower Wheel May be a Jockey Wheel

Figure 73:
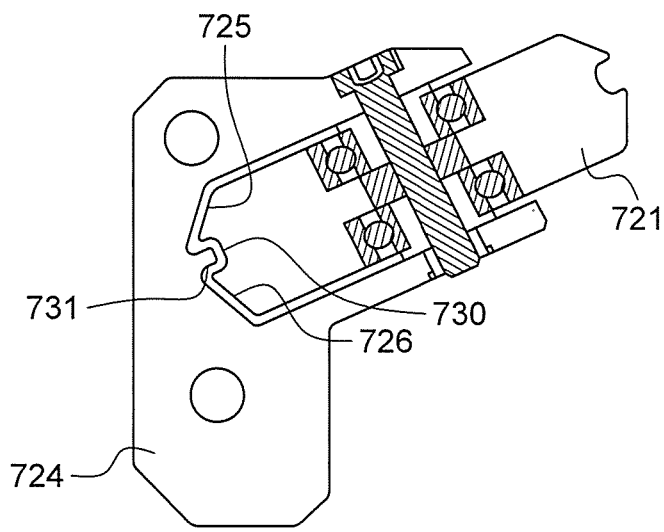
FIG. 73 shows a section front view of the gating jockey wheel interacting with a section of track in the above alternative gating embodiment.
Figure 86:
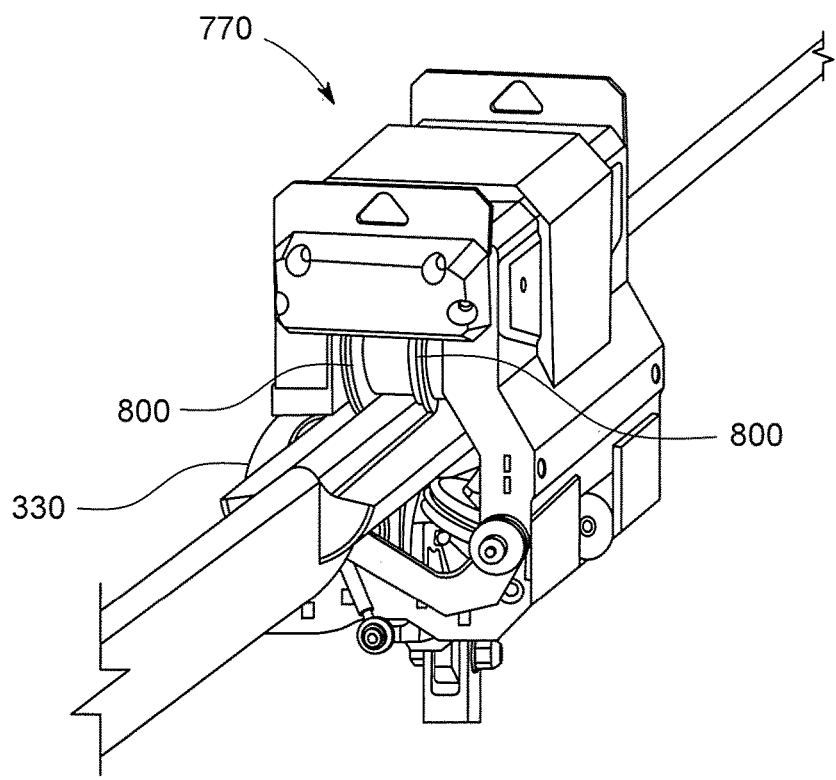
FIG. 86 shows a perspective view of the trolley of FIG. 76 transiting a transition in a neutral alignment.
Figure 87:
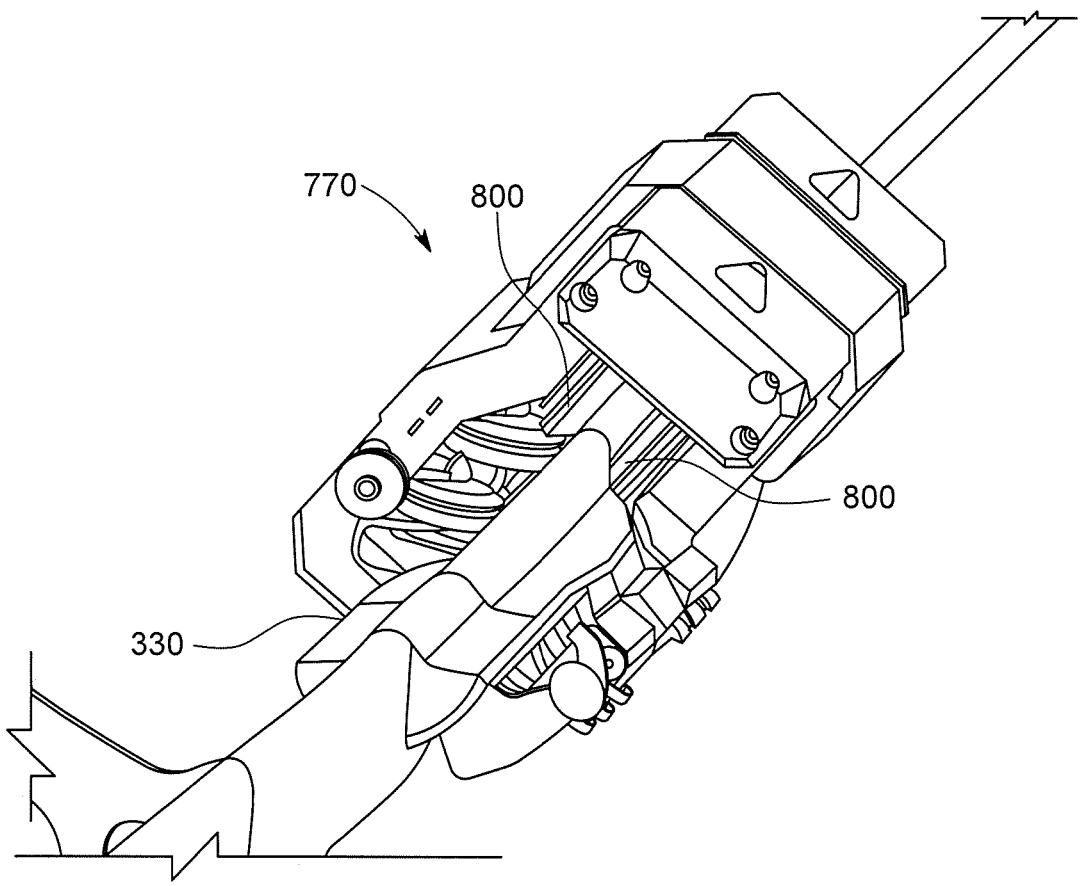
FIG. 87 shows a perspective view of the trolley of FIG. 76 transiting a transition in an offset position prior to the transition re-aligning the trolley.

The gating used on the trolley as described above may also comprise directing parts that work in concert with the gating to help guide the trolley along a cable or rail and across transitions between cables or rails. Using the gating embodiment shown in FIG. 71, a jockey wheel 721 directing part is illustrated. The jockey wheel 721 is linked to the gate arm 722 in this case in a biased manner using springs 723 to urge the jockey wheel 721 against cable or rail 724 during normal operation and to close the gate 722. As shown in FIG. 73, the jockey wheel 721 has first and second flat faces 725, 726 disposed on substantially opposing sides of the outermost circumference of the wheel 721. The first face 725 engages with an alignment face 727 of a transition element 330 to bring the trolley into the correct orientation relative to the rail 724 or track. The second face 726 of the jockey wheel 721 engages with the underside of the rail 724 as the trolley travels along and around a curve described by the transition element 330. The jockey wheel 721 may lead the gate 722 during normal or forwards motion of the trolley. The jockey wheel 721 may act to prevent the trolley from falling off a cable or rail in the event of a derailment. The jockey wheel 721 may also act to limit vertical motion through rail sections. When a transition 330 is reached between a cable and rail or rail and cable, the jockey wheel 721 may lead and direct the trolley along the transition 330 in a desired alignment. FIG. 83 and FIGS. 86 and 87 show the jockey wheel 721 in more detail interacting with a section of rail 724. In this example, the rail 724 has top and bottom flanges 728, 729 and the jockey wheel 721 nests between the flanges 728, 729. Because the jockey wheel 721 is trapped between the flanges 728, 729, movement is limited to only forwards or backwards motion. This prevents unwanted movement and may maintain clearance between the trolley body and rail 724 as a trolley traverses rail 724 sections.

Figure 72:
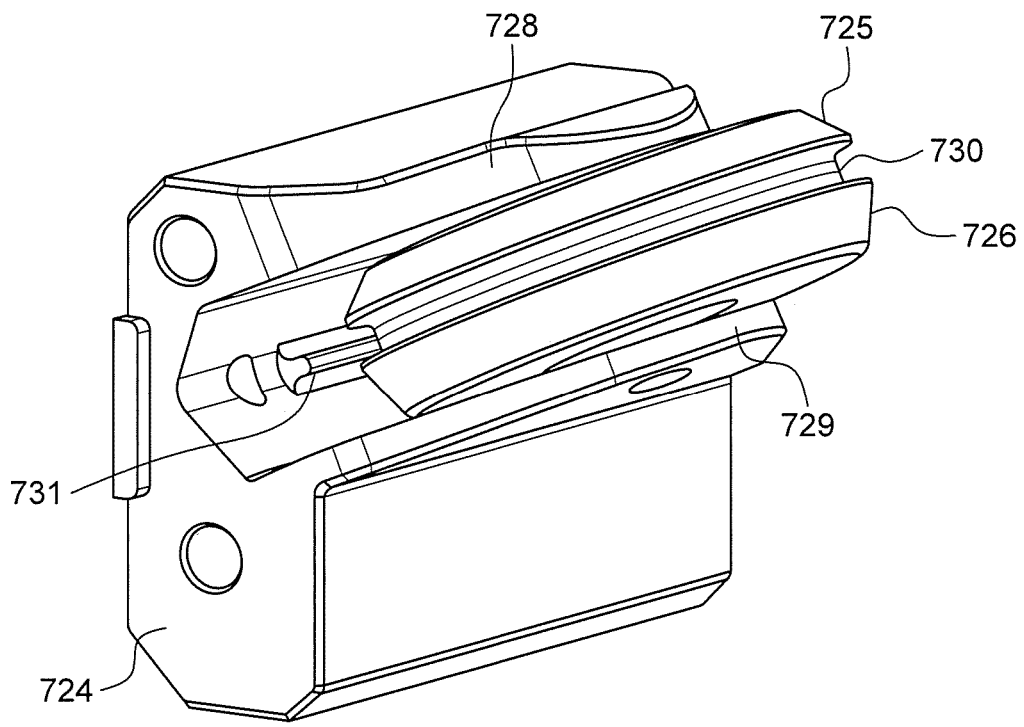
FIG. 72 shows a perspective detail view of the gating jockey wheel interacting with a section of track in the above alternative gating embodiment.

In FIG. 72 and FIG. 73, the wheel 721 may be formed to include a groove 730 about the external circumference of the wheel 721. This groove 730 may mate with a corresponding protrusion 731 from the rail 724. This relationship between a wheel groove 730 and rail protrusion 731 may further act to align the jockey wheel 721 in place. If the groove 730 and protrusion 731 is somewhat offset from a central position best seen in FIG. 7, the jockey wheel 721 may only be fitted in one orientation and one side of the wheel 721 may have a somewhat wider face to further assist with wheel and rail interactions.

Track System Transitions

A key functionality of this system may be the ability of the trolley to be able to transition from one cable or track onto another while remaining fully captured at all times. The region between a cable and rail or rail and cable that a trolley system traverses comprises at least one transition that acts to guide trolley system movement and orientation.

One example form of transition is shown in FIG. 13 and FIG. 14, with the trolley (the embodiment of FIG. 4 is shown as an example) 43 moving from a cable 44 to a rail 130. The functionality of the trolley 43 as this occurs is presented in FIG. 15.

FIG. 14 shows the lead in angle of the transition locations. As drawn, the lead in section 131 of the transition 132 has the same radius as the cable on the top and bottom surfaces. This allows the curvature of the wheels 41, 51 of the trolley 43 to maintain good contact with these surfaces 131 throughout the transition 132. These surfaces 131 spread further apart as they move up the tapered section until they are sufficiently far apart 133 that the cable 44 may be extracted from between the transition 132 surfaces 133.

As may be appreciated from the above, transitioning, for example from a cable to a rail section provides several design challenges. Firstly, for a cable run, the cable generally nests into upper wheels as described above. On a flat rail, nesting like this does not occur. On a rail section, some form of stabilising is needed on the lower side of the trolley. This lower stabilisation is of less or even no relevance during a cable section. Further, on a cable section, the gating should be closed to prevent separation of the trolley from the cable. On a rail section, gate opening may be essential to allow trolley removal and placement onto the rail and to allow for changes in trolley movement direction.

Example of Trolley Movement onto the Transition

Using the pivot arm trolley embodiment as an example, as the trolley 43 rides onto the transition section 132, the gap 134 between the top wheels 51 and the lower wheel(s) 41 may be forced open (best seen in see FIG. 15). This is accommodated through the lower wheel 41 being forced downward away from the upper wheels 51. In doing this, the rider 1 (attached to the other end of the pivot arm) may be forced upward. The interlocked gate 112 may be forced to slowly open as the pivot arm 45 is rotated. The degree of opening may be controlled by the trolley 43 design and geometry and therefore ensures it remains sufficiently closed to prevent the transition 132 from being able to be extracted laterally out the side of the trolley 43. The shape of the top and bottom surfaces of the transitions 132 remain firmly located in the braked wheel 41 and top wheels 51 throughout this action, and the weight from the rider 1, delivered through the pivot 45 to the braked wheel 41, ensures that both the braked wheel 41 and top wheel 51 stay firmly clamped to the transition elements 132.

Once the braked wheel 41 has traversed up the slope of the transition elements 132 the trolley 43 is located fully on the top and bottom surfaces of the transition 132. At this point 133, the transition 132 forms an oblong shape, with rounded top and bottom surfaces. While the trolley 43 is oriented in the vertical direction (as drawn in FIG. 14) it may not escape off the cable 44 and the transition 132 remains captured.

The lower left image in FIG. 15 shows the trolley 43 attached to the transition element 132, with the transition element 132 encapsulated by the front wheel 51 and brake wheel 41 at the front of the trolley 43 and between the gate 112 and back wheel 51 towards the rear of the trolley 43.

Figure 16:
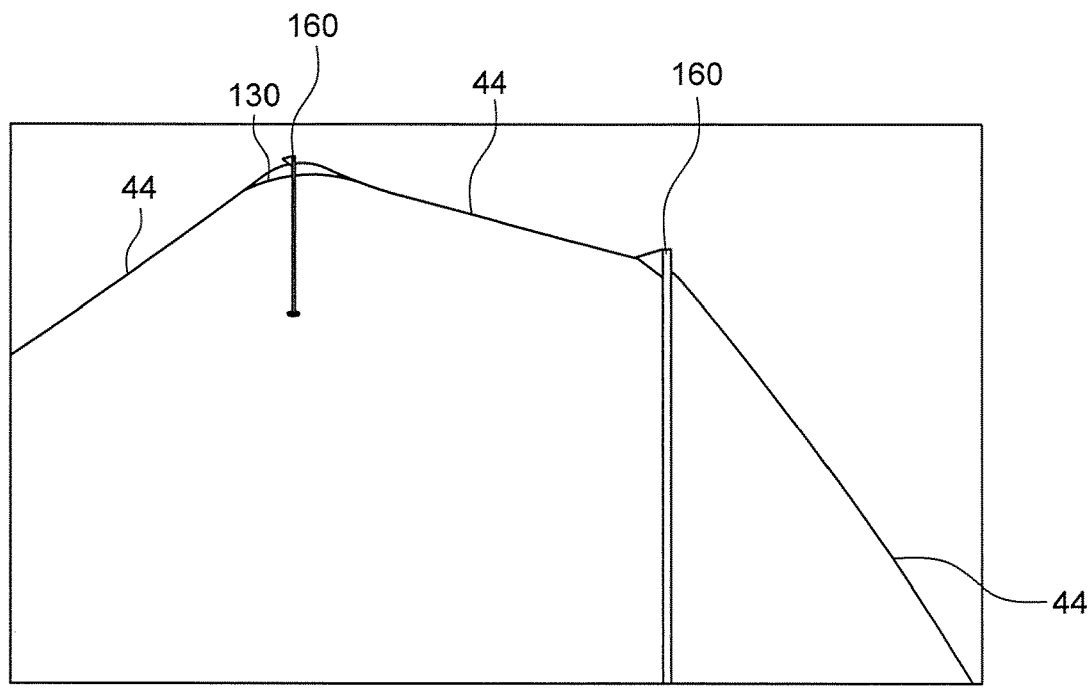
FIG. 16 illustrates possible transitions from cables to track.

The location of the outwardly extending members 130 on the transition elements 132 may be sufficiently spaced apart to allow the cable to be passed between them. This allows the transition element 132 to separate from the cable 44 by turning laterally and having the cable 44 exiting out between the outwardly extending members 130 and through the side slot 110 on the trolley 43. In doing so, this sees the trolley 43 being able to transition from the cable 44 onto the transition 132. From here the trolley 43 may then be transitioned 132 back onto another cable 44 in a different orientation, onto another rail section, or to remain on the transition 132. In a zipline application this is shown as a vectored change between tensioned cables 44 and tower or pylon mount points 160 as shown in FIG. 16.

Changes in Orientation

An additional benefit of allowing the trolley to traverse onto the transition elements, is that it provides the opportunity to also create changes in vertical orientation and lateral orientation in cable elements (corrections to the alignment geometry). In these conditions, the cable may remain inside the transition element as the transition element(s) bend in the desired direction. When the change in direction of the trolley has been achieved, the transition section may end and the trolley may pass back onto the same or a new cable. This is illustrated by way of example via a change in vertical orientation shown in FIG. 16.

Transitions at Entry and Exit Points

Figure 17:
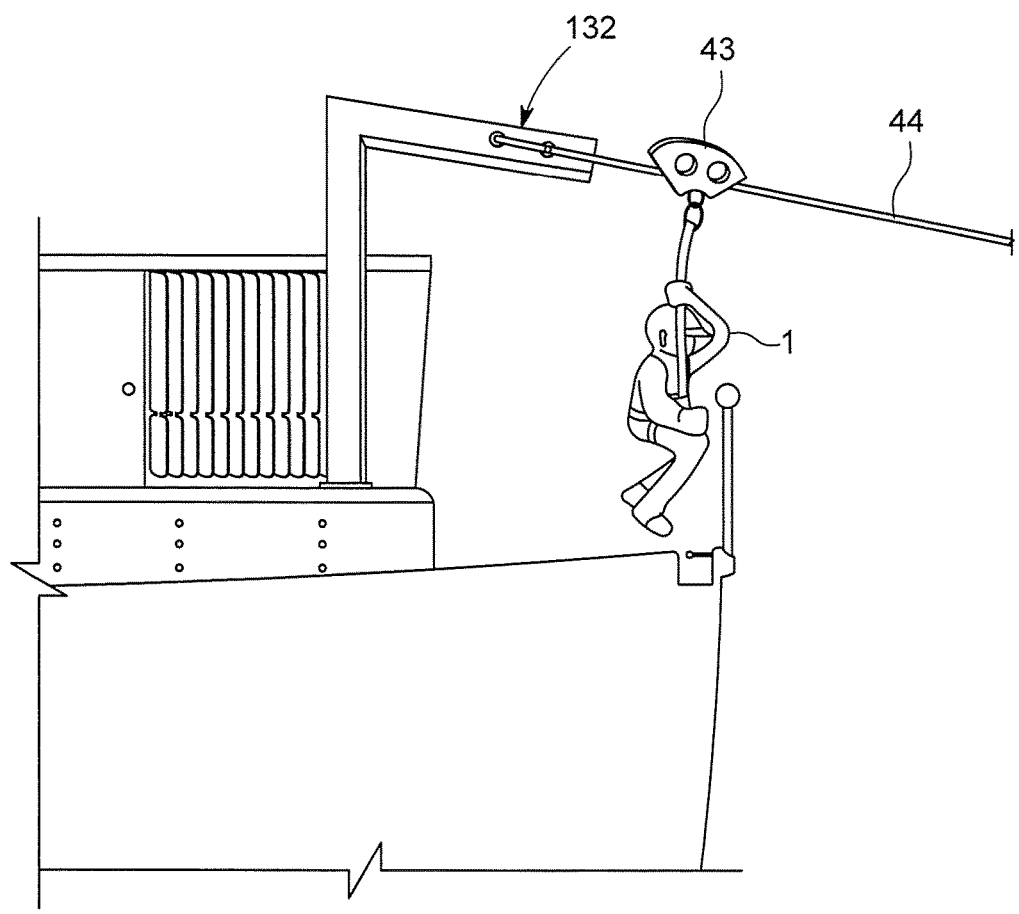
FIG. 17 illustrates an example of an emergency evacuation application-loading and unloading.

When used as an emergency egress system for example, the transition elements allow for simpler, safer, and quicker entry into and exit off the cable system. It is envisaged that a rack of trolleys could be attached to a transition system at the exit point from the building. Individuals could attach themselves to the trolleys and walk along the transition, sliding the trolley on the transition with them until the transition causes trolley turning and movement to a tensioned cable that was inclined and exiting out of the building. At this point the individual could ride the cable out of the building and down to safety. At the lower end of the cable, the rider could transition onto a further transition element and turn laterally way from the tensioned cable and level out with the ground. The use of the transition element at the start of the system could allow multiple people to be attached and queue for the exit as illustrated in FIG. 17 where a rider 1 is attached to a cable 44 having passed across a transition 132 and is queued behind a barrier prior to zipline travel. Likewise, the transition element could allow parties to exit the cable and queue for removal without stopping others from using the cable while others were still attached.

This form of emergency egress system could also benefit from the trolley systems having modulating brake systems (as previously discussed) to ensure all individuals exited at the same velocity. Additionally, trigger points on the cable could be used to activate the brakes in a terminal zone to ensure a controlled speed was achieved as the rider enters a lower queue.

Outwardly Extending Members

In some circumstances, it may be possible for the trolley to rotate around a cable around a transition by around 90 degrees since the opening created between the front wheel and the braked wheel by the transition could be sufficient for the transition to slip out from within the wheels resulting in unwanted derailment. To prevent this from happening, the orientation of the trolley may be controlled by use of aligning members, one example being attaching outwardly extending members linked to the upper and lower surfaces of the transition. The outwardly extending members may prevent the trolley from rotating around the cable. Although not shown in FIG. 14, additional lateral supports may also be provided to the trolley so as to provide additional mechanical advantage in helping to restrain any potential rotation of the body. These additional restraints may include rolling elements, skid plates, magnets, or any other such means.

Aside from being located at corners, the outwardly extending members noted may be located at the beginning or during a transition, for example to correct any swing movement of the trolley prior to entry into a rail section. Trolley gates described above may remain closed while alignment occurs and only open once the trolley lies in a 'safe' range of swing movement.

With the use of the design as presented above, the orientation for the path of motion of the rider may be directly controlled by the orientation of the track or transition elements. Additionally, the orientation of the trolley may be controlled separately based on the location and shape of the outwardly extending members. The separate control of these two components (direction and orientation) may be a considerable benefit for the system and may be used to ensure smooth transitions and limiting the roll forces on the trolley and rider. Furthermore, the relative location of the outwardly extending members on locations of curvature may be altered to reduce the level of lateral load applied to the wheels of the system and ensure the optimal orientation of the trolley for load transfer normal to the surface of the wheels.

Transition Elements Attached Directly to Cable and Flex

The transition elements may be directly attached to the cable elements and therefore they have the ability to move and flex with the cable elements. This may be an important consideration as the physical location of a cable element in space may adjust depending on the tension in the cable and the size, location, and direction of any applied loading (such as wind loading or rider loads). By having the transitional elements free to change physical location in concert with the cables ensures smooth transitions and may allow high-speed trolley movement through the transitions.

Transition Element and Cable Interface

For transition elements, a key component may be the interface between the cable and the transition element. This interface may be accommodated at the point of transition in part due to the design of the wheels used on the trolleys, and due to the configuration of the transition point.

Trolley Wheels have a Larger Diameter

In one embodiment, the trolley wheels may have a larger diameter than typically used on zipline trolleys, which may increase their tolerance to riding over small steps in track system profile as may be encountered at the start or end of a transition.

Transition Shape

Transitions comprise opposing halves that collectively fit about a cable to form a tapered wedge shape. One possible configuration of transition may start with a step onto a tubular element that then leads into the wedges. The taper or wedge may run from a relatively fine width to a relatively larger width along the trolley direction of travel.

Intermediate Transitions

The transition element may also be positioned along a track system that the trolley rolls over but where the trolley stays attached to the same rail or cable and does not change to another rail or cable termed hereafter as an 'intermediate transition'. These intermediate transitions could be shorter in length relative to cable or rail transfer transitions described above and could be located at various positions along a cable or rail. The trolley could pass over the intermediate transition in an identical manner as other transition elements. It is envisaged that this intermediate transition could be used as an input signal to the trolley to activate a braking mode or modes.

Cable to Rail Transitions

Cable to rail transitions may be achieved through an increase in thickness of the cable, allowing the riding and braking wheels to continue riding unobstructed along a path with the same radius as the cable.

Controlling the Ride Angle

Figure 18:
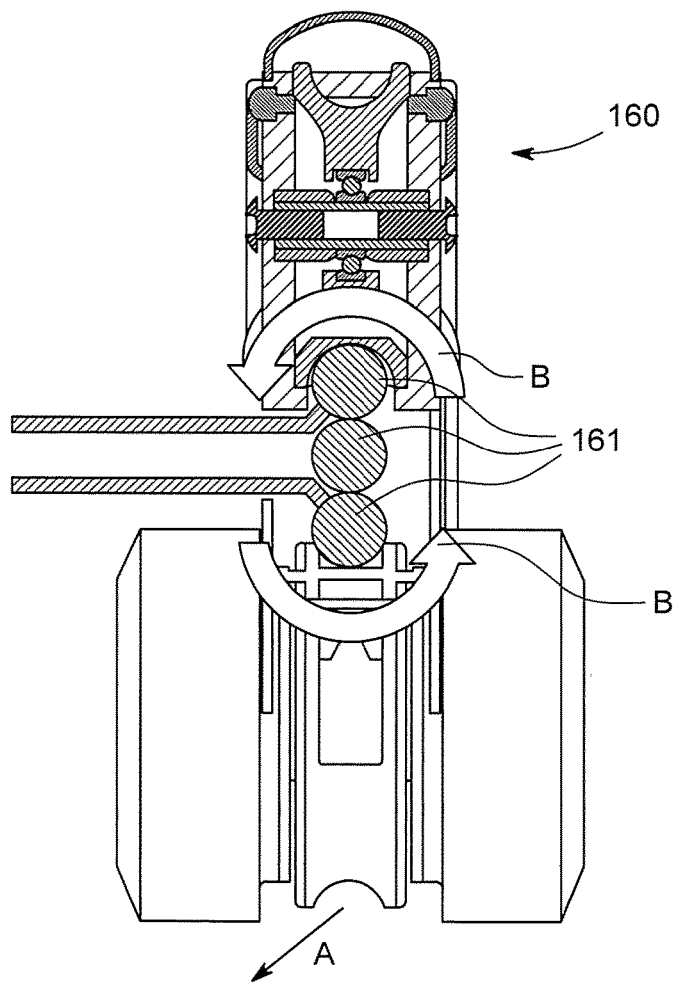
FIG. 18 illustrates a schematic of an on-coming trolley and the what is meant by outwards motion and rider swing outwards.
Figure 19:
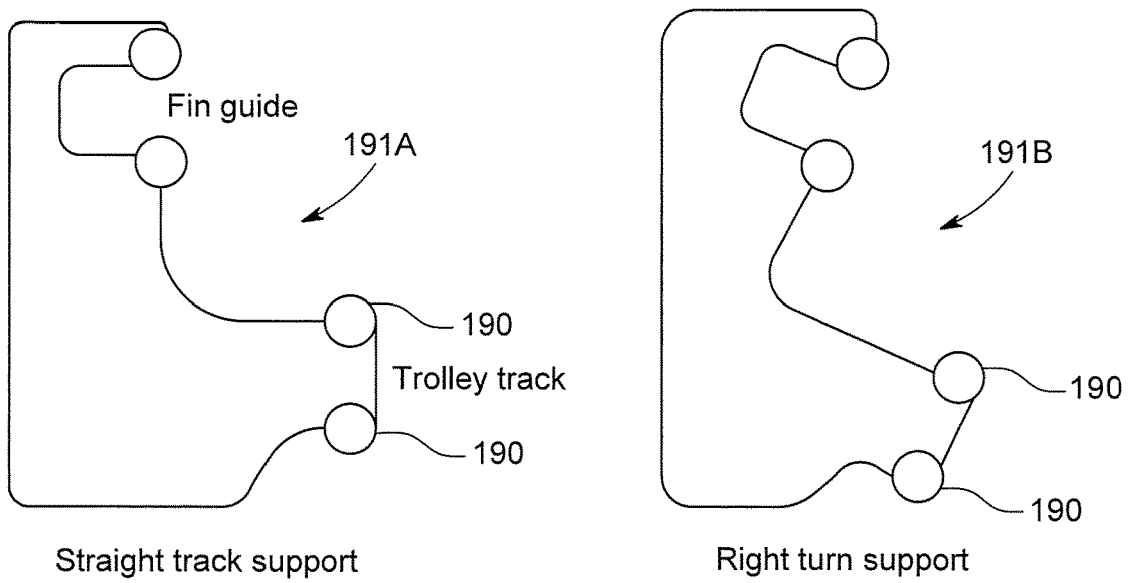
FIG. 19 illustrates examples of flat plates that are profile cut, supporting circular rails.

Once the trolley rides onto a section of rail, it may then be possible to control the ride angle of the trolley by tilting the track and/or tilting the outwardly extending members if used. This may be useful for cornering of the trolley, as described below. In more detail, when the rider traverses around a corner on the track system, their weight will swing outwards along the arrow A shown in FIG. 18 and may impart an undesirable twisting force (arrows B) on the trolley 160 around the rail or cable 161 (which will act outwards on the wheel flanges, and in extreme cases could lead to derailment). Tilting the track 161 to add a camber at the corners may realign the forces on the trolley 160 to act largely upwards and downwards on the trolley 160 wheels. This camber may be achieved by profiling the track around corners. The corners could, for example, and as illustrated in FIG. 19 consist of individual round bars 190 that may be rolled in three dimensions on site, and held at regular intervals by flat plates 191 that are profile cut to suit. A cambered support 191B is shown on the right hand side of FIG. 19 and, In applications where the speed to traverse a corner is insufficient to generate an outwards swing necessary of a cambered corner, a corner track 191 with no appreciable camber may be utilised (support 191A on the left hand side of FIG. 19).

Railway Point Systems at Transitions

Transitioning from a cable to a rail may provide the option for railway type point systems, which could be used to direct trolleys onto different paths at junctions. This could be achieved by displacing a section of rail sideways with an actuator to line up with alternative exit routes. Rail switching could be achieved manually by operators at terminals, or by riders at interchanges. Automated rail switching could be accomplished by electromechanical actuators, for example in the event that a trolley with defective brake mechanism needs to be diverted to an emergency stopping point. The configuration of the trolley system as disclosed enables greater reliability of transition when compared to art devices, as the wheels may maintain constant engagement with the guiding elements and switching junctions.

Alternatively, a turntable system may be utilised for switching between rails, wherein for example discrete lengths of rail are provided at a chosen point of the track, allowing a trolley to be moved onto the discrete track length, and the discrete track length rotated from a first track to a then align with a second track, allowing the trolley to be moved onto the second track. The discrete length of track may be supported by a pivot or turntable arrangement which may be located on a platform, or elsewhere along the track length.

Alternative Trolley Embodiment and Transitions

In an alternative application, the abovementioned detail on track and cable transition may be applied in a system void of a braked wheel. In this application, a lower guidance configuration may be provided to form at least part of the guide function of the braked wheel above.

FIG. 33 to FIG. 39 further illustrate embodiments of rail to cable movement and the rail shape/form. Using the alternative zipline trolley of FIG. 29 to FIG. 32 by way of example, the zipline trolley may move along a cable with the upper wheels generally directing travel along the cable.

FIG. 33 to FIG. 36 show a first lead in transition track member 330 in various orientations.

Transition Lead In

As can be seen, the lead in track member 330 comprises a lower section 331 that fits generally beneath a cable and an upper section 332 that fits over the lower section 331. The upper section 332 is staggered in relation to the lower section 331 so that its presence only commences once the zipline trolley has moved at least part way along the lower section 331. The lower section 331 start may have a tapered lead in from a narrow 333 to widened 334 width and directing ramps 335 on either side of the lower section 331. The tapering 333, 334 and ramps 335 are designed to arrest rotation from side to side motion of the zipline trolley and attached payload as the trolley enters the cable to track transition 330, and present the zipline trolley in a generally aligned orientation by the time the zipline trolley meets the upper section of the track. The ramps 335 noted may also act to at least partially lift the zipline trolley as it rides up the ramps 335 thereby relieving downwards pressure on the cable interfacing section(s) of the trolley upper wheels 303 and in turn causing the lower wheel or wheels 304 to at least partly abut or engage the ramp 335 as well and thereby prevent excessive uplift and ensure that the zipline trolley remains engaged to the tracks or rails. The ramp 335 may relieve downward pressure on the cable interface section(s) through providing a supporting pressure on the wheel flange region (where present) acting on mating support elements of the ramp and rail elements. These flanges may further act to guide the trolley in the desired path through the constraint provide by an extended bulge acting within the wheel groove providing side constraint to the wheel.

Figure 37:
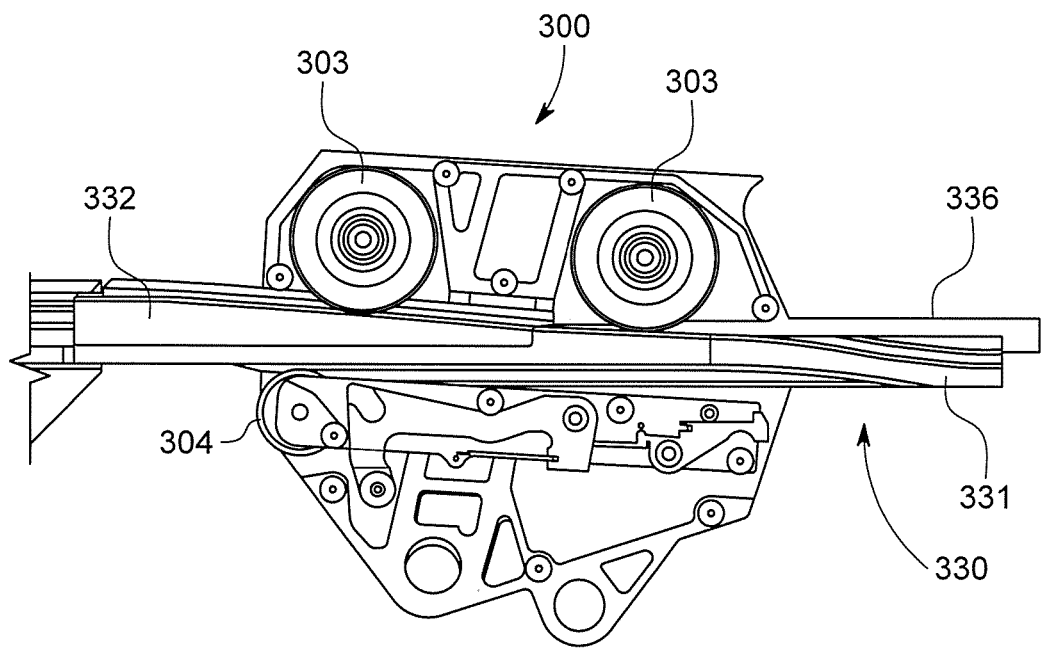
FIG. 37 illustrates a side view of a zipline trolley of the embodiment shown in FIG. 29 with the side removed traversing the lead in of FIG. 33.
Figure 38:
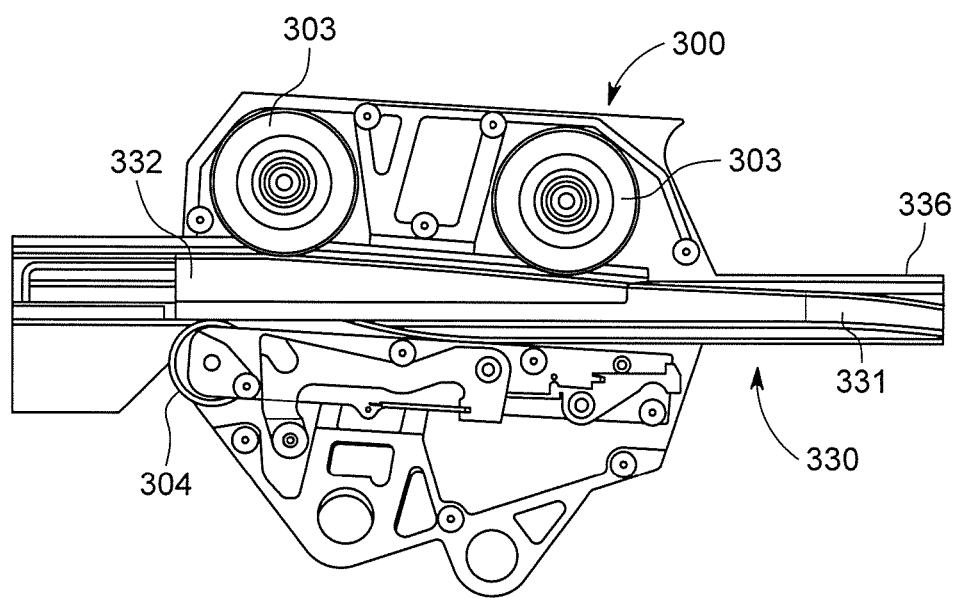
FIG. 38 illustrates a side view of a zipline trolley of the embodiment shown in FIG. 29 with the side removed traversing the lead in of FIG. 33.

FIGS. 37 and 38 show this relative movement between the lead in member 330 and zipline trolley 300 in more detail. In FIGS. 37 and 38, the side of the zipline trolley 330 has been removed to allow visibility of the wheels 303, 304 within the zipline trolley 330. FIG. 37 shows the zipline trolley 330 with the leading upper wheel 303 on the upper section of the lead in 330 and the trailing wheel 303 located on the cable 336 and lower section 331 of the lead in member 330 while the lower wheel 304 traverses a shaped underside of the lower section 331 of lead in 330. As can be seen in this Figure, the leading upper 303 and lower 304 wheels both engage the lead in 330 on either side to stabilise and retain the trolley 300 in place on the rail sections, the lead in ramps 335 causing a lifting action on the upper wheels 303 and engagement or abutment of the lower wheel or wheels 304 to the lower side of the rails. FIG. 38 shows the zipline trolley 300 with the upper wheels 303 now fully on the upper section of the lead in 330, the trolley 300 about to transition to the track sections proper and the opening between the leading upper wheel 303 and lower wheel 304 at a maximum to fit over the enlarged height track sections.

Figure 81:
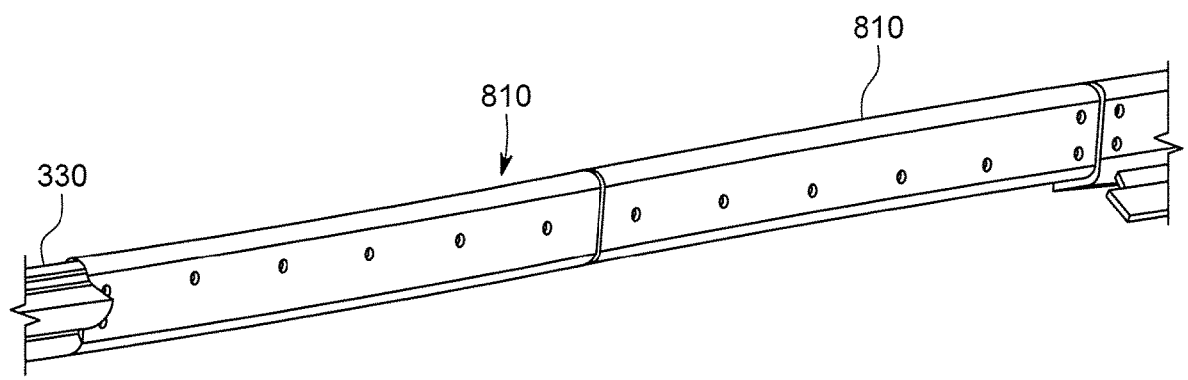
FIG. 81 shows the transition of FIG. 80 mated with ramp sections.

FIG. 81 shows an alternative transition. FIG. 86 and FIG. 87 illustrate a trolley 770 transiting the alternative transition in an aligned (FIG. 86) or off set position (FIG. 87). In this embodiment the upper wheels 800 are directed along the top of the transition 330 and onto the round bar 772 of the rail 724. Meanwhile the lower wheels 721 in this embodiment may be somewhat rotated from a purely vertical alignment and may interfere with the base 801 of the transition 330 as the trolley 770 traverses the transition 330. When the transition 330 terminates about point 802, the lower wheels 721 may transfer to ride against the rail 724 sides.

Figure 80:
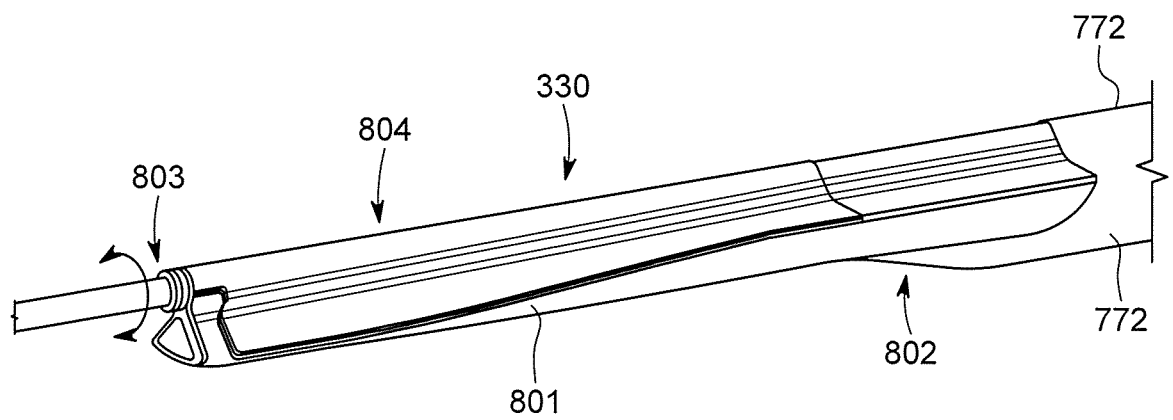
FIG. 80 shows an alternative transition.

As shown in FIG. 80, the transition initially fits snug around the cable circumference at the entrance 803. The top 804 of the transition 330 may gradually rise above the cable along the transition 330 length.

The transition 330 of FIG. 81 has a shaped profile that initially can accept a trolley 770 thereon where the trolley 770 may enter the transition 330 at an angle of up to 45 degrees offset from a vertical plane (shown in FIG. 87). The shaped profile then arrests and corrects this offset returning the trolley 770 to a vertical plane by the base 801 of the shaped profile guiding the lower wheels 721 of the trolley 770 back to a vertical plane orientation. The lower wheels 721 prevent the trolley 770 from riding up and off of the track 724.

The transition 330 of FIG. 80 may be mated with a ramp section or sections 810 best seen in FIG. 81. An aim of the ramp section or sections 810 may be to lift the trolley 770 away from the cable, the cable then moving to a point intermediate the rail 724 top and bottom.

Fins

The trolley system may be further braked by a track mounted brake element which interacts with corresponding elements within or on the trolley. The interaction may be frictionless. In one embodiment, the track system may comprise at least one fin that at least part of the trolley system is configured to pass over or about, the fin and part of the trolley system providing an external brake input to the trolley as the trolley moves past the fin or fins. A rail, cable or transition may comprises for example at least one fin extending from the rail, cable or transition that at least part of a trolley system passes over or about, the fin and part of the trolley system providing an external brake input to the trolley as the trolley moves past the fin or fins.

Figure 39:
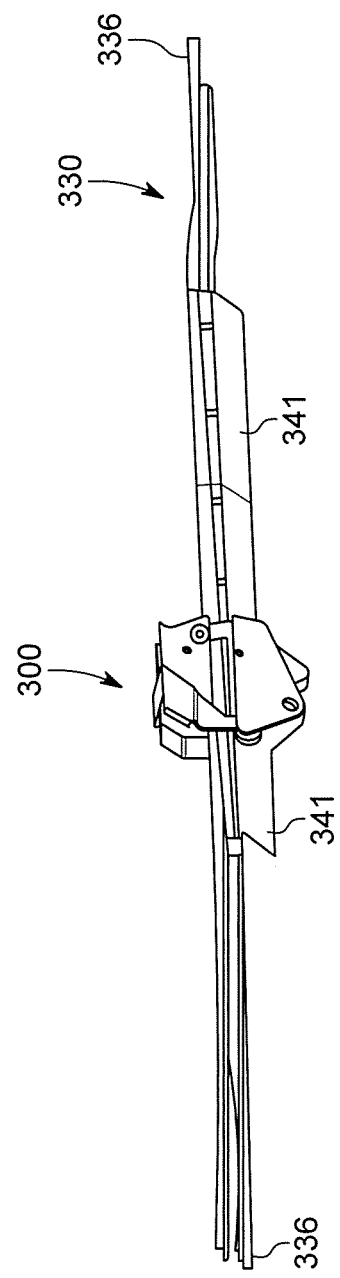
FIG. 39 illustrates a perspective view of the a zipline trolley of the embodiment shown in FIG. 29 traversing a track section, the lead in section being to the right of the Figure, a mid-track section being on which the zipline trolley is located and a lead out section of track being towards the left hand side of the track section as shown in the Figure.

FIG. 39 illustrates the zipline trolley 300 traversing a section of rails 400, the lead in section 330 being to the right of FIG. 39 that the zipline trolley 300 has traversed and the zipline trolley 300 shown in a mid-section of track 400 before a transition area 330 on the left back to a cable 336. The mid-section of track 400 as shown in FIG. 39 may include a series of rail directing portions 401, referred to hereafter as 'fins'. Note that the shape of the directing portions 401 need not be fin shaped and hence, reference to the term 'fin' should not be seen as limiting.

Fin ECB Braking

Figure 42:
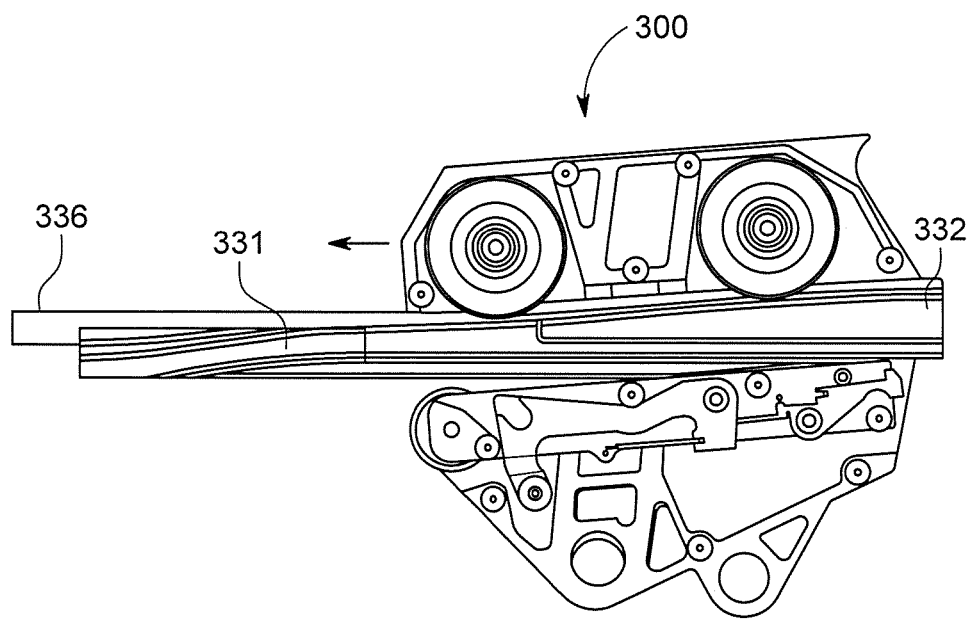
FIG. 42 shows a side view of a zipline trolley of the embodiment shown in FIG. 29 with the side removed traversing a lead out section of track.
Figure 69:
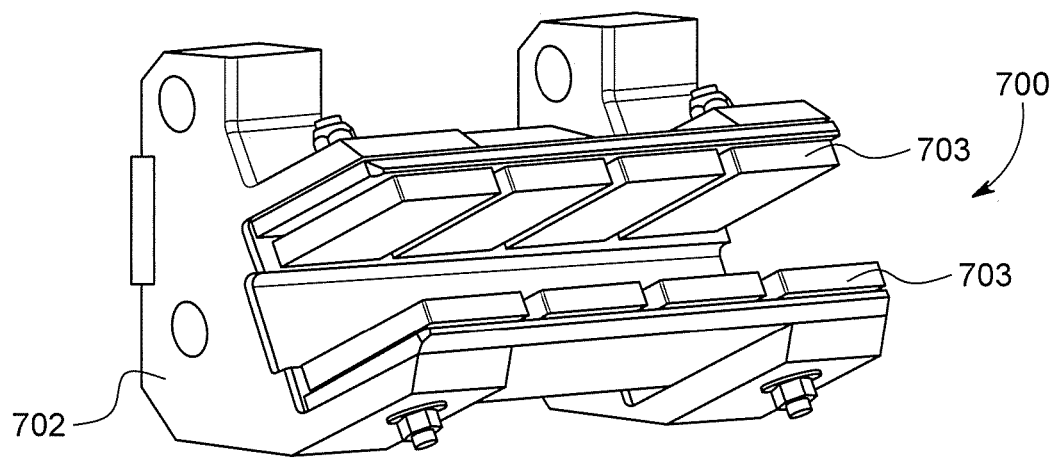
FIG. 69 shows a detailed perspective view of a magnet array that may be located on a trolley which passes over track fins.
Figure 70:
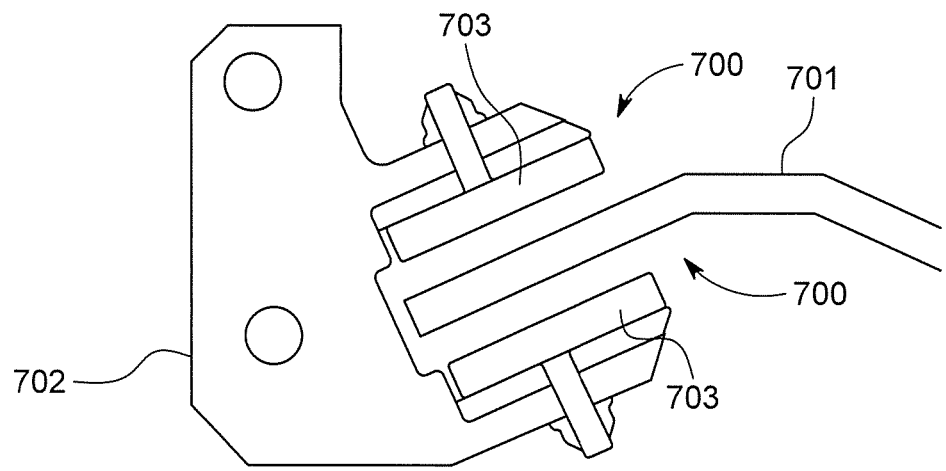
FIG. 70 shows a side cross-section view of a fin passing through the trolley magnet array shown in FIG. 69.

The fins 401 may be used to provide mid-span pass through braking. FIG. 40 illustrates the full track with the zipline trolley removed in a side elevation and FIG. 42 shows the same full track when viewed from above. FIG. 69 shows a more detailed perspective view of a magnet array 700 that may be located on the trolley, which passes over the fins described. FIG. 70 shows a side cross-section view of a fin 701 passing through a trolley 702 magnet array 703 shown in FIG. 69. As can be seen, the track fins 701 may extend from the track and a section of the zipline trolley 702 may pass through the fins 701. One use for the track fins 401, 701 may be to slow or modulate the speed of the zipline trolley through this section of rail (or cable if fins are attached to the cable), the track fins 401, 701 interacting with a section of the trolley to create a speed retarding eddy current braking force on the trolley 701 as it moves past the track fins 401, 701. For example, the track fins 401, 701 may be conductive members and the trolley or a part thereof that passes the track fins 401, 701 may comprise a series of magnets 704 that form the magnetic array 700 as shown in FIGS. 69 and 70. When the track fins 401, 701 intersect the trolley 701 magnetic field 700 an eddy current drag force results. The opposite orientation may also be used where the track fins 401, 701 may be magnetic and the trolley 701 may be conductive. As should be appreciated, it is the relative movement of conductive member and magnetic field that generates an eddy current drag force and either orientation may be used. The degree of braking may be adjusted along the rails by for example, varying the track fin 401, 701 conductivity, varying the track fin size and by varying the distance between the trolley magnetic field/conductors and the track fins. Other configuration of track fin, orientation, and position may be utilised to achieve a motion retarding force. Additionally, alternative means of varying the retarding force may be utilised, or a configuration may be utilised that has no variation in retarding force characteristic. This external fin ECB braking could be used about the terminal zone of trolley movement. The external ECB braking could be used at a point or points along the trolley direction of travel, for example to scrub excess speed from the trolley during a ride.

Transition Made of Smaller Parts

The track may be formed as shown in FIGS. 40 and 41 from a series of modular or smaller length parts. This may be useful to allow the cable incorporated within to still flex and move at least partly within or at least about a localised portion of the tracks. Were the tracks to be formed as lone long section, movement of the cable may cause stress build-ups on the enlarged track in a manner that may either causes over design of the tracks and/or cables, or failure of the tracks and/or cables over time. The track modular parts may interlock together at least to some extent to allow the parts to at least partly move side to side relative to the cable longitudinal axis and/or at least partly in a direction orthogonal to the cable longitudinal axis. Interlocking may be useful to ensure that the modular parts remain in a common orientation when movement occurs allowing the zipline trolley to move smoothly along the modular parts and not catch on transitions or changes in track parts.

Transition Lead Out

Figure 43:
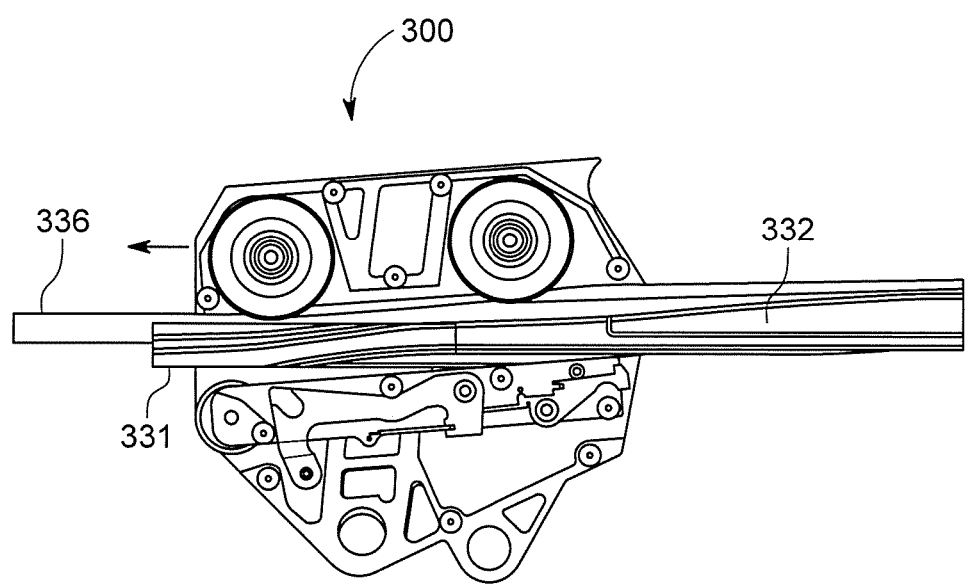
FIG. 43 shows a side view of a zipline trolley of the embodiment shown in FIG. 29 with the side removed traversing a lead out section of track.

The track may also comprise a lead out transition shown on the left hand side of FIGS. 40 and 41 and in detail in FIGS. 423 and 43 from a rail to a cable. The lead out track section may comprise a top and bottom section, top section terminating prior to the bottom section. The top section may again have ramped surfaces that lower the leading upper wheel during movement towards the cable and in doing so, release tension of the lower wheel. FIG. 42 shows the zipline trolley 300 moving from the upper section 332 of the lead out, the leading upper wheel 303 just beginning to transfer off the upper section 332. FIG. 43 shows the zipline trolley 300 fully on the lower section 331 of the lead out, the leading upper wheel 303 about to roll down the lower section 331 ramps 335 and fully onto the cable 336.

Spreader Bar

One aspect of the design described herein relates to track system turns. As the trolley turns for example about a rail section, a rider suspended below the trolley is subjected to a turning force that may be translated to the trolley as a twist movement by the rider connection point(s) to the trolley. Greater turning speeds generally produce greater twisting forces which act on the trolley. At a critical velocity of the trolley and rider, the twisting force acting on the trolley may cause trolley derailment or damage. One option to address this turning force and twisting action may be to move the twist point to a point away from the trolley, for example via the use of a spreader bar between the rider and trolley. In one embodiment, the trolley system may comprise an assembly that moves a turning or twisting force imposed on a trolley system by an object conveyed by the trolley system to a point distal from the trolley body. The assembly may be a spreader bar located at a point between the object and trolley.

Figure 77:
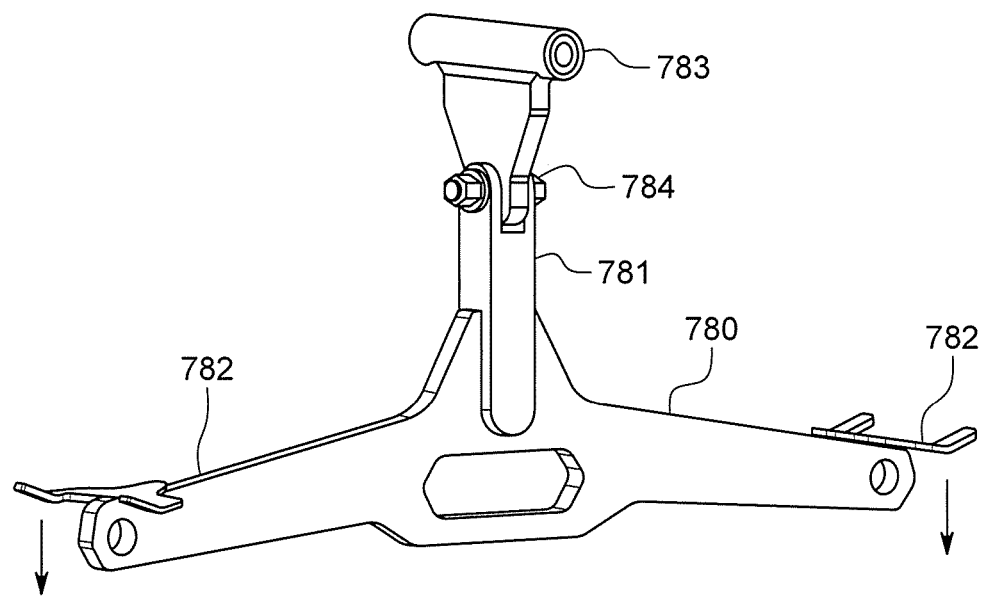
FIG. 77 shows a detail perspective view of the spreader bar.
Figure 78:
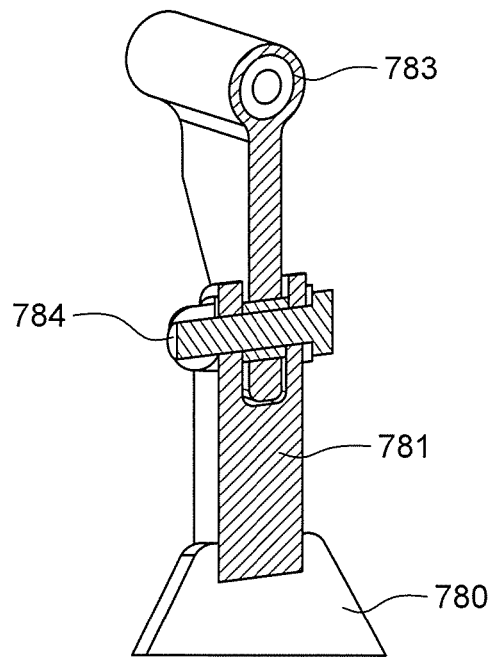
FIG. 78 shows a detail cross-section perspective view of the spreader bar and linkage.
Figure 79:
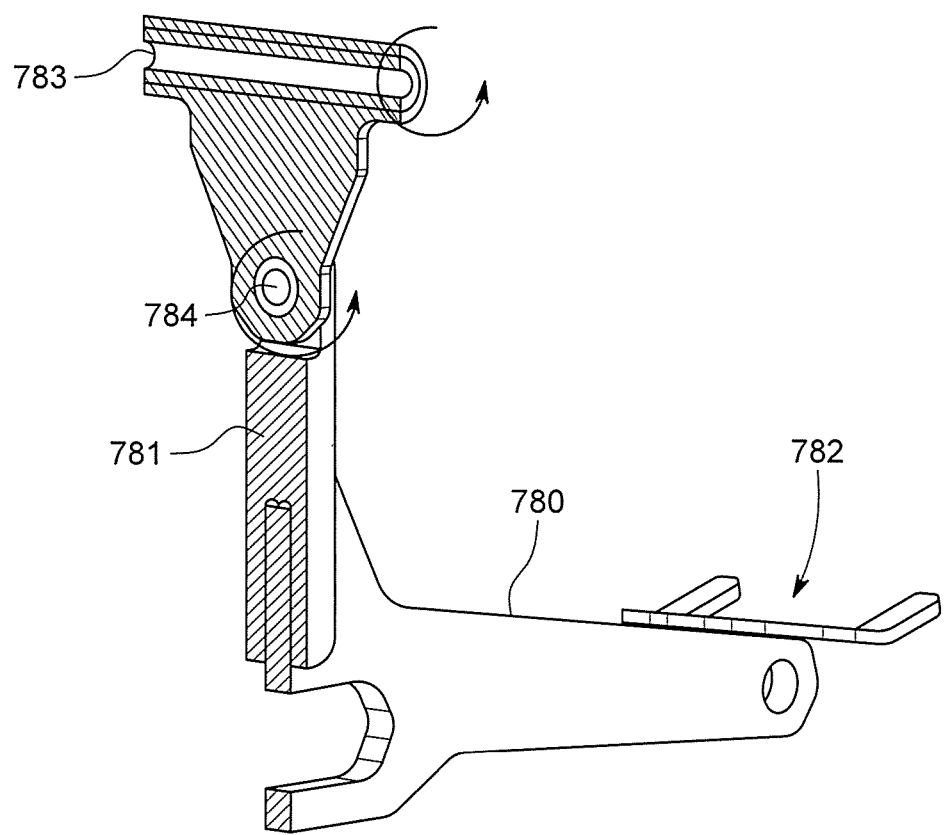
FIG. 79 shows a detail cross-section perspective view of the spreader bar and linkage.

FIG. 76 illustrates a possible spreader bar 780 embodiment attached to a trolley 770 and FIG. 77 shows a detail perspective view of the spreader bar 780. FIG. 78 and FIG. 79 show detail cross-section perspective views of the spreader bar 780 and linkage 781. The spreader bar 780 as shown may be an elongated bar that extends either side orthogonally away from the track 771 and path of trolley motion arrow DD. The bar 780 endings 782 have attachment points that a rider is suspended from so that the rider weight is distributed across at least two points distal to the trolley 770. Intermediate the bar endings is a single linkage 781 that mates with the trolley 770. In use, the spreader bar 780 may pivot when the trolley 770 turns and therefore redistributes the torsion and vertical loading to a point away from the trolley 770 itself.

The spreader bar 780 allows for a degree of side-to-side swing and brings the line of force up to the pivot point(s) on the linkage and moves the pivot point from the trolley.

The spreader bar 780 linkage 781 may be connected to the trolley in a manner that allows for pivot movement in at least two directions. Pivot movement may be constrained in only two degrees of freedom being side to side and forwards and backwards. Full rotation is ideally avoided to minimise the risk of the rider spin 180 degrees and the trolley progressing forwards while the rider is facing backwards. Where multiple pivot points are used to cater for movement, the pivot points may be separated from each other along the linkage 781 length such as at points marked 783 and 784 in FIGS. 77 and 78. A further feature of the spreader bar may be the incorporation of lanyard hooks located on either side of the spreader bar ends. These may be helpful to store lanyards, particularly during uplift of the trolley along a track.

An added benefit from the above spreader bar may be that the rider is somewhat isolated from the trolley movement and as a result, receives a smoother ride than on systems where a direct connection is made.

A further benefit of the spreader bar is that the rider when suspended on the spreader bar can be located at a point sufficiently distant to the trolley and track that the rider cannot touch or reach the trolley and track. This minimises risk of the rider interfering accidentally or by choice with the trolley and track. As may be appreciated rider interference may be a significant safety risk and would ideally be avoided such as via this design.

A yet further benefit may be that, because at least some rider swing is catered for and pivoting in this scenario occurs distant to the trolley, there is less likelihood of the trolley wheels detaching or lifting from the cable or rail. Significant rider movement forwards or backwards of the trolley as noted in other parts of this description may result in an upper front or rear trolley wheel lifting which is undesirable.

Secondary Connections

Figure 20:
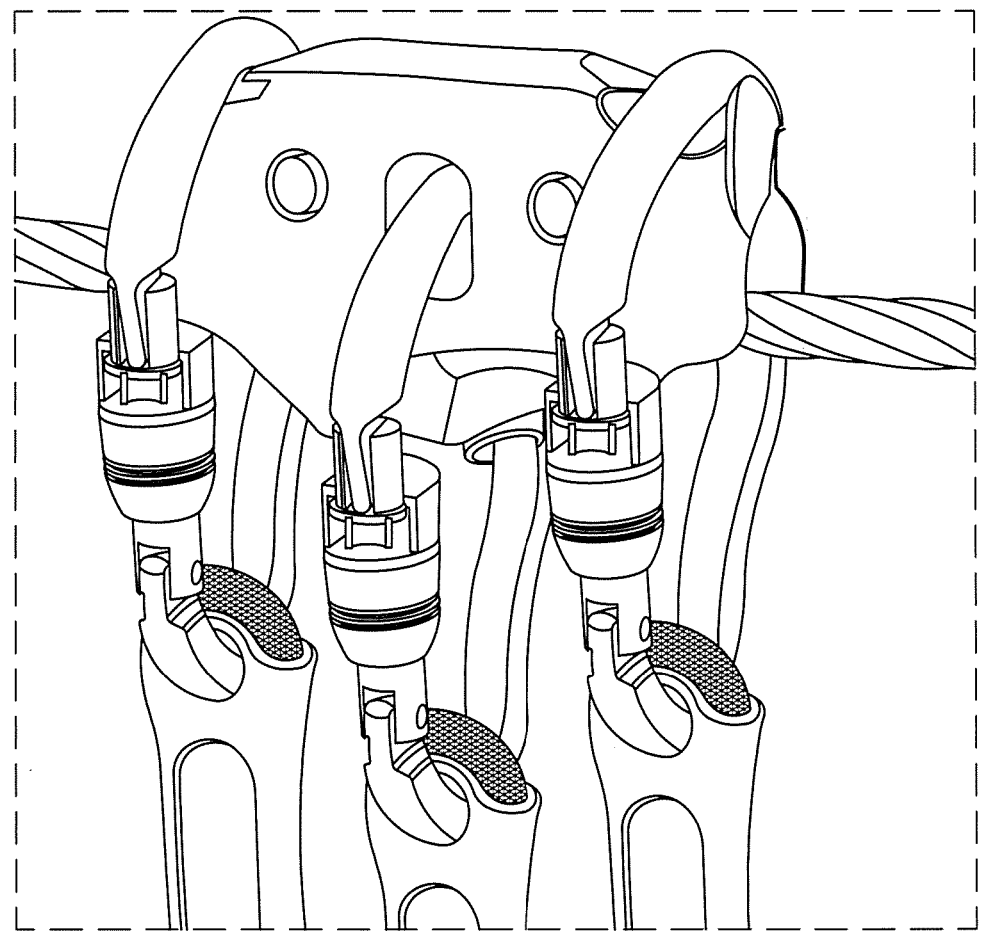
FIG. 20 illustrates an example of an art secondary connection.

Any system that is carrying passengers, whether an amusement ride, evacuation system or similar, generally requires a redundant safety connection to prevent the passengers from fully detaching from the cable or track in event of a failure in the trolley or carriage. In the case of a traditional zipline system this redundant connection consists of a secondary connection between the rider and a closed carabineer around the cable—as shown for example in FIG. 20. This second carabineer is not loaded unless the trolley wheels or primary connection fail. For a system that is able to transition between cable and rail and/or has intermediate supports to allow braking or change of direction, a safety system that permanently surrounds the cable is not possible.

If the cable is able to pass through the trolley, there is a risk that accidental derailment will occur at transition sections, or in the event of collision or component failure.

Figure 21:
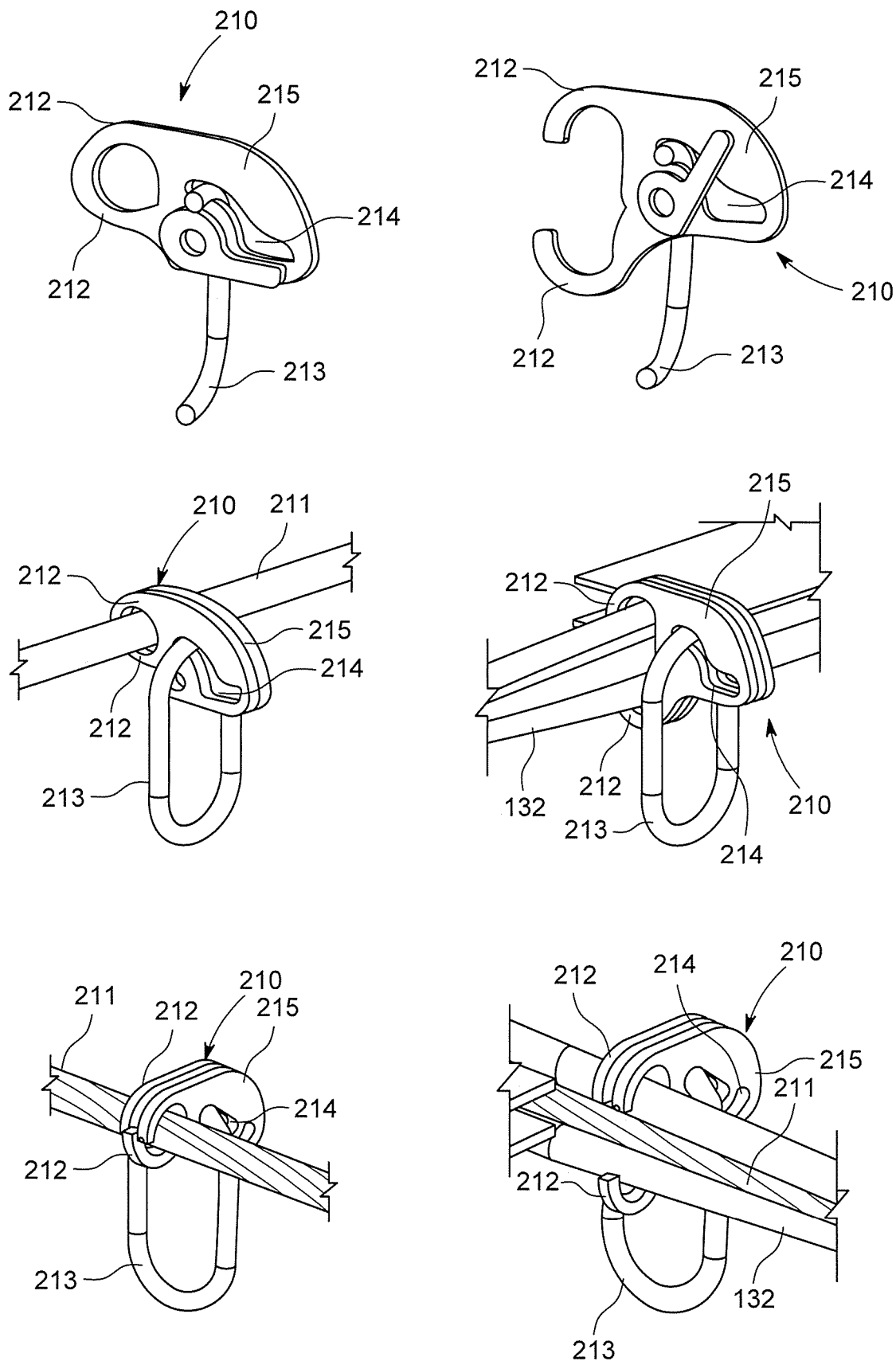
FIG. 21 illustrates embodiments and configurations of possible scissor secondary connections.

A secondary connection in this trolley system to provide the rider with one or more safety connections that operate in case of emergency may comprise a "scissor" consisting of opposing jaws that are normally closed around a cable or rail as shown in FIG. 21. This secondary connection 210 would not normally contact the cable 211, and could for example be mounted to the trolley to maintain alignment with the cable 211. The scissor 210 may be biased to a jaws 212 closed position, and a carabineer 213 may sit within a slot 214 in a casing 215. The geometry of the secondary connection 210 may be such that when the scissor 210 meets a transition 132, the scissor 210 jaws 212 may open at least partially to accommodate increased track sizing and geometry, while positively maintaining contact with the track during the transition 132. In the event that the trolley derails, the weight of a rider will fall onto the safety connection. In doing so, the carabineer 213 will run down a slot 214 in the outer plates of the secondary connection 210 that then acts to clamp the rider to the cable or rail.

In one embodiment, the secondary connection may have a relatively weak connection to the trolley, so could separate from the trolley in the event of a derailment for example, yet still retain the rider to the cable or rail via the secondary connection.

A shock absorber may also be included between the rider and the secondary connection to control rider deceleration. The shock absorber may for example be a length of resilient cord like a bungy rope.

Secondary safety connections could be fitted to any location on the trolley, but it is envisaged they would attach to the front, rear, or both ends of the trolley if used.

Pass Through and Emergency Braking

One of the advantages of having a brake mounted on each trolley may be the ability of the trolley to slow down, but continue along the track without any operator intervention. This is known as "pass through braking" and may be valuable in terms of rider safety and throughput. In event of brake failure on a given trolley, the overall trolley system may need to respond in a safe manner and prevent the errant trolley from entering a terminal zone or transition at a dangerous speed, or from colliding with another trolley or obstruction. The emergency braking system may either need to:

slow the rider to a safe speed using a secondary braking means; or divert the rider to an emergency terminal braking location.

Numerous alternative pass-through braking systems could be considered by someone skilled in the art. One such example could be a linear eddy current brake, which will provide braking proportional to the speed of the rider. One possible configuration of this type of brake is presented in FIG. 22 or FIGS. 439-41 described earlier, whereby eddy current braking forces may be induced onto the trolley 43 through the proximate behaviour of magnets and a conductive material. This may be achieved by magnets (fixed power or electromagnets) being attached to the trolley 43 and the trolley 43 coming into proximity with a conductive element (say aluminium on the rail system) 220. Alternatively, the conductor may be located on the trolley 43 and the conductor on the trolley 43 may come into proximity with magnets or electromagnets on the rail system 220.

Figure 22:
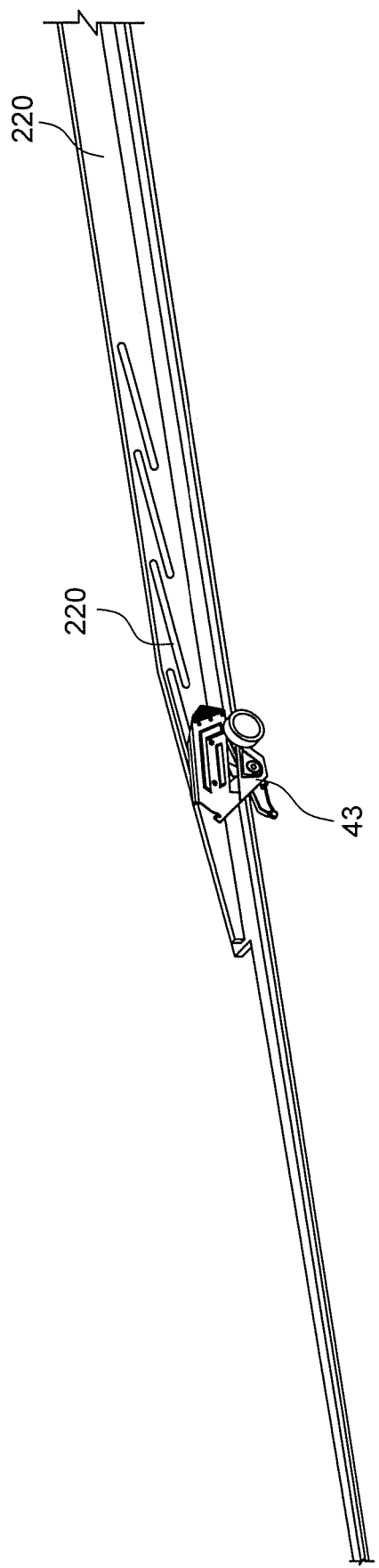
FIG. 22 illustrates an embodiment of a linear eddy current braking system.

An alternative form of pass through braking may be a rotary style eddy current brake that may be attached to a rotating system as illustrated in FIG. 22. The rotating system 230 may include a capture mechanism 231 that may engage with the trolley 43 and apply a braking force to it as the trolley 43 traverses under the rotating system 230. When the trolley 43 passes beyond the zone of the rotating system 230, the trolley 43 is freed and could exit at a reduced speed, or the trolley 43 may have been brought to a complete stop within the zone of influence of the rotating system 230. This form of braking system may sometimes be referred to as a "clothesline" type brake. A modulating rotary eddy current brake (ECB) could be used on a clothesline system 230 so that zero braking may be applied to trolleys 43 that are travelling at the correct speed.

One form of emergency brake system may detect the trolley speed and only engage with the trolley should intervention be required. Intervention may be speeding up or slowing down of the trolley as required ensuring it remains within the suitable speed tolerance. One method for the detection mechanism may include the force exerted by the trolley as it transitions to the rail system. Alternative mechanisms may include (but are not limited to) the lateral force applied to the system as it changes direction, a magnetic or an electronic sensor system, a sequence of timed events or triggers, radio signals, GPS signals, or combinations thereof.

The trolley system wheel or integrated brake system may comprise an over speed emergency brake that acts independent to the brake system. In one embodiment, the over speed emergency brake may rely on centrifugal effects to activate an emergency brake, in this case to detect and react to an over speed situation. The over speed emergency brake may act independent to the integrated brake system.

The over speed emergency brake may in one embodiment comprise a rotating rotor and ball bearing linked to the rotor via magnetic attraction, the rotor and ball bearing being integrated into a wheel or wheels of the trolley and/or the brake system and, if the centrifugal force acting on the ball bearing becomes sufficiently high imposed by rotor rotation, the magnetic attraction force between the ball bearing and the rotor is overcome and the ball bearing then moves to a surround and causes the rotor and surround to interlock and cause synchronised motion between the latched surround and rotor and in doing so slow or halt trolley system movement on a track system.

Figure 57:
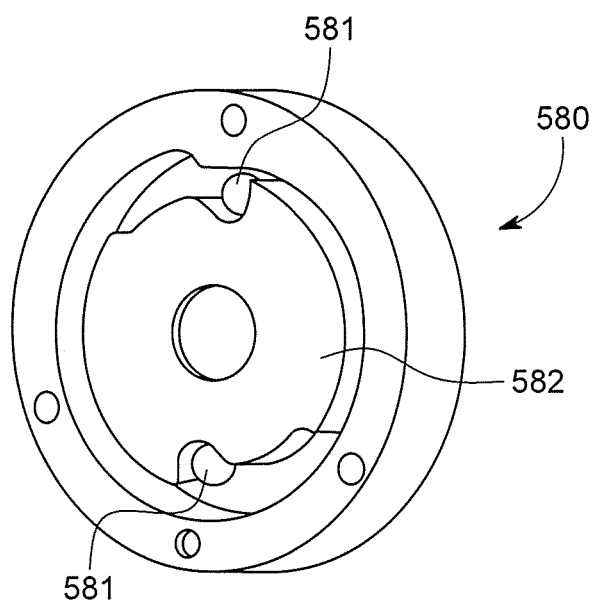
FIG. 57 shows a perspective view of an embodiment of an over speed assembly with a ball bearing magnetically attracted to a rotor.
Figure 58:
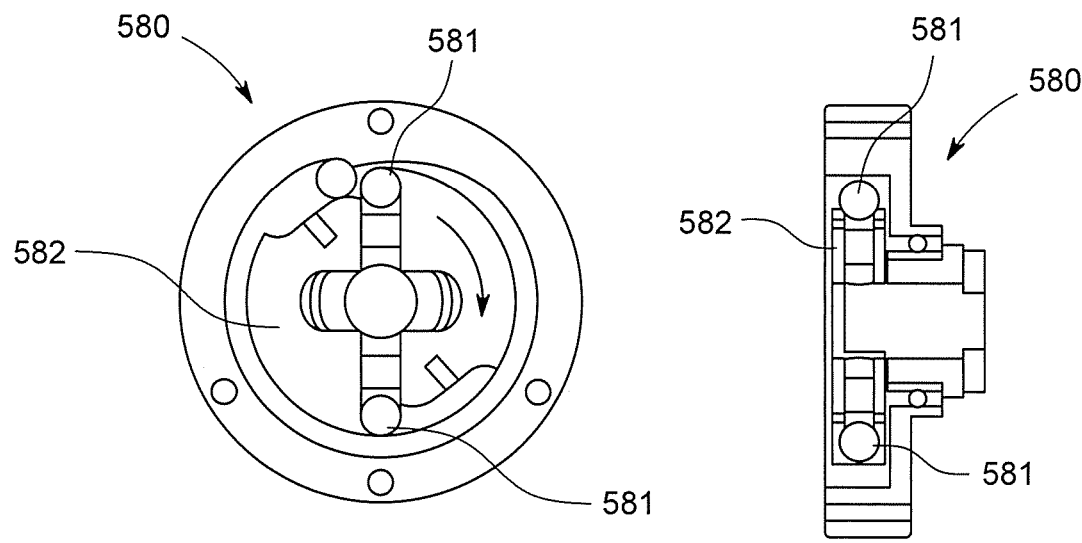
FIG. 58 shows embodiment of FIG. 57 in front and side cross-section views.

Halting motion as described above may be useful in smaller scale systems where the trolley remains generally accessible. Slowed motion may be an advantage in larger systems or systems where the trolley may be difficult to access mid-way through a ride section. Irrespective, the over speed mechanism will react to a malfunction and safely arrest excess speed and danger. This system may re-set itself automatically or may require a manual re-set to release the ball bearing from the interlock once the centrifugal force dissipates and return the ball bearing back to magnetically attracted relationship with the rotor. Note also that more than one ball bearing and interlock may be used. The ball bearing once in an interlock position may also prevent roll back movement against the normal direction of rotation of the rotor. FIG. 57 illustrates a perspective view of an embodiment of this over speed assembly 580 with the ball bearing 581 magnetically attracted to a rotor 582. FIG. 58 shows the same over speed assembly 580 in front and side cross-section views. Another magnetically attracted relationship may be used once the ball bearing 581 reaches the interlock position (dashed line ball position in FIG. 58) to retain the ball bearing 581 in place until a re-set is completed. The re-set may be completed manually by an operator pushing the ball bearing 581 back to a rotor 582 attracted position or the magnetic attraction of the interlock magnet may be lowered or switched off to release the ball bearing 581 which then, through gravity, returns to a rotor 582 attracted position.

Other alternative braking methods may be used such as a linear eddy current brake for override speed control and/or an emergency engagement with a zip stop type device to capture and tether a runaway trolley. FIG. 22 described earlier illustrates one possible alternative braking method embodiment using linear eddy current braking rails.

Overall System Control

A system control may be configured to sense at least one aspect of at least one trolley system as described above. The system control may also be configured to apply an external signal to at least one trolley system. The trolley system as disclosed may be considered as a network of guiding means/track systems, or rails and cables, upon which one or more trolleys may travel. Means of providing braking, or motion augmentation of these trolleys has been disclosed earlier in this document. While a trolley with modulated braking or motion augmentation is in itself beneficial, it may be desired to provide a means of controlling the behaviour of the individual trolley(s) and/or overall system at the system level. This may be for reasons of productivity, flexibility, optimisation, or safe operation of a system. Other reasons may exist also and this list should not be seen as limiting.

Considering an individual trolley element, it may be desirable to have a means of triggering or commanding the trolley to perform defined braking or motion augmentation behaviours at specific locations along trolley travel. Such examples may be to trigger the activation or onset of braking, and/or modulation of braking to limit the speed of a trolley through a section of its travel under variable operating inputs. Alternatively, or in cooperation with the speed-limiting example above, may be providing a means of signalling the need to enhance braking to bring a trolley to a safe halt in a predefined terminal area of a network of trolley systems. Note that the terms 'triggering' and 'commanding' and grammatical variations thereof may be used interchangeably herein with the term 'signalling'. For the purpose of this disclosure, they shall be considered of similar meaning.

The determination of these signal points may be defined and fixed by the configuration of the system using methods detailed earlier in this disclosure. Alternatively, a system level controller may determine such signalling points. A system level controller may determine the specific signalling points based on measures of the trolley operating on the guidance means and/or based on other parameters such as environmental conditions (e.g. wind, rain, temperature), or queued demand for other trolley access to the guiding track.

In providing this method of system control, combinations of independent inputs may be combined such that signalling and/or control of braking may be adjusted. Such adjustment may be used to achieve an increased level of operational safety, alter patron experience, reduce manual operational input, increase throughput of a system, or combinations thereof not otherwise possible through conventional trolley and guidance systems. Other benefits may be apparent to one skilled in the art, such as the benefit of synchronising or phasing arrival of trolleys on parallel operating guiding means.

A system level control may enable the safe and/or more optimal operation of a trolley system when multiple trolley elements are utilised on the guidance system. In this aspect, the overall system may have a means of determining trolley behaviours relative to one another, such as trolley locations and trolley proximity for example. A means of determining and maintaining a desired relative motion between trolleys may be included in this system. Such a means may be achieved passively or actively, and provide signalling to the trolley to alter the braking characteristic of the trolley.

In an alternative embodiment, each trolley may incorporate this control aspect inherently within the trolley. Control of the trolley in this example may be based on communication with other trolleys, or an adjacent trolley, to communicate the motion behaviour for the purpose of assessing correct motion behaviour and providing variation to braking to maintain the desired relative motion between trolleys. Such a system may have the benefit of not requiring a master control system for satisfactory operation.

In an alternative method for trolley-to-trolley communication, each trolley may communicate directly with a fixed transmittal element on the tracks. This transmittal element may receive operational behaviour information from a passing trolley and communicate this information to a later passing trolley for the purpose of motion control of the later trolley. Such a system could continue to relay information between trolleys for the purpose of altering trolley-to-trolley motion behaviour without direct communication or an external overall system. Transmittal means may be by mechanical means, electrical means, optical means, electronic means, radio means, sound means, or combinations thereof. The benefits of trolley to trolley communication beyond those detailed for the other control methods, may include the removal of the need to communicate across significant distances due to trolley to transmittal element proximity. Communication over short distances may be beneficial in that less power is required, and is less susceptible to external interference signals, increasing robustness of system operation. An additional benefit may be the ability to provide further signalling from an overall control system if desired, to provide additional operational information or demands to the trolley beyond just trolley-to-trolley communication.

An extension to the transmittal element system disclosed above may be the provision of a function for the transmittal element to receive operational performance information from the trolley and communicate this to a centralised system. An example of how this function may be used is in the monitoring and determining of correct operation of a trolley element. A primary consideration may be the braking performance of the trolley so that degradation of the braking may be identified before the onset of undesired performance or a hazardous level of operation. The onset of early warning may allow intervention with the trolley before the performance degrades beyond desirable or acceptable levels. Although braking performance is noted as a primary consideration in this example, other applications may consider monitoring of other aspects, such as vibration to determine bearing damage for example.

In some applications it may be desirable to interact with the trolley braking means in the case of an emergency situation. In such a situation it may be desirable to override the operation of the trolley elements to reduce their operational speed, and/or bring the trolleys to a halt. The use of an overall system emergency stop or brake override function provides enhanced safety to the operation of a trolley system particularly when the application involves human passengers. The facility of an emergency stop for a system may allow for safe operation of multiple trolleys together not otherwise possible with existing art systems. In an extension to this embodiment, the activation of a system level emergency stop may signal the trolley elements to travel to defined holding and/or egress locations to allow for the safe dismount and egress of passengers from the system.

A further aspect of an overall system control may be the management of entry and exit of a trolley onto a guidance element. Art systems achieve this through physical gate systems, or through manual human interaction, as may be the case on a zip-line for example. Art systems are undesirable for many reasons, including cost, complexity, operational efficiency, or, in some instances, opportunity for human error. The disclosed control system provides a method of managing progress of a trolley onto and off of a guidance element. Aspects of the control system may interact with braking elements of the trolley to signal a trolley to operate the brake to prevent the progress of the trolley onto the start of the guiding element. Activation of this braking function may be determined by the overall operation of the trolley guidance system or ride. One example of this embodiment may be a zipline where a trolley is prevented from entering the zipline section of a guidance means until a prior deployed trolley is of sufficient distance away to achieve safe concurrent motion of the trolleys. When the threshold value is achieved the control system may then signal release of the brake to allow progress of the trolley onto the guidance means. In the same manner, the brake system may slow or hold a trolley at the end of a guidance means until conditions to progress are met.

Such a control system may assess other conditions before permitting progress of a trolley on a ride. Non-limiting examples of additional assessments may include a check that: there is a secure connection of a rider to a trolley, there is correct energisation of a motive system, that the environmental conditions are within permitted levels, that a safety supervisor is present, that a travel pathway is free from obstruction, or combinations thereof.

In an alternative method, entry and exit of trolleys may be achieved by latching and/or gating of the trolley about a guidance element. In an example configuration of this system the latch may be subject to operation by the control system under methods described above. Latching or gating of the trolley directly may provide the benefit of minimal intrusion in the payload corridor space and flexibility of selective operation.

Another aspect of an overall control system considered in the disclosed invention may be the detection and control of reverse motion of a trolley on the system. In the event of detecting that a trolley is travelling in a reverse direction to that desired, a braking system may activate so as to prevent further reverse motion of the trolley. An example where this feature may be desirable is on a self-guided zip-line where riders manage their own transition between zip runs. In such an example it may be undesirable, and indeed unsafe, for the rider to return onto the zip run just traversed. Such a rollback prevention system may prevent this undesirable situation occurring.

Individual aspects or combinations may form the basis of an overall safety control system. Alternatively, individual aspects or combinations may be utilised to provide greater throughput of trolleys on a system, or enable the travel of multiple trolleys concurrently on a guide system. These concurrent operation trolleys may have different operational inputs or have variation that could otherwise affect their ability to operate concurrently without issue. A system as disclosed above may enable operation over a wide range of input conditions or guide system configurations.

Complete Ride Systems

The trolley and other aspects described above may be combined into systems that provide greater rider freedom and enjoyment, increase throughput, reduce running costs and reduce dependence on skilled staff to operate safely. An example of the potential applications is outlined below.

Figure 24:
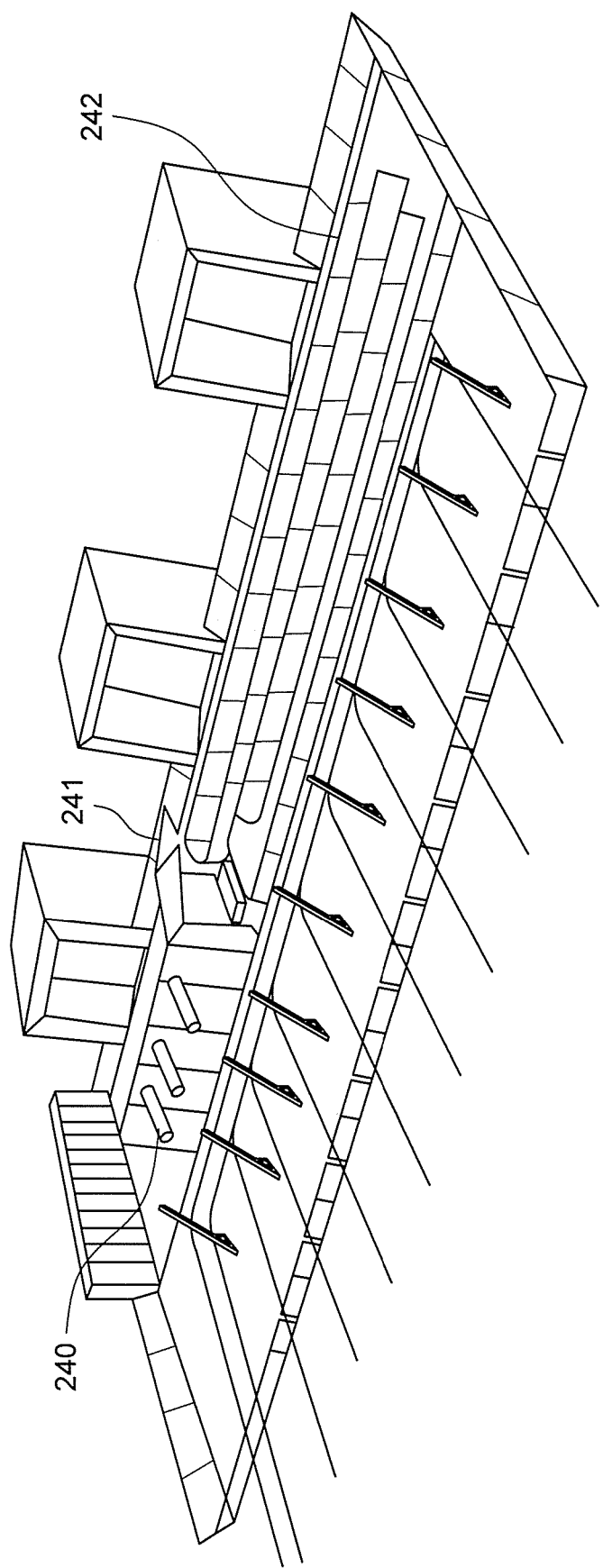
FIG. 24 illustrates a sketch of a possible loading station.
Figure 25:
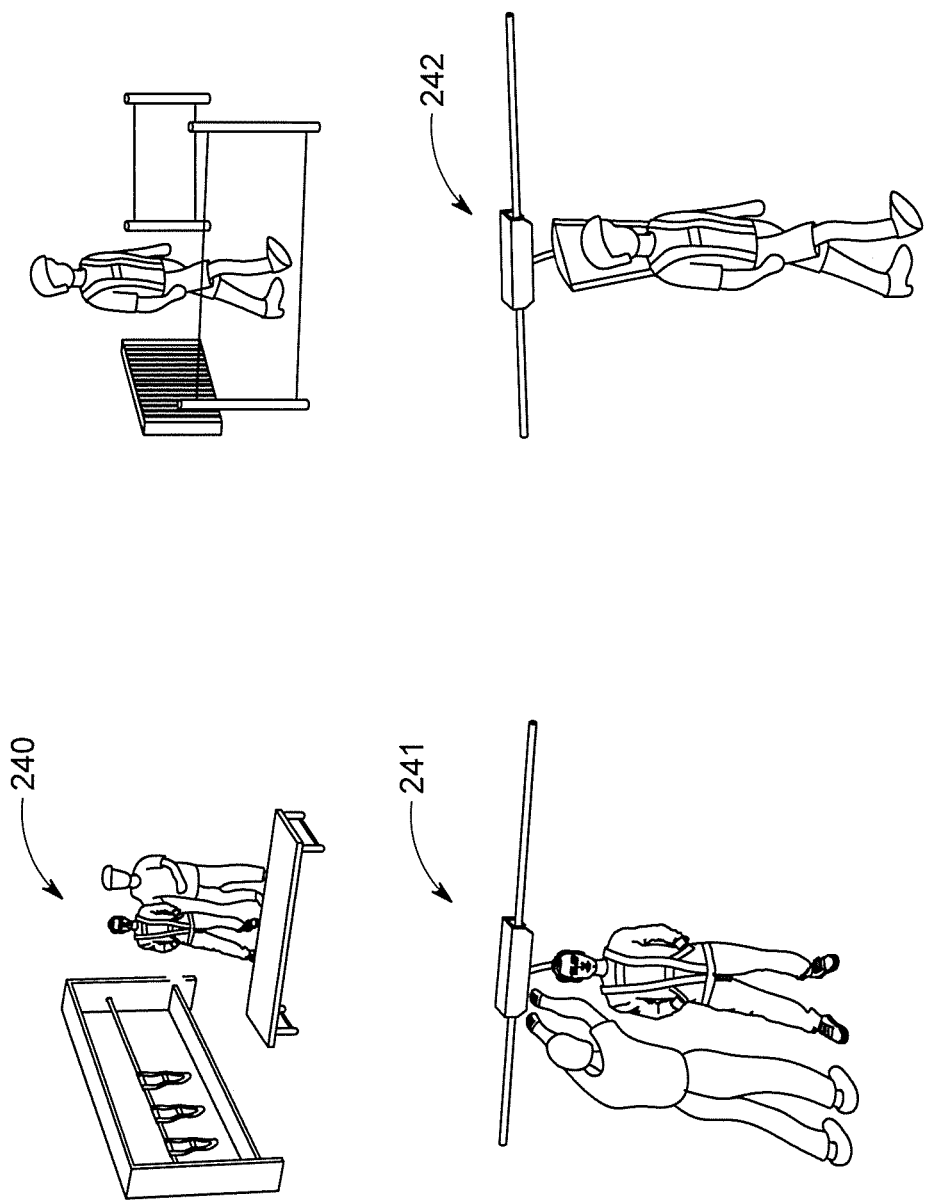
FIG. 25 illustrates a sketch of a possible pre-launch process.

A sketch of a possible loading station is shown in FIG. 24 and a possible pre-launch process illustrated in FIG. 25. Harnesses may be fitted away from the launch area 240, and the patron/rider may be fitted to an interlocked trolley on a guide rail that leads them to the start of the ride 241. The patrons may then join a queue fully harnessed and ready to ride 242. When they are ready to launch, their trolley may pass over a low speed transition section onto the track or cable. In this way multiple riders may also be fitted to multiple tracks in quick succession. The bottleneck of fitting the patron at the start of the ride is removed, so ride capacity may be maximised. This technique may also have obvious throughput benefits for evacuation systems.

The control system may track the movement of all riders and only allow each rider to launch when their path is clear. This may be through use of checkpoints that identify trolleys as they pass, or a global or local positioning system that may locate all trolleys simultaneously. Rider speeds may be adjusted at control points to maintain a safe distance, and rider spacing may allow time for emergency action in event of a trolley stopping or running away.

The gradient of mountains or escape egresses may vary significantly, and suitable pylon sites may further limit route options. The technology disclosed above, which may control the descent speed of all riders regardless of weight, will allow ziplines to be installed where it was previously not possible to install ziplines.

Figure 26:
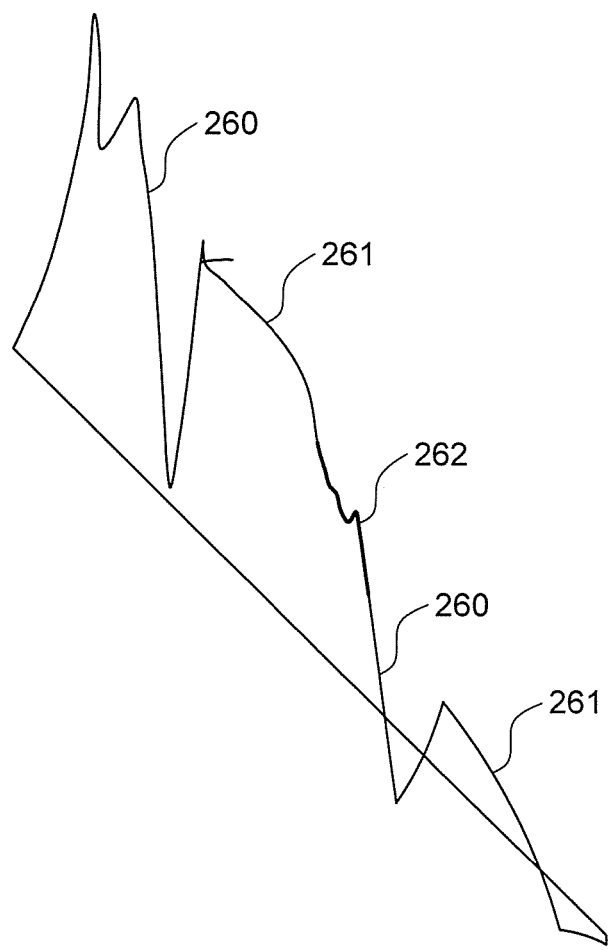
FIG. 26 illustrates an example route map taken by a zipline rider.

In the example route map illustrated in FIG. 26 there may be steep 260 and shallow 261 sections of cable, and a section of low speed track (bold 262) with a number of corners. For each section 260, 261, 262, the on-board brake may automatically be set to an optimum trolley speed to ensure that:
both large and small riders i.e. riders over a range of weights, will reach the next station without stopping;
corners may be navigated safely;
speeds coming into terminals are safe;
sections of the track may be dedicated to sightseeing and interacting with the surroundings. An example braking adjustment sequence may be as follows:

As the rider launches from the top station, their on-board brake is set to give a 60-kph ride down the first zipline. On approach to the first corner, the trolley may transition to a track section and a control point may adjust the on board brake setting to slow the rider down to 20 kph. The rider negotiates the next three corners at slow speed before a second control point sets the on-board brake to give a 50-kph ride. On approach to an interchange, a control point sets the brake to a 10-kph limit and the rider lands on the platform safely and at low speed. The rider may manually select to continue on to a section of sightseeing track and the on board brake in this example may then be set to 10 kph.

Without the on-board speed adjustment and control options offered by the technology disclosed herein, this route would not be possible to navigate using a single trolley or without manually transitioning the trolley between different cable and track types.

An example emergency braking scenario is described below:

Tree branches have fallen onto the line and a rider trolley has stopped on the track. The control system senses that the trolley has not reached the next checkpoint as expected, and sends out a signal to prevent any further patrons from entering the top of the ride. The control points on the track above the rider are set to an emergency mode. Rider trolleys that are already on the track are set to maximum braking, and riders are brought to a halt, in an accessible location, pending recovery or clearance of the line.

An example trolley runaway scenario is described below.

Debris has wedged into the pivoting brake arm on the trolley, preventing the brake from applying correctly. A rider is approaching a corner at an unsafe speed. The control point before the corner detects the excessive speed of the trolley and redirects the rider into an emergency-stopping lane, where a traditional zipline brake system brings them to a halt. Riders following are able to proceed safely around the corner and continue to the bottom of the ride. The control system informs operators of the incident, and they proceed to recover the rider from the escape lane.

A route as in the example above could typically need to be broken up into multiple short stages, each with a terminal brake zone and a manned launch station for the next stage. By making a trolley that may transition to a rail and navigate around corners, the handling time for riders may be reduced and rider spacing may be automatically controlled over much longer distances.

High-speed transitions between cable and rail sections may enable the rider to interact with control points, corners and emergency braking/escape paths.

Figure 27:
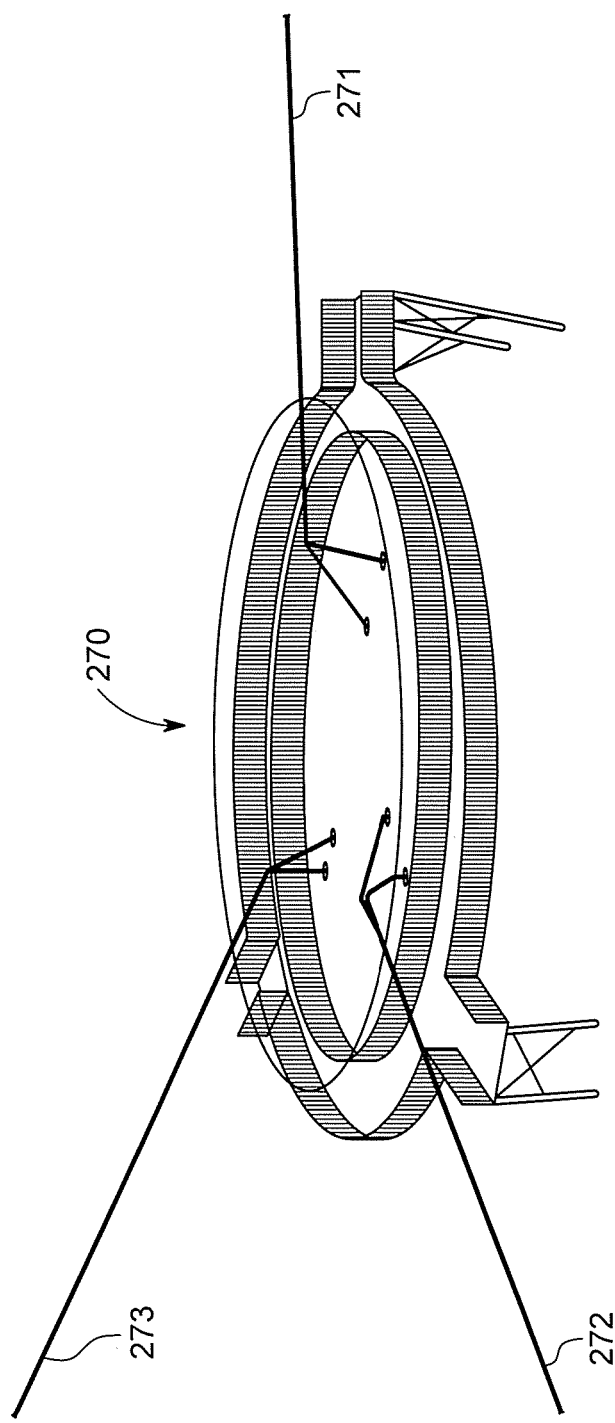
FIG. 27 illustrates an example of an interchange platform.

On-board pass-through braking may allow riders to slow down to a safe speed and step onto staffed interchange platforms part way down the track, an example interchange platform 270 being shown in FIG. 27. At interchanges 270 the rider could choose to ride down one or more exit routes 271, 272 after entering the interchange 270 from a first cable 203, or potentially detach from their trolley and explore the local area.

Figure 28:
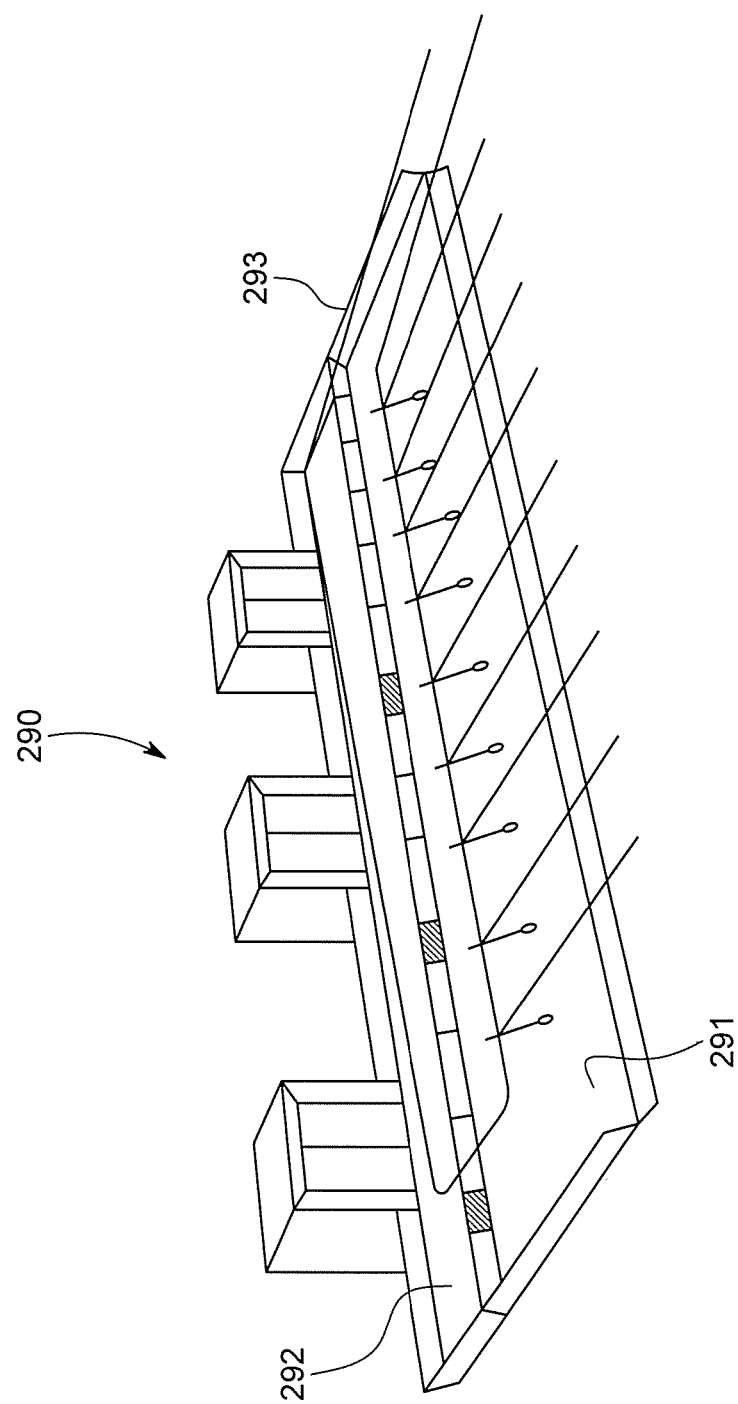
FIG. 28 illustrates an example of a possible termination and unloading station.

FIG. 28 illustrates a possible termination and unloading station 290. For an open loop system the rider may be slowed to a safe speed prior to the station (the system sets the trolley brake accordingly) and the rider may walk from the landing pad 291 around to the uncoupling and harness removal area 292. Trolleys are returned to the top of the track for the next rider. Alternatively for a closed loop system the rider stays attached to the trolley and transitions onto the driven cable that is climbing back uphill 293. The braked wheel locks when driven in reverse, so acts to clamp the rider onto the driven cable as they proceed uphill to begin the ride again. In a further embodiment, a landing platform 290 or part thereof, may be sloped away from the direction of travel of a rider to allow the rider to land on the platform and have the ability to reduce or prevent any unwanted roll-back of the trolley, or where this does occur, to provide the rider with sufficient footing to be able to resist any roll-back of the trolley.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as of individually set forth.

Aspects of the trolley systems and associated rails and cables have been described by way of example only and it should be appreciated that modifications and additions may be made thereto.

What is claimed is:

1. A transition configured to convey at least one trolley system between a cable and rail, the transition comprising:
   a lower section and an upper section; and
   at least one alignment member configured to transition a trolley system, when the trolley system is being conveyed from the cable to the rail by the transition, from a configuration in which a lower portion of the trolley system is not stabilized by a lower surface of the transition to a configuration in which the lower portion of the trolley system is stabilized by the lower surface of the transition;
   wherein:
      the cable passes through the at least one alignment member and through one of the lower section and the upper section; and
      the cable exits the transition at a distal end of the one of the lower section and the upper section.

2. The transition as claimed in claim 1, wherein the at least one alignment member causes a trolley system conveyed along the transition to move vertically.

3. The transition as claimed in claim 1, wherein the at least one alignment member causes a trolley system conveyed along the transition to move laterally.

4. The transition as claimed in claim 1, wherein the transition further comprises an upper surface and the at least one alignment member is linked to the upper and lower surfaces.

5. The transition as claimed in claim 1, wherein the transition is curved along at least part of its longitudinal extent to permit changes in horizontal and/or vertical orientation of the transition and a trolley to be conveyed thereon.

6. The transition as claimed in claim 1, wherein the transition comprises a ramp element, wherein the ramp element is configured to raise or lift the trolley system above the level of the cable as the trolley system conveyed on the transition traverses the transition length.

7. The transition as claimed in claim 1, wherein the transition at the lower section surrounds the cable.

8. The transition as claimed in claim 1, wherein, as the trolley system is conveyed along the transition, the transition is configured so that upper wheels of the trolley system conveyed thereon engage an upper surface of the transition.

9. The transition as claimed in claim 1, wherein, as the trolley system is conveyed along the transition, the transition is configured so that at least one lower wheel of the trolley system conveyed thereon engages the lower surface of the transition.

10. The transition as claimed in claim 1, wherein the transition has a shape configured to change the distance between upper and lower wheels of a trolley system conveyed over the transition.

11. The transition as claimed in claim 1, wherein the transition is configured to interact with a gate located on a trolley system configured to be conveyed along the transition, the transition interaction activating trolley system gate opening or closing.

12. The transition as claimed in claim 1, wherein the upper section and the lower section are separate pieces and are fastened together at least at a distal end of the lower section to surround the cable.

13. The transition as claimed in claim 1, wherein the transition is incorporated into an amusement ride.

14. The transition as claimed in claim 1, wherein the transition is incorporated into a safety and emergency egress.

15. The transition as claimed in claim 1, wherein the transition is incorporated into a goods and materials transportation system.

16. The transition as claimed in claim 1, wherein a proximal end of the lower section is configured to fully enclose the cable.

17. The transition as claimed in claim 1, wherein the transition is configured to convey a trolley system from the rail to the cable.

18. The transition as claimed in claim 1, wherein the transition is configured to allow the cable to displace axially through one of the lower section and upper section in use.

19. A track system having a track, the track being traversable by a trolley system, the track system comprising:
- a cable section, comprising a cable;
- a rail section, comprising a rail; and
- a transition to convey the trolley system between the cable section and the rail section, the transition comprising:
  - a lower section and an upper section; and
  - at least one alignment member configured to transition the trolley system, when the trolley system is being conveyed from the cable to the rail by the transition, from a configuration in which a lower portion of the trolley system is not stabilized by a lower surface of the transition to a configuration in which the lower portion of the trolley system is stabilized by the lower surface of the transition;
  - wherein the cable passes through the at least one alignment member and through one of the lower section and the upper section; and
  - the cable exits the transition at a distal end of one of the lower section and the upper section.

20. The track system as claimed in claim 19, wherein the transition at the lower section surrounds the cable.

21. The track system as claimed in claim 19, wherein a proximal end of the lower section fully encloses the cable.

22. The track system as claimed in claim 19, wherein the transition is curved along at least part of its longitudinal extent to permit changes in horizontal and/or vertical orientation of the transition and a trolley system conveyed therealong.

23. The track system as claimed in claim 19 wherein the transition comprises a ramp element configured to raise or lift a trolley system above the level of the cable the trolley system traverses the transition length.

24. The track system as claimed in claim 19, wherein the transition is configured to convey a trolley system from the rail to the cable.

25. The track system as claimed in claim 19, wherein the transition is configured such that when the trolley system traverses the track, the cable is axially displaceable through one of the lower section and upper section.

* * * * *